US005437210A

United States Patent [19]

Fraser et al.

[11] Patent Number: 5,437,210

[45] Date of Patent: Aug. 1, 1995

[54] POWER DRIVE CAM ASSEMBLY

[75] Inventors: Kenneth D. Fraser, Scarborough; Peter Taylor, Uxbridge; W. Scott Fraser, Scarborough, all of Canada; Kenneth A. Lindblom, Shrewsbury, Mass.

[73] Assignee: Coulter Corporation, Miami, Fla.

[21] Appl. No.: 114,941

[22] Filed: Aug. 31, 1993

Related U.S. Application Data

[62] Division of Ser. No. 745,625, Aug. 14, 1991, Pat. No. 5,241,340.

[51] Int. Cl.$^6$ .................... F16H 53/00

[52] U.S. Cl. .................... 74/567; 74/569; 74/570

[58] Field of Search .................... 74/567, 569, 568 R, 74/570, 63; 355/27, 202, 200, 210; 354/78

[56] References Cited

U.S. PATENT DOCUMENTS

| | | | |
|---|---|---|---|
| 3,077,792 | 2/1963 | Kinderman | 74/570 X |
| 4,493,346 | 1/1985 | Speich | 74/570 |
| 4,625,575 | 12/1986 | Le Bras | 74/63 |
| 4,642,839 | 2/1987 | Urban | 74/570 X |
| 5,119,686 | 6/1992 | Stillabower | 74/569 X |
| 5,222,457 | 6/1993 | Friedrich | 74/570 X |
| 5,241,873 | 9/1993 | Hormann | 74/567 X |
| 5,259,419 | 11/1993 | Vinciguerra et al. | 74/569 X |

FOREIGN PATENT DOCUMENTS

| | | | |
|---|---|---|---|
| 2-278054 | 11/1990 | Japan | 74/569 |
| 618317 | 2/1949 | United Kingdom | 74/569 |
| 1433995 | 4/1976 | United Kingdom | 74/569 |
| 1493836 | 7/1989 | U.S.S.R. | 74/569 |
| 92/06152 | 2/1993 | WIPO | 74/569 |

*Primary Examiner*—Vinh T. Luong
*Attorney, Agent, or Firm*—Sidney N. Fox

[57] ABSTRACT

A power cam drive assembly for generating and delivering two different degrees of force serially to a body, the second force being greater than the first force. A main drive gear is coupled to a driven cam gear which is coupled to an outer cam shell. A cam core is nested within the cam shell for rotation along an eccentric path therewithin. The cam core has an axial extension also coupled to the driven cam gear. A windable clock spring located between the cam core and cam shell has one end secured to the cam core and the other end locked to the cam shell. A cam roller is disposed within the cam core. The clock spring has a greater rotational torque than required to rotate the cam core. The driven cam gear rotates, causing the cam shell to rotate, through the clock spring interconnection, causing rotaton of the cam core with attendant rotation of the cam roller which impacts on a cam stop in its path preventing further rotation of roller and cam core, causing the first force to be transmitted via a lever arranged to transmit the first force to the body. Further rotation of the cam shell causes the cam roller to move in a downward direction, winding the clock spring, resulting in further rotation of the cam core producing the second downward force for transmission to the body via the lever.

4 Claims, 38 Drawing Sheets

POWER DRIVE CAM ASSEMBLY

This application is a division of Ser. No 07/745,625 filed Aug. 14,1991 now U.S. Pat. No. 5,241,340.

FIELD OF THE INVENTION

This invention relates to means for successive generation and transmission of two degrees of force for serial application to a body, the second applied force being greater than the first applied force, and particularly, to a power cam drive assembly for effecting such results, especially applied for use in systems requiring same.

REFERENCES TO RELATED PATENTS

This invention is related to the subject matter disclosed in the following United States patents:

| | | |
|---|---|---|
| 4,025,339 | Manfred R. Kuehnle | Electrophotographic Film, Method of making Same and Photo-conductive coating used therewith; |
| 4,269,919 | Manfred R. Kuehnle | Inorganic Photo-conductive coating, Electrophotoconductive Member and Sputtering Method of making the Same |
| 4,529,650 | Ferdinand Martinez et al | Image Transfer Material and Transparency Resulting therefrom |
| 4,521,097 | Kuehnle et al | Electrophotographic Imaging Recording Method and Apparatus |

The above identified patents are hereby incorporated by reference herein and are owned by the assignee hereof.

BACKGROUND OF THE INVENTION

Micrographics is a general term employed to denote the creation or use of information communication or storage media containing images too small to be read without magnification. The images generally are reduced images of printed or other graphics, graphical design and the like for storage in the printed form and enlargement for printing or projection retrieval.

Conventionally, the art of micrographics employs high speed, fine grain, expensive film in view of the requirements of the substantial reduction of the size of the image and the substantial enlargement required for viewing. These films generally required expensive chemicals and processing, needing special handling since they are relatively bulky, light sensitive and difficult to store. Additionally, these films do not provide for re-exposure to add information to already prepared past images.

Xerographic processors have been suggested but for many reasons, including low gain, long processing times, complex equipment of substantial bulk, poor storability, low resolution and low throughput capability. In many instances, available apparatus was not suitable for operation in an office environment under normal ambient lighting. Operation at a high noise level, solvent emission, inability to meet or exceed the applicable standards for conventional film, all restricted the use of xerographic processes and equipment for micrographic processing, such as for production of microfilm.

Cited U.S. Pat. No. 4,521,097 provided a method and apparatus for making an image carrying transparency having a reduced image such as suitable for micrographic applications such as microfilm. In said patent there was described a method for producing an image-carrying receptor of an original image which eliminated many of the above mentioned problems encountered with the use of silver halide film and/or the prior electrophotographic methods of imaging on a receptor substrate. There was provided a light excluding housing, a stepwise translatable carriage disposed within the housing and plural operational stations disposed spaced along the path of the carriage and each providing one of the operational steps in the electrophotographic process. The method consisted of the steps of providing a planar electrophotographic member having a photoconductive surface facing outwardly, applying an electrostatic uniform charge to the photoconductive surface, projecting a light pattern representative of the original information onto the charged surface forming a latent electrostatic image on said charged photoconductive surface, rendering the latent charge image visible by toning with a liquid toner, drying the resulting photoconductive surface and the toner image thereon, transfering the toned image to a transfer medium using locally applied heat and pressure, cleaning the residual photoconductive surface and discharging said surface thereafter. The functional stations were housed in a light-excluding enclosure. The electrophotographic members were mounted platens carried by a carriage and presented to the respective stations successively. The apparatus described in said referenced patent particularly was intended to provide images on receptor means premounted in a rectangular aperture in a standard sized micrographics aperture card and did not produce microfilm in strips or the like film. The receptor employed in this method comprised an overcoated non-light sensitive polyester substrate carrying a coating of heat softenable resin described in U.S. Pat. No. 4,529,650 referenced above.

The method and apparatus disclosed in said referenced patent provided an efficient processor for forming permanent, high resolution micrographic image carrying transparencies. However, such apparatus was bulky, was not suitable for providing images upon strip and/or roll film, was limited in the speed of operation and throughput, required considerable space, was not adapted for use in an office environment and was expensive to construct, to assemble and to maintain.

A growing need has arisen to provide a microfilm camera/processor which would overcome the disadvantages of prior attempts to utilize the method proposed in said referenced patent for forming micrographic images on strip and/or roll microfilm, to provide a camera/processor which would enable immediate access to strip and/or roll transfer medium rapidly and immediately available for use, i.e. for projection or duplication, for example. Further, the long sought camera/processor should be able to combine the reduction capability with the functional steps of said disclosed method, which is able to provide either batch or continuous production of microfilm for immediate use, which is capable of providing instantaneous access to the produced microfilm, which is versatile as to size of the originals capable of being treated, which can be automated and all with using the method first disclosed in the referenced patent except for selected features indigenious to the herein invention.

SUMMARY OF THE INVENTION

The herein invention arises from the electrophotographic microfilm camera processor apparatus disclosed and claimed in the patent application Ser. No. 745,625 filed Aug. 14, 1991, now U.S. Pat. No. 5,241,340, of which the herein application is a division. This invention a power drive cam assembly for applying at least two degrees of force serially to a body, the second applied force being greater than the first applied force, said power drive cam assembly comprising an outer cam shell, a cam core arranged within said outer cam shell for eccentric rotation relative thereto, drive means coupled to the outer cam shell for rotation thereof, windable spring means disposed within said cam shell between said cam shell and said cam core secured to both, said windable spring means having a greater rotational torque than required to rotate said cam core, follower means within said cam core rotatable therewith, said drive means being effective to rotate said cam shell, through said resilient means, causing rotation of said cam core with attendant rotation of said follower means, a cam stop positioned in the path of said follower means, said follower means impacting on said cam stop preventing further rotation of both said cam core and follower means and causing the first force to be transmitted to said lever means and thence to said body, said drive means being operable thereafter causing further rotation of said outer cam shell winding said spring means, driving said follower means in a downward direction due to the axial offset of said cam core attendant on the eccentric positioning of said cam core relative said outer cam shell producing a second downward force greater than said first force for transmission to said body by way of said follower means. Lever means responsive to the follower means are provided for transmission of said forces.

DESCRIPTION OF THE DRAWINGS

FIG. 8 is a left elevational view of the toning station of FIG. 6, while FIG. 8A is a right elevational view of said toning station of FIG. 6;

FIG. 24/A is a view similar to that of FIG. 23A showing the representation of FIG. 23A but in the condition with the transfer block and clamp raised to its upper condition and just prior to performance of the transfer operation;

DESCRIPTION OF PREFERRED EMBODIMENT

Figure 1:
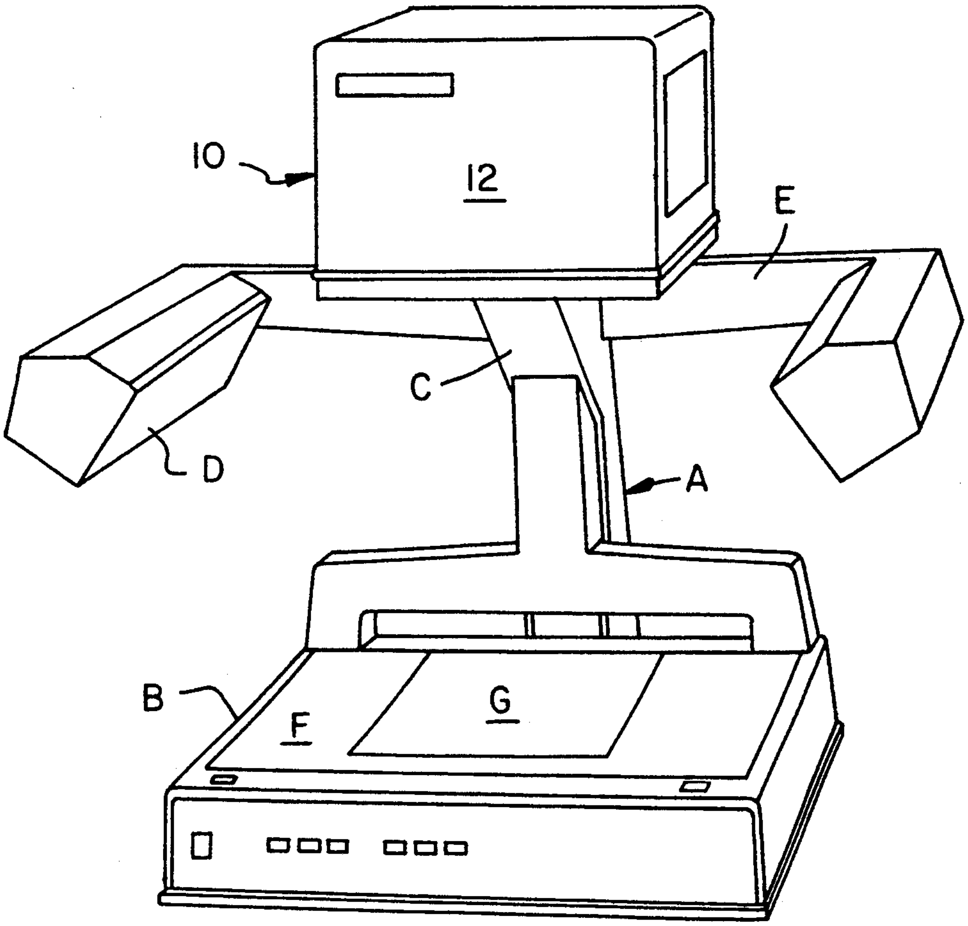
FIG. 1 is a front perspective view of the microfilm camera/processor constructed in accordance with the herein invention.
Figure 2:
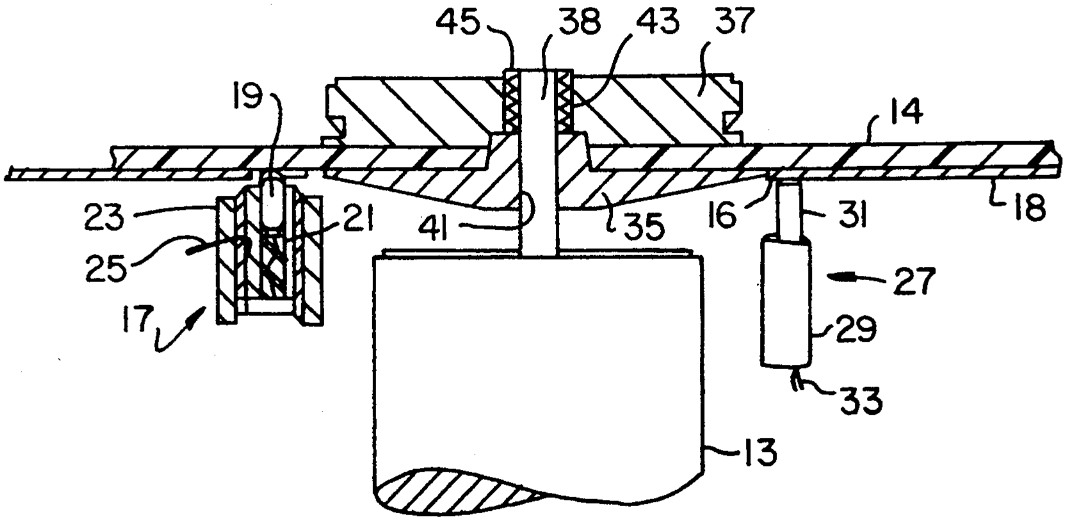
FIG. 2. is reduced diagrammatic fragmentary partial sectional view of the carrier disc mounted in the head portion of the microfilm camera/processor according to the invention and representing the main drive means, the grounding arrangement and the position sensing means employed therewith.

The invention herein will be described as applied to the electrophotographic microfilm camera/processor described in the copending patent application Ser. No. 745,625, which is a provided according to table-top apparatus suitable for production of a continuous length of 16 mm microfilm comprising serial, high resolution, archival quality images meeting or exceeding conventional microfilm. The microfilm camera/processor is compact in construction and capable of operation in normal ambient light under ordinary office environmental conditions with satisfactory noise level, little, if any, solvent emission, materially reduced liquid toner usage, operates upon right reading, face-up documents and provides immediate access to the finished product without extra-apparatus processing. The microfilm camera/processor provided by the invention herein performs all steps of imaging and processing in a compact arrangement of stations. The microfilm camera/processor to be described herein is illustrated in FIG. 1 and includes a stand A comprising a cabinet B and a vertically arranged support C. The support C mounts an illumination arrangement D mounted on cross-support E. The cabinet B carries a copyboard F for supporting a source document G positioned thereon, face-up and located for reproduction in materially reduced form on a frame of a continuous length of transparent receptor medium. The interior of the cabinet B contains the electrical and electronic controls and electrical power supplies and distribution means required. The illumination arrangement D includes plural, balanced fluorescent lamps (here 36 watts) which provides a measured light level of approximately 500 foot candles at the source document plane, thereby significantly reducing the conventional requirement for ambient light control at the operating location. The reproduction functions of the microfilm camera/processor are contained within the camera/processor head 10 mounted on the vertical support C in fixed position over the copyboard F, as shown in FIG. 2. A carrier disc 14 is mounted within the housing 12 for supporting the photoconductor in the form of a planar stainless steel annulus 16 carrying a photoconductor coating 18 applied thereto in accordance with teachings of U.S. Pat. Nos. 4,025,339 and 4,269,919. Other photoconductive coatings can be substituted if their electrophotographic characteristics are similar. The stainless steel alloy preferably employed as the substrate for the photoconductor coating 18 is a 400 series stainless steel having long life characteristics and a mirror-like surface finish enabling high quality image transfer without the adverse effect of embossing the substrate structure into the transfer receptor medium employed as would be observed using rougher surfaced materials. The annulus 16 is preferably adhesively secured onto the undersurface of the carrier disc 14, the photoconductor coating 18 facing inwardly of the housing, the plane of the carrier disc 14 and hence, of the photoconductor coating 18, being arranged parallel to the base plate of the housing 12. The plural functional stations of the microfilm camera/processor 10 are arranged mounted within the housing 12 arrayed in a circular disposition below the carrier disc 14 and include a charging station 22, an exposure station 24, a liquid toning station 26, a drying station 28 adjacent to which a liquid toner reservoir 32 and including a vacuum knife 30, is located between said drying station 28 and the toning station 26, a transfer station 34, a photoconductor cleaning station 36 and a discharging station 38 capable of discharging any residual charge remaining on the photoconductor subsequent to transfer whereby to ready the photoconductor capable of repeat processing.

The main drive means for microfilm camera processor comprises a d.c. stepper motor 13, said motor being supplied by a d.c. voltage supply (not illustrated) which is coupled both to d.c. distribution means (not shown), in turn coupled to the respective individual power supplies for the respective functional stations. The carrier disc 14 is supported on circular holder or platform 35 and retained in place by clamp 37, the motor shaft 39 passes through passageways 41 and 43, including bearing 45. The main electrical system receives energization from a 120 volt AC source at 18 amperes current, said source not being illustrated. The stainless steel annulus 16 is provided with a circular, coaxial portion from which the photoconductor has been removed, leaving a mirror-like metal substrate surface exposed. A spring biased electrically conductive brush assembly 17 including brush 19, coil spring 21, housing 23 and electrical lead 25, is provided to effect the required ground (or earthed) connection for the electrophotographic process. The accurate sensing of the start position of photoconductor is effected by providing light sensor means 27, including light projection means 29, a light sensing device 31 and lead means 33 directed to an exterior reading means (not shown), said light sensor means 27 operating in accordance with differential light reflectance off the mirror finish of the exposed metal substrate surface. The respective functional stations are represented in their disposition by reference to FIG. 3.

Figure 3:
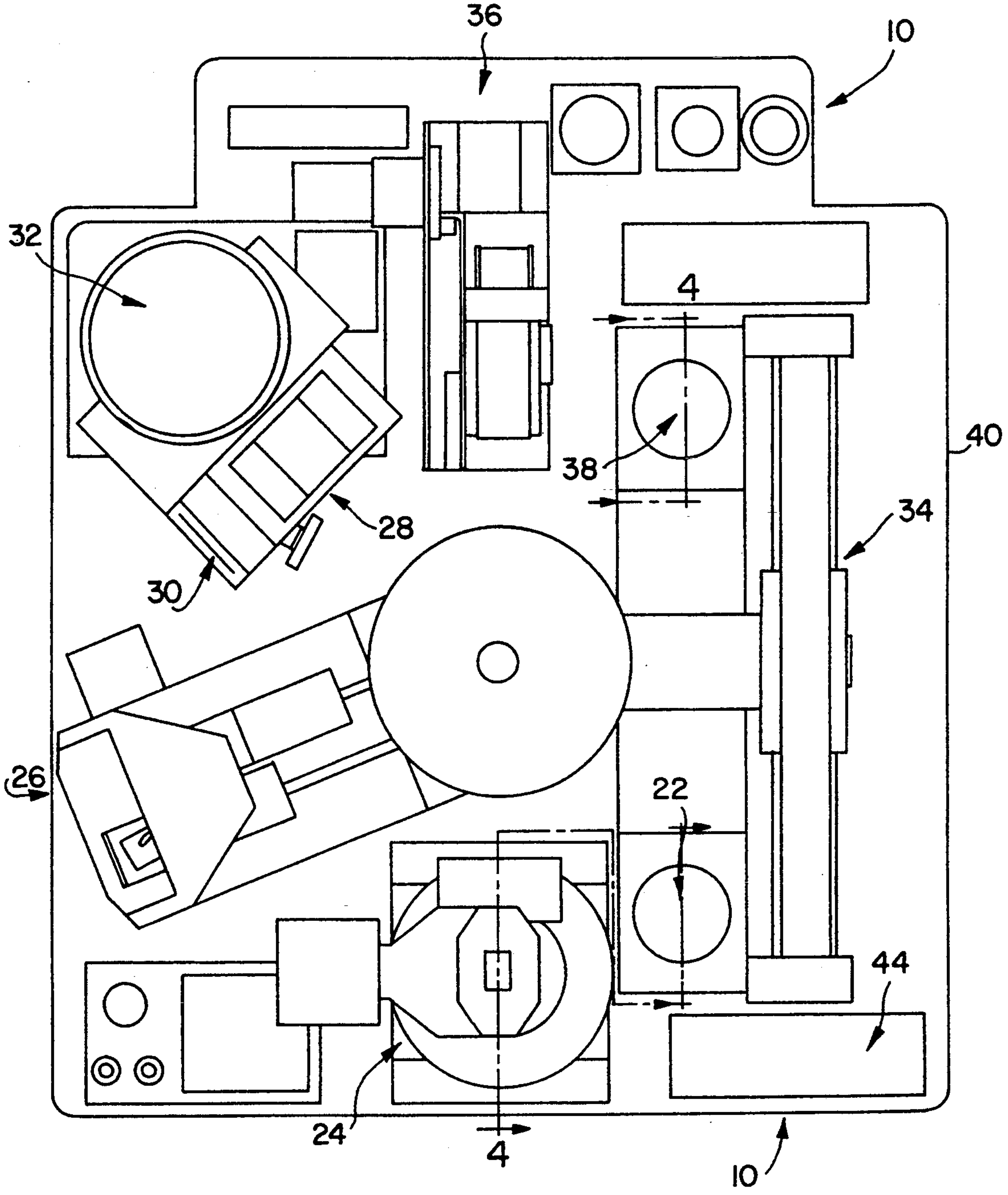
FIG. 3 is a top plan view of the head portion of the microfilm camera/processor of FIG. 1.

As illustrated in FIG. 3, the respective stations are not arranged in the order dictated by the actual image generating process due to the desire to provide maximum space utilization. Hence multiple rotations of the disc 14 are required to complete a single given imaging cycle. In the embodiment herein described, three revolutions of the carrier disc 14 are required per image location on the photoconductor annulus 16, as will be explained hereinafter. With the camera/processor 10 in a normal imaging mode, all the process steps are fully multiplexed, and, at any given time, there are provided sixteen active image areas or portions on the photoconductor annulus 16. The reference baseline position of the carrier disc 14 is located on start-up and remains the same until the number of total imaging cycles reaches a preset value, at which time a new home position will be defined and sixteen new areas on the photoconductor 18 will be utilized. This maximizes the useful life of a given photoconductor annulus 16 (and hence the carrier disc 14 having the annulus 16 secured thereto.

Figure 4:
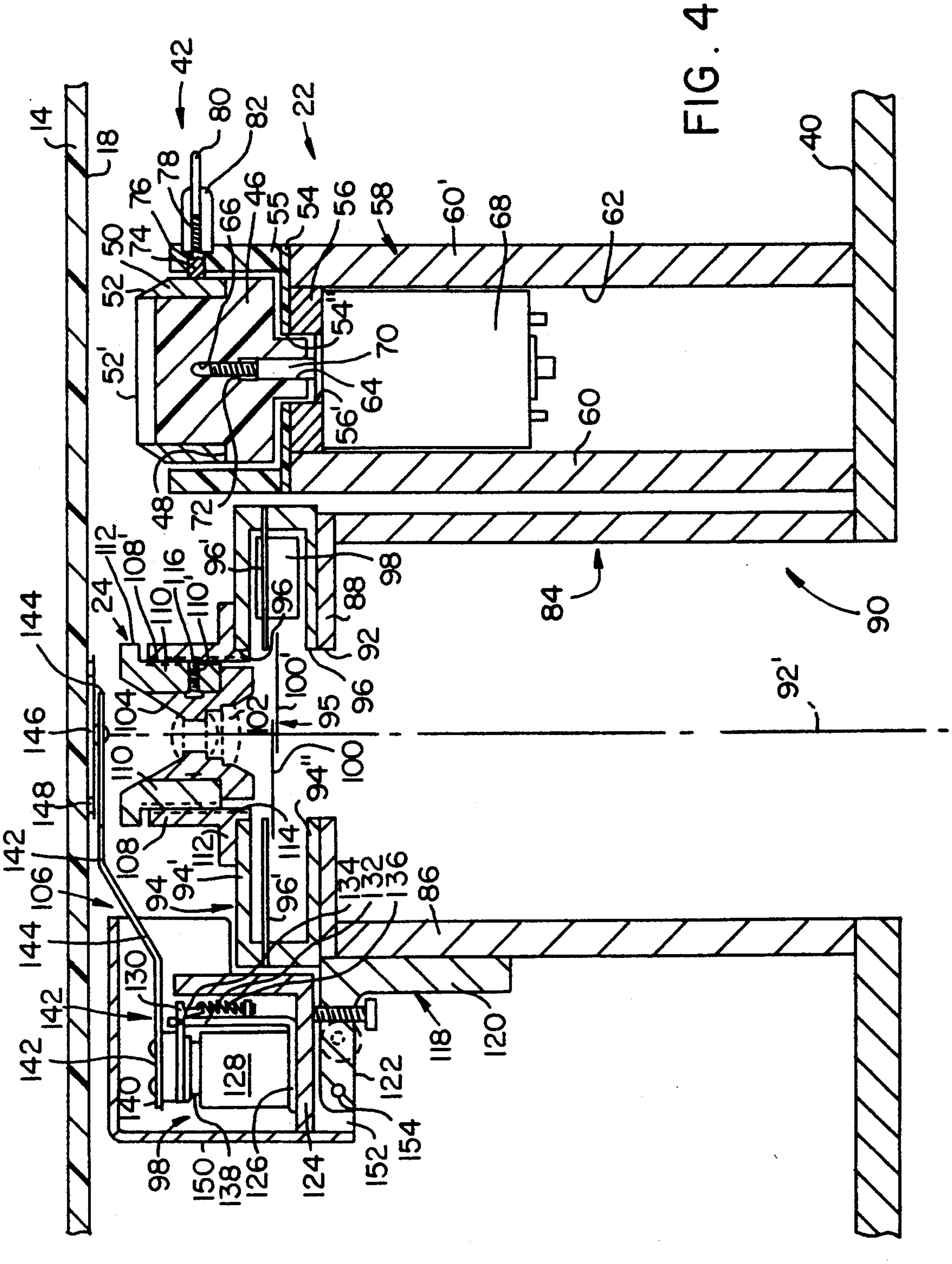
FIG. 4 is an elevational sectional view of the exposure unit and charging means of the microfilm camera/processor taken along line 4—4 of FIG. 3.
Figure 5:
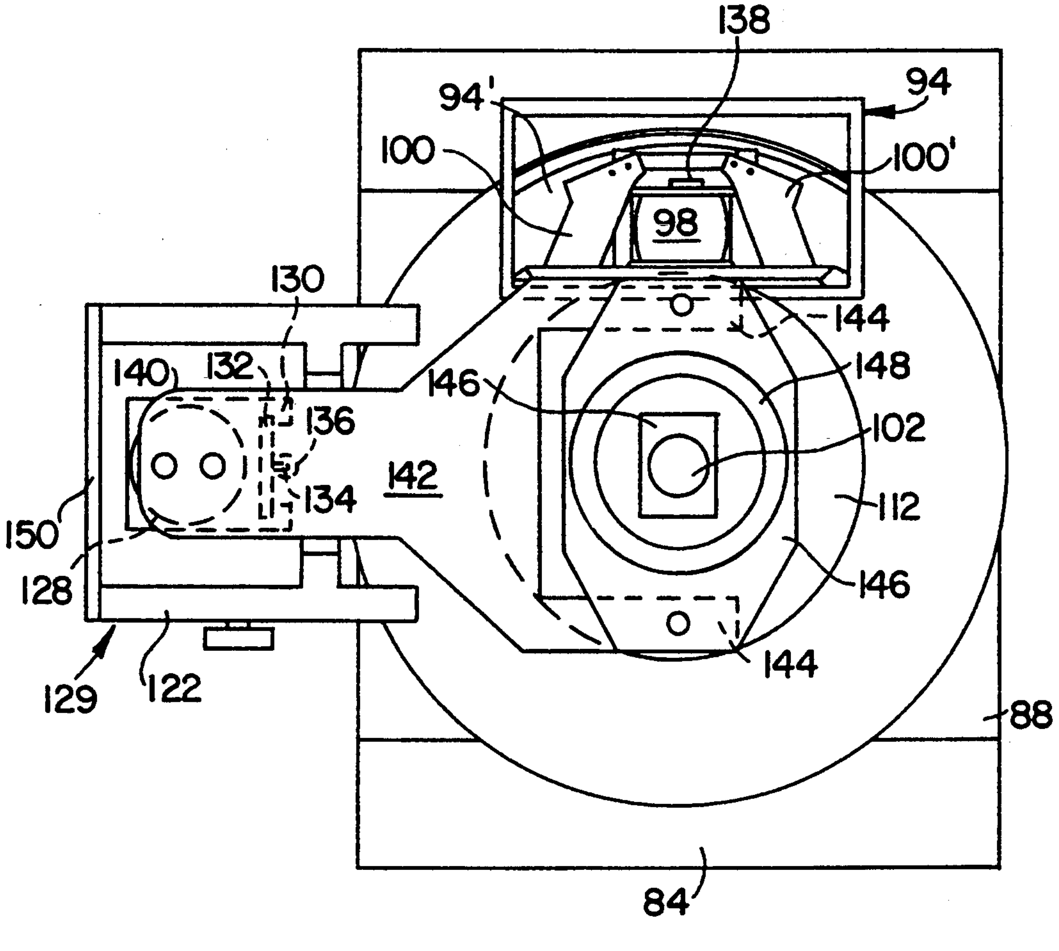
FIG. 5 is a detail top plan view of the exposure unit of FIG. 4.
Figure 6:
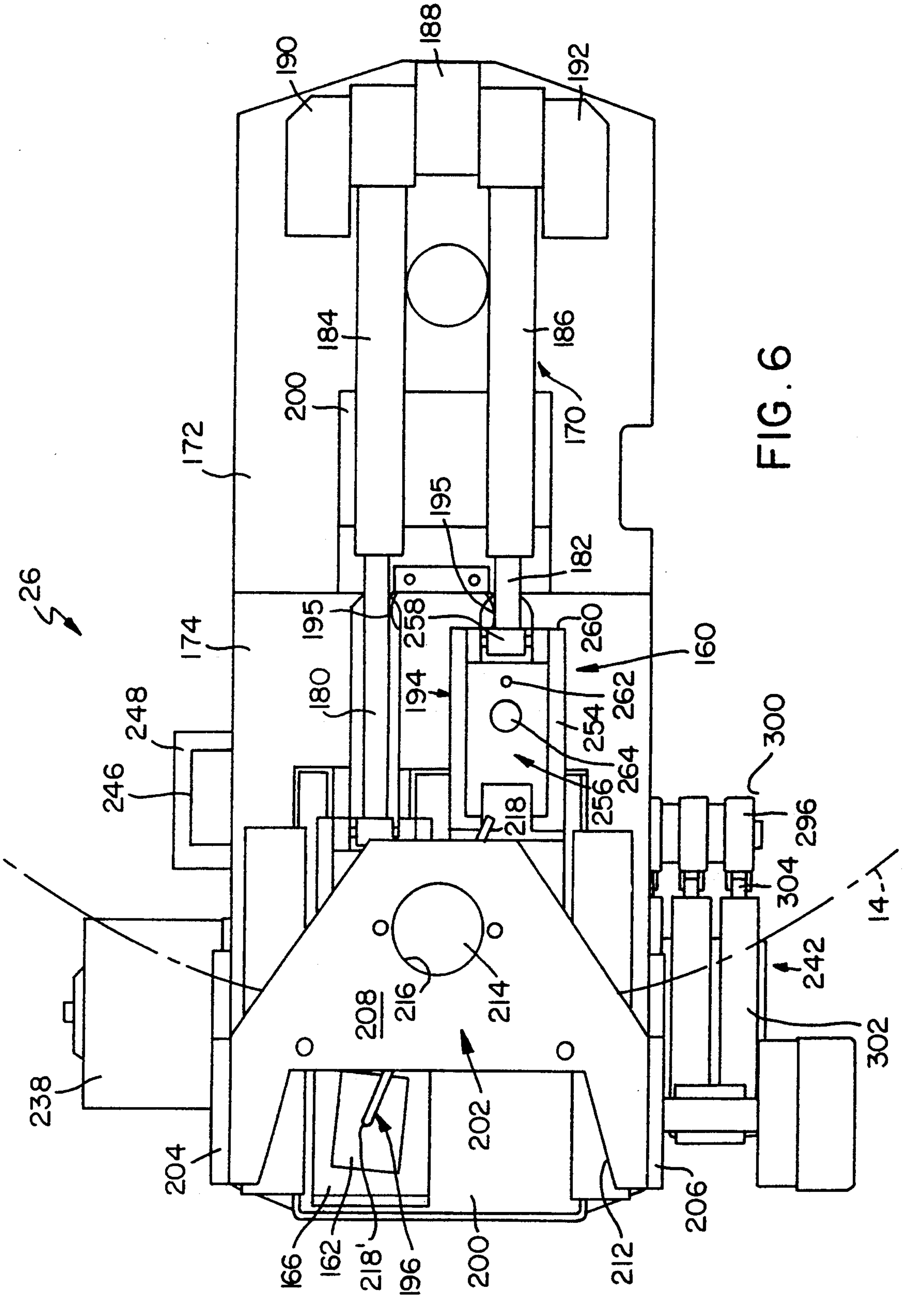
FIG. 6 is a top plan view of the toning station of the microfilm camera/processor.
Figure 7:
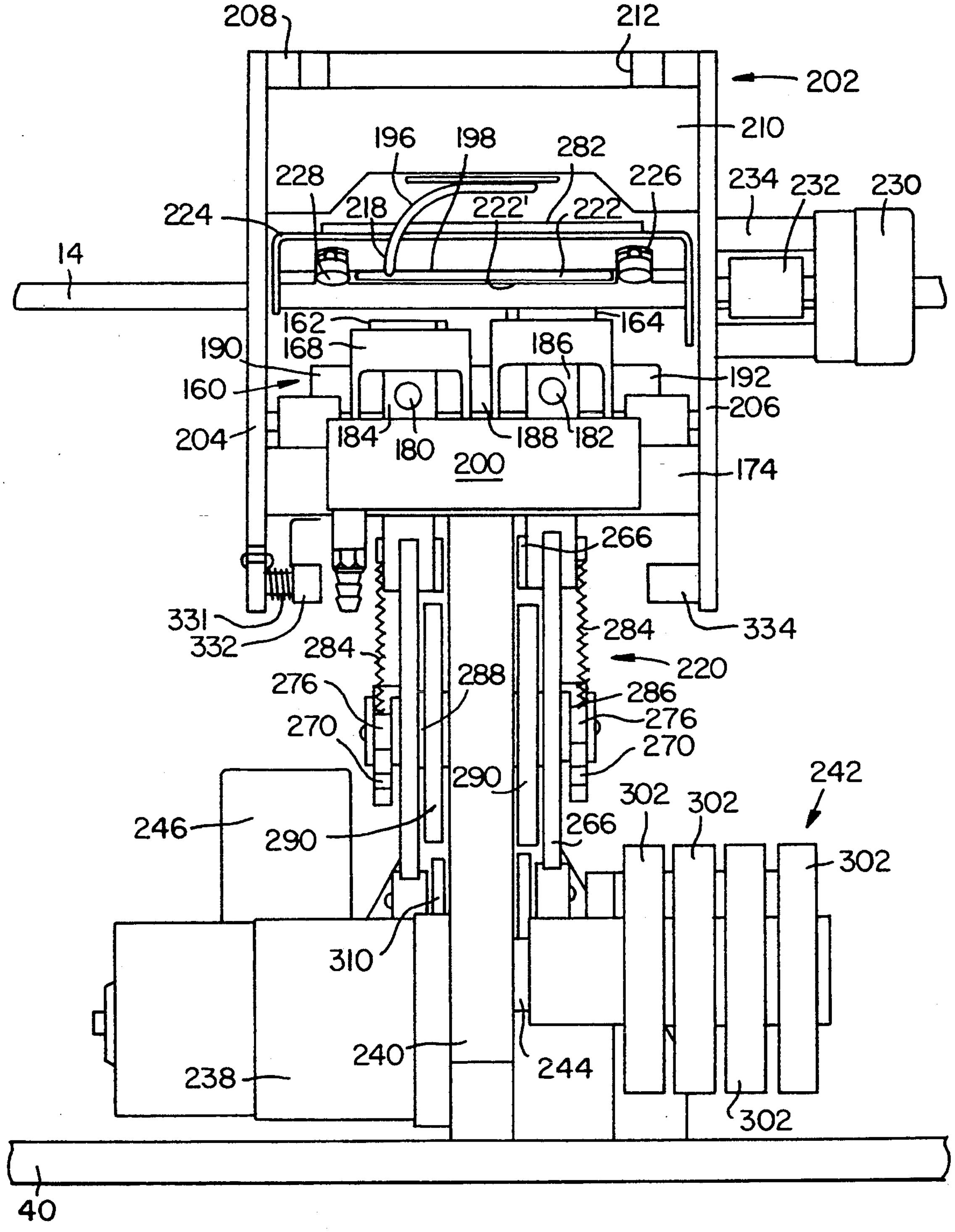
FIG. 7 is a front elevational view of the toning station of FIG. 6.
Figure 8:
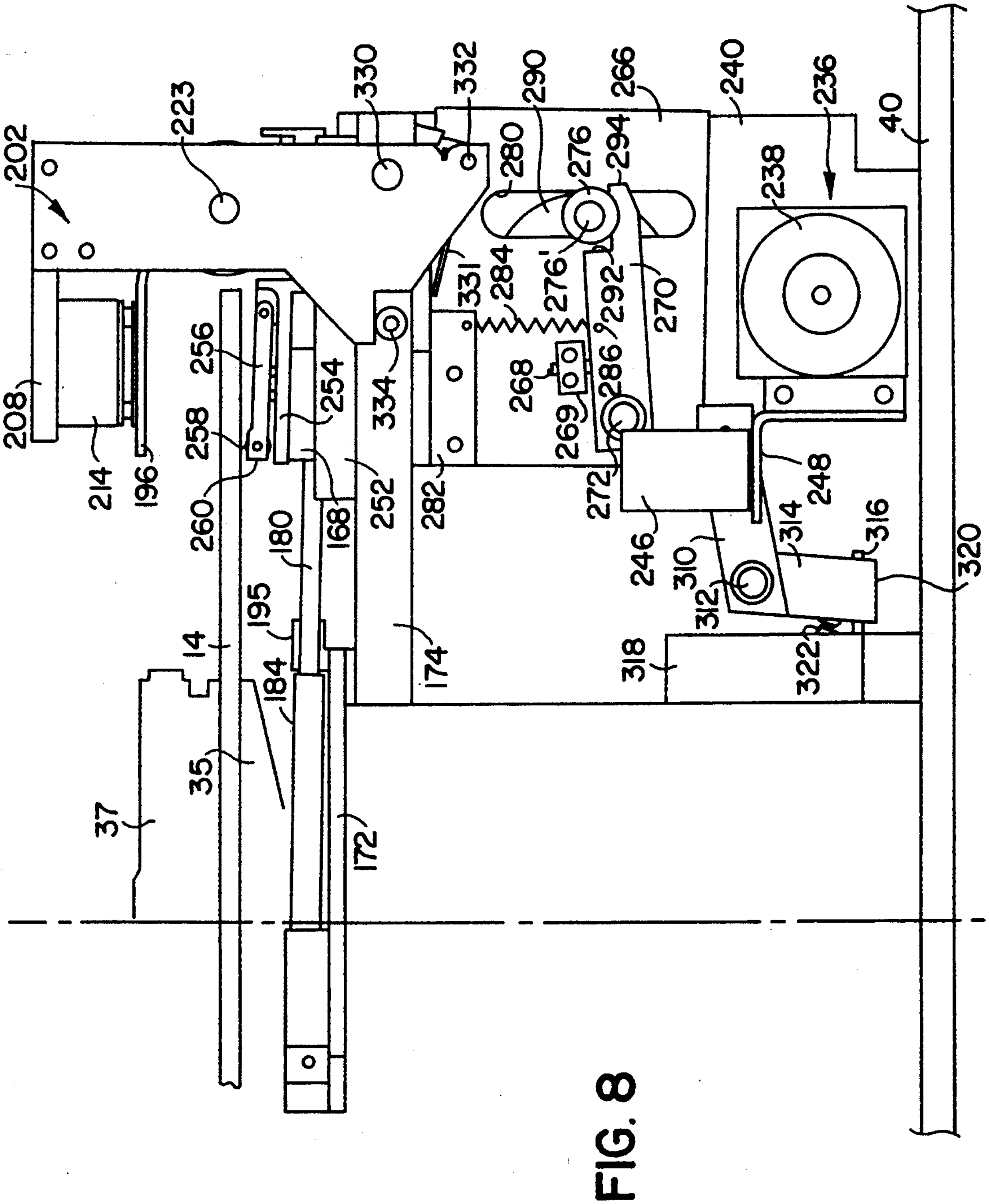

Attention is directed to FIGS. 3 through 5 wherein the charging station 22 and the exposure station 24 are illustrated. The respective functional stations or units are secured to the base plate 40. As illustrated, certain portions of the other functional stations shall be identified for reference when those functional stations are described. The charging station 22 includes a spin charging device 42 which is supplied by a negative high voltage power supply 44 (see FIG. 4). The spin charging device 42 is better viewed in FIG. 4 and includes a core member 46 of generally cylindrical configuration having an annular upper ledge 48 on which is seated conductive spin charger ring 50. The ring 50 has an upper tapered portion 52 sharpened to a razor edge 52' extending above the core 46. The core member 46 has an axial extension by which said core member 46 is seated through a coaxial apertures 54' and 56' formed in the plastic insulating plate 54 and the upper plate 56 of housing 58, said plate 54 being supported by said plate 56. Housing 58 is formed by a pair of upstanding spaced plate members 60,60' defining an enclosure 62. The center portion of the core member 54 has a bottom opening axial bore 64 having a threaded inner bore 66. The drive motor 68 for the spin charging device 42 has its driven shaft 70 secured by threaded end pin formation 72 in inner bore 66 and is disposed within the enclosure 62. Pin formation 72 determines the position of the razor edge of ring 52 relative to the photoconductor 18. The spin charging device 42 further includes brush 74 secured within passage 76 of the insulating housing 55 in bearing relationship to the outer circumference of the ring 50, biased thereagainst by spring 78 which, in turn, is held in place by terminal 80 and brush housing 82, the terminal 80 extending outward of said ring 50. In FIG. 4, the brush 74, the passage 76, the spring 78, the terminal 80 and the brush housing 82 are all rotated 90 degrees for clarity.

The spin charging device 42 has a high negative potential applied thereto. As the core member 46 is rotated at high speed, a very uniform corona discharge is generated and applied to the photoconductor portion immediately thereabove. The corona current is on the order of 50 to 100 microamperes, sufficient to uniformly charge the photoconductor portion to the required level for imaging. The ring 50 preferably is formed of metal or can formed as a conductive coating applied to a lower cost, lower mass plastic composition.

The exposure station 24 is illustrated in detail in FIGS. 3, 4 and 5 and reference will be made thereto. The exposure station 24 includes an exposure assembly support housing 84 defined by a pair of upstanding plates 86 and top plate 88 defining an interior portion 90 through which an optical path (indicated by broken line 92') passes, said optical path passing through the center of said interior portion 90 and through aperture 92 formed in top plate 88. The exposure station 24 further includes shutter housing 94 seated on the top plate 88 of housing 84. The shutter housing 94 is formed of a pair of spaced plates, upper plate 94' and lower plate 94", the lower plate 94" seated flush on the top plate 88. The plates 94' and 94" have coaxial openings 96 formed respectively therein, the diameter of said openings 96 being identical with the aperture 92, said openings 96 being coaxial with said aperture 92. The main plate 96' of the shutter 95 is secured between the plates 94' and 94" and is coupled to the shutter solenoid 98. The shutter blades 100, 100' extend across the aligned openings 96 of the shutter housing 94, one blade 100 disposed above the other blade 100' and overlapping where the axial center of the aligned openings and the optical path 92' coincide. The shutter solenoid 98 is illustrated in FIG. 4 rotated 90 degrees for clarity.

The exposure station 24 also includes an appropriate lens assembly 102 and mounting 104 therefor, as well as solenoid operated masking assembly 106. The optical system of the microfilm camera/processor 10 is capable of projecting an image of the source document G at the required reduction ratio, resolution, contrast, etc. to the image plane on the photoconductor portion 18. In the described embodiment, a f-4.5, 22.55 mm focal length micrographic lens assembly 102, which is commercially available, is mounted into the rigid lens assembly mounting 104. The lens assembly mounting 104 includes focussing ring mount 108 and lens holder and focussing ring 110. The ring mount 108 carries inner threads 108' and the lens holder and focussing ring 110 carries outer threads 110'. The ring mount 108 has a circumferential flange 112 and a depending annular flange 114 enabling the ring mount 108 to be seated within the opening 96 of plate 94' of housing 94. The lens holder and focussing ring 110 is threadably engaged within ring mount 108, locking screw 116 being threadably engaged through said lens holder and focussing ring 110 to fix the position of said lens assembly 102, the lens assembly 102 being movable with the focussing ring 110 to enable the proper focussing thereof. The axial center of the lens assembly 102 is coincident with the optical path 92'.

The solenoid operated masking assembly 106 operates to mask the field of the photoconductor portion during exposure to limit the maximum exposed area to a standard frame size for microfilm images (11 mm×15 mm). Not only does said masking assembly assure the proper image or frame size, but precludes undesirable background fog between images on the length of film which can be caused by unwanted photoconductor discharge during exposure. The masking process is carried out by contacting the photoconductor surface 18 during exposure with a polyurethane mask fabricated to the appropriate frame size and mounted to a thin metal carrier, the actuation of which is electrically controlled by a solenoid.

The masking assembly 106 is supported on an angle bracket 118. The vertical arm 120 of angle bracket 118 is fixedly secured to the upper portion of plate 86 of housing 84. The horizontal arm 122 of angle bracket 118 supports the masking assembly 106. The masking assembly 106 comprises a solenoid mounting bracket 124 on which is secured solenoid Coil support 126. The solenoid coil 128 is seated on solenoid coil support 126 with pivot plate 130 resting upon the vertical walls 132 of said solenoid coil support 126. Outwardly extending lug 134 of the solenoid coil support 126 has one end of return spring 136 secured thereto while the opposite end of said return spring 136 is secured to the pivot plate 130. The armature 138 extends from the solenoid coil 128 to engage the pivot plate 130. One end 140 of carrier arm 142 is cantilever secured on the pivot plate 130, the opposite end 144 of said carrier arm 142 extends to a position at the photoconductor portion 18 and has mask 146 carried thereon, a protective ring 148 also being carried thereon. Solenoid cover 150 is provided pivotally mounted to the horizontal portion of the solenoid mounting bracket 124 via hinge member 152 and hinge pin 154. The mask 146 is biased against the photoconductor portion 18 when the solenoid coil is energized. The mask 146 is formed of polyurthane and, carried by the carrier arm 142, extends over the lens assembly 102. The extent of the projected image of the source document G which discharges the electrostatic charge on the photoconductor 18 is limited by the dimensions of the mask 146. When de-energized, the return spring 136 acts to return the pivot plate 130 to its normal condition and thus lowers the mask 146. The exposure duration is controlled by the shutter assembly 95 so that a latent negative charge image of the reduced image is formed on the image area of the negatively charged photoconductor 18. The latent charge image consists of negatively charged portions which have not been struck by light and discharged portions which have been neutralized when struck by light. When exposure is complete, the carrier disc 14 is step-rotated to place the latent image carrying photoconductor 18 at the liquid toning station 26 whereat the latent charge image is developed, i.e. made visible as the next step of the process to be performed by the microfilm camera/processor of the herein invention.

Reference is made to FIGS. 6 through 9F with respect to the description to follow of the toning station 26 and its operation for development of the latent charge image produced on the photoconductor portion 18 at the exposure station 24. The toning station 26 generally is located next adjacent the exposure station 24 between the latter and the drying station 28 adjacent to which is located the vacuum knife 30 and the liquid toner reservoir 32. Under conventional electrophotographic practice, toning or development of the latent charge image on a photoconductive member is effected by positioning the image carrier proximate to an applicator capable of distributing liquid toner to the photoconductive surface carrying said latent charge image. The liquid toner comprises a dispersion of minute pigment particles in an electrically insulating dispersion medium. Conventionally the development is effected electrophoretically, that is the pigment (toner) particles acquire an electrical charge of polarity opposite the polarity of the latent charge image on the photoconductor by virtue of their passage through the electrically insulating dispersion medium. The toner particles migrate toward the photoconductor surface and are attracted to the oppositely charged portions of the latent charge image and, hence, thereby render the said image visible. Generally, an electrical voltage bias of the same charge polarity as the toner particle is applied during such image development so as to inhibit the deposition of toner particles in non-image areas on the photoconductor surface. The result is generally described as a positive toning process, providing a positive image, that is a "print" image. In preparing microfilm, the toning process used is referred to as a "repulsion toning process", where the toner particles are positively charged. The positively charged toner particles are attracted to the negatively charged portions of the latent charge image. In the "repulsion toning process", the electrical bias applied has a polarity which is the same as the charge on the photoconductor so as to drive the toner particles to those areas of the latent charge image which are charged. This results in a negative image such as results from photographic processing, said image being capable of projection and/or photographic duplication forming a "print" image.

Accordingly, the toner applicator has been described as a development electrode. In many applications, the development electrode is in the form of roller, the photoconductive surface being stationary and the applicator roller is rotated to apply the liquid toner dispersion thereto. In many applications, a planar development electrode is provided and the photoconductive surface, spaced a predetermined distance from said development electrode when brought in proximity thereto, is the recipient of the toner dispersion. Means are provided precisely to fix the distance from the development electrode surface and the photoconductive surface, this distance being termed the toning or bias gap. Again, the liquid toner dispersion is applied to development electrode surface and an electrical bias of predetermined voltage is applied between said development electrode surface and the photoconductive surface when the said surfaces are brought into close proximity. Accordingly, the development electrode has been described as the "bias" plate. The volume of liquid toner dispersion is small and the liquid toner spreads over the bias plate surface generally by capillarity to cover same.

Under most circumstances, only a single bias plate has been conventionally employed. However, disadvantages are encountered since relatively considerable time is expended to effect the development of the latent charge image, requiring a duration where the processing of plural images is delayed by the requirement that a static or non-transport of the photoconductor surface portions exists during the toning process before the effective toning is completed. This slows down the process and, therefore, reduces the throughput of the apparatus. Further, there is substantial limitation of available space for accommodating the various functional stations. Accordingly, in view of the desired increased throughput desired for microfilm production and the time required to complete the toning process, plural bias plates were believed necessary. Providing for such expedient had not been experienced heretofore, particularly with the limitation of space in the situation at hand. Difficulties also are encountered in delivering the liquid toner from a source to the development electrode in the amount and condition adequate for the toning process. In addition, there is the problem of adequate removal of excess dispersion medium, the latter being conventionally a isoparaffinic hydrocarbon such as sold under the trademark ISOPAR by the Exxon Corporation.

These problems were solved by the construction and operation of the toning station 26 employed in the microfilm camera/processor 10 of the herein invention and described hereinafter. A key feature of said toning station 26 is the employment of a pair of bias plates (development electrodes) used alternately, the provision of means for presenting said bias plates to the latent image carried by a pair of adjacent photoconductor portions alternately with means provided for applying sufficient liquid toner to each, removal of excess liquid toner from the development electrode surface when the toning process is completed as well as applying and controlling the electrical bias applied during said toning process so that proper toning is effected, assuring an increased throughput at least at this critical stage of the imaging process.

In the description to follow, the construction and operation of a single bias plate (development electrode) shall be described with the recognition that operation of the second bias plate will be 180 degrees out of phase with that described.

The toning station 26 includes a development electrode module 160, including a pair of side by side arranged bias plates 162 and 164 supported on respective bias plate carriers 168 and 166 arranged for selective movement alternately along adjacent paths through an outermost position relative to the photoconductor portion carrying the latent charge image to be toned to an inner most position and thence, to an intermediate position immediately below and aligned with said photoconductor portion which carries the latent charge image to be toned. The module 160 also includes guide means generally represented by reference character 170 defining the path followed by the respective bias plates, and first and second support members 172 and 174, support 172 carrying the guide means and support plate 174 carrying the bias plate members 162 and 164 seated in bias plate carriers 166 and 166. The respective guide means 170 includes guide rods 180 and 182 arranged for movement within sleeve members 184 and 186, respectively, which are mounted between bearing block 188 and the outer bearing blocks 190 and 192.

The development electrode module 160 further includes gap defining means 194 adapted to set and to maintain fixed, a precise adjustable gap between the respective bias plates and the photoconductor surface at the toning position of said bias plates. Electrical connection means 195 are provided to establish electrical connection with the bias plates. The toning station 26 additionally provides toner feed means 196 for delivering liquid toner to the surface of the respective bias plates 162 and 164 when they are positioned to receive same and in a controlled drop-by-drop delivery manner. Wiper means 198 also are provided for clearing from the surface of the bias plates, any liquid toner which may have remained thereon subsequent to the completion of the toning process. A drip tray 200 is provided to catch any excess liquid toner delivered to and wiped from the bias plates.

A bridge-like formation 202 is provided which functions as a carrier for the wiper means 198 and the toner feed means 196. The formation 202 is defined by vertically oriented, parallel side plates 204, 206 secured on opposite sides of the main support member 174 and extending along the main support member 174 from the intermediate position of the bias plates through the outermost or toner loading position of the bias plates. A top plate 208 functions as the connecting bridge between said side plates 204, 206 and a stabilizer plate 210 is secured as a brace below the top plate and between said side plates. The top plate 208 has a rearwardly opening notch 212 which exposes the toner delivery area, and a toner feed solenoid 214 is mounted on said top plate 208 at a suitable passage 216 formed therein and extends inward, toward the bias plates 162,164. The toner nozzle 218 is operated so that liquid toner is delivered from the delivery end 218' of nozzle 218 to each bias plate alternately when the respective bias plate is at the toner loading position.

A raising and lowering mechanism 220 is provided for raising and lowering the respective bias plates 162,164 between raised toning condition when the bias plate is closely proximate the photoconductor surface carrying the latent charge image and parallel thereto, and lowered condition to enable loading of the liquid toner upon the bias plates. The bias plate which is at the toning condition relative to the photoconductor surface is moved to its outermost condition subsequent to completion of the toning process while still in the raised condition. This tends to prevent possible hydrodynamic disruptions of the wet toner image on the photoconductor surface, the result of which tends to mar the toned image. One problem associated with bringing two flat, parallel surfaces separated by a liquid into close proximity is the tendency to entrap small air bubbles. In order to overcome this source of potential image artifacts, which would mar the reduced image, an intentional wedge formation or shim (not shown) is inserted beneath the bias plate so as to provide a very slight tilt of said bias plate along its longitudinal axis, i.e. the long dimension thereof. Such shim has been found preferably to be approximately 0.003 inches in thickness.

The wiper means 198 includes a flexible squeege blade member 222 which is mounted on U-shaped carrier member 224. Release springs 226 and release buttons 228 are provided for securing the blade member 222 onto the carrier member 224, the release springs being employed when the blade 222 is to be removed for replacement. The blade member 222 is positioned at the outer end of the bias plates relative to the position thereof assumed during the toning process, said blade member 222 disposed over the surface of said bias plate. The blade member 222 is operated between a normal position rotated with the squeege edge thereof spaced from the surface of the bias plate to a disposition with the squeege blade edge engaged therewith. The rotation of said wiper blade member 222 is controlled by wiper solenoid 230 coupled to the wiper carrier 224 by coupling 232, the solenoid being mounted to the side plate 206 by mounting 234. When the toning process is completed, the squeege edge 222' is brought into bearing engagement with the surface of the bias plate concerned and the said bias plate is translated to its outermost position so that any liquid toner retained on the surface thereof is swept to the drip tray 200. The squeege blade edge 222' is maintained against said bias plate surface while the said bias plate is translated therepast and is released therefrom via operation of the Solenoid 230.

Translation of the respective bias plates through the outermost position, the toner loading or delivery position and the intermediate toning position is controlled by bias plate drive means 236 including drive motor 238 operating a gear assembly (not specifically illustrated but contained within gear box 240), said gear assembly being controlled by cam assembly 242 coupled thereto by drive shaft 244. Precision movement of the bias plates is controlled by the motor brake relay means 246 mounted on bracket 248.

The bias plate carriers (holders) 166 and 168 each include gap defining or positioning assemblies 250 mounted to the insulated carrier 252 engaged on the main support member 174. The bias plate carrier 168 includes peripheral raised guide rail 254 to which is coupled for limited pivotal movement, gap positioning assembly 256 having gap roller 258 located at its free end 260, the position of which is defined by gap adjustment screw 262 (which is fixed by gap locking screw 264). Engagement of roller 258 on the surface of the photoconductor 18 determines the "toning" gap between said surface and the respective bias plate, i.e. serves to limit the maximum position to which the bias plate can be raised.

The raising and lowering mechanism 220 controls the vertical positioning of the bias plates 162 and 164 and includes a vertically oriented actuator plate 266, carrying upper position adjustment screw 268 carrying adjustment block 269 seated on crank arm 270, said crank arm 270 being pivotally mounted to the actuator plate 266 as shown at 272. The opposite end 294 of crank arm 270 carries crank pin roller 276 having shaft 278 thereof ridable within vertical timing slot 280 formed in the actuator plate 266. A bias plate movement adjustment clamp 282 is secured to actuator plate 266 along the top edge of said plate 266. A vertical positioning spring 284 is secured to said clamp 282 with its opposite end 286 secured to the crank arm 270. The opposite end 288 of the crank pin 276' is secured to the crank wheel 290 spaced inwardly of the outer periphery thereof. Upwardly opening notch 292 is formed at the free end 294 of crank arm 270 and seats the crank pin 276' of roller 276, rotation of movement of the crank arm 270 effecting movement of the pin 276' within the timing slot 280. Plural adjacent microswitch mounting blocks 296 are positioned adjacent cam stack 242, and each said block 296 carrying microswitches 300, one block 296 and microswitch 300 being provided for each cam 302 of the stack 242, the arm 304 of each microswitch 300 being received within a suitable notch 306 formed in the outer circumference 308 of each cam 302. The cams 302 are coaxial with a single cam shaft being seated through said adjacent cams 302. Actuator plate lift arm 310 is mounted for rotary pivotal movement about pivot 312, one leg 314 of the lift arm 310 carrying the bias plate lower position adjustment screw 316 secured thereto and to block 318 at a location adjacent the free end 320 thereof. The actuator lift spring 322 is seated compressed between the leg 314 and the block 318. Spring 322 is weaker than spring 284. The circumferential notch 306 is located at a different location angularly different from cam to cam, each notch opening outward and receiving an arm 304 of a microswitch 300 of the microswitch array.

It should be noted that the wiper and nozzle carrier 202 as a unit is pivotable about pivot point 330 and carries a pivot stop pin 332 for limiting the open condition of the carrier 202. The main support plate 174 carries stop pin 334 for seating the wiper and nozzle carrier in its operational or closed condition. The said carrier 202 is pivoted outward to enable the photoconductor carrier disc 14 to be mounted and demounted. Closure spring 331 maintains the raised position of the wiper and nozzle carrier 202.

Figure 9:
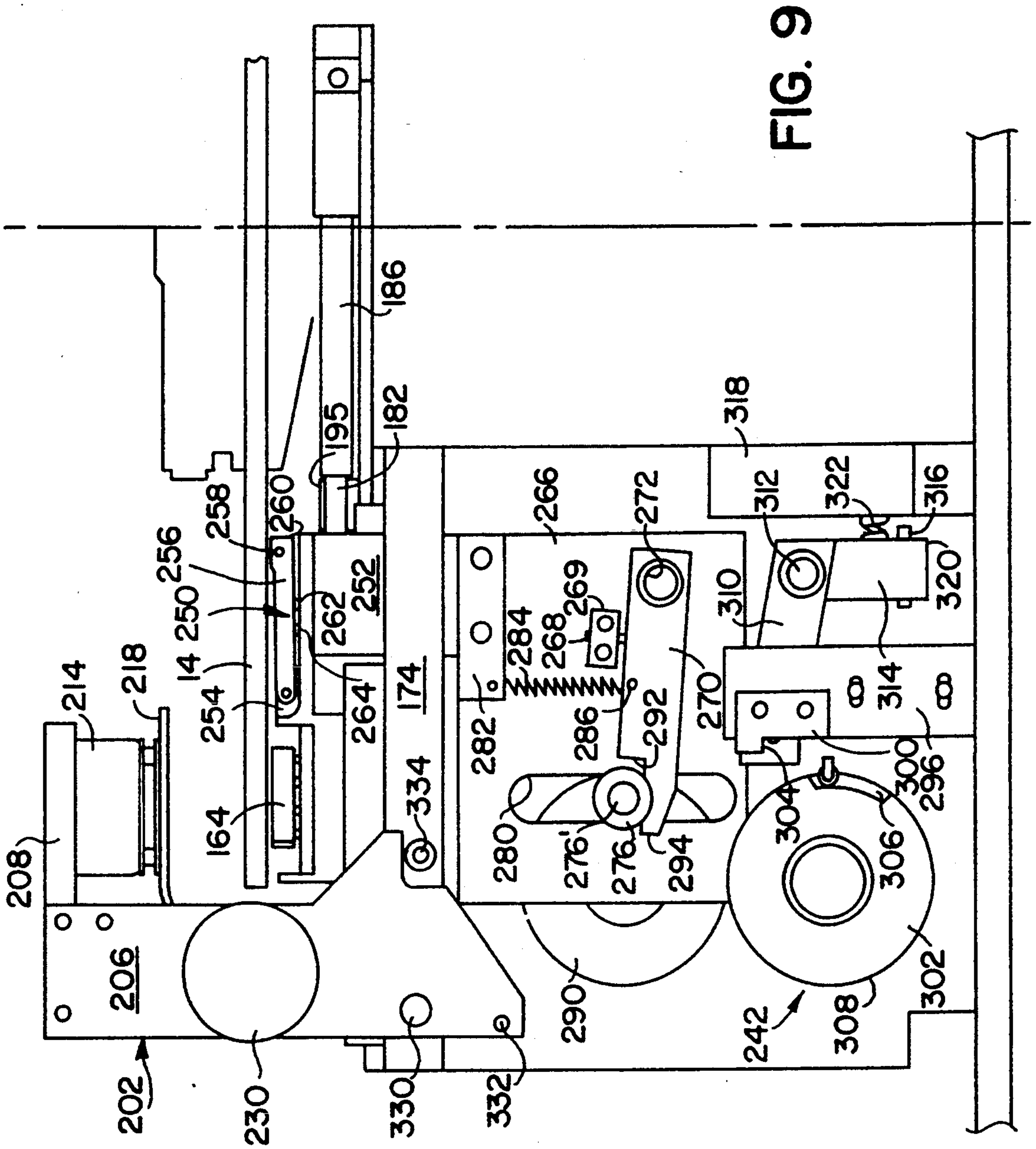
FIGS. 9 through 9F are diagrammatic elevational views of the toning station as illustrated in FIG. 8 showing the stages in the operation of said toning station, portions being omitted to facilitate the description of the toning operation.
Figure 9A:
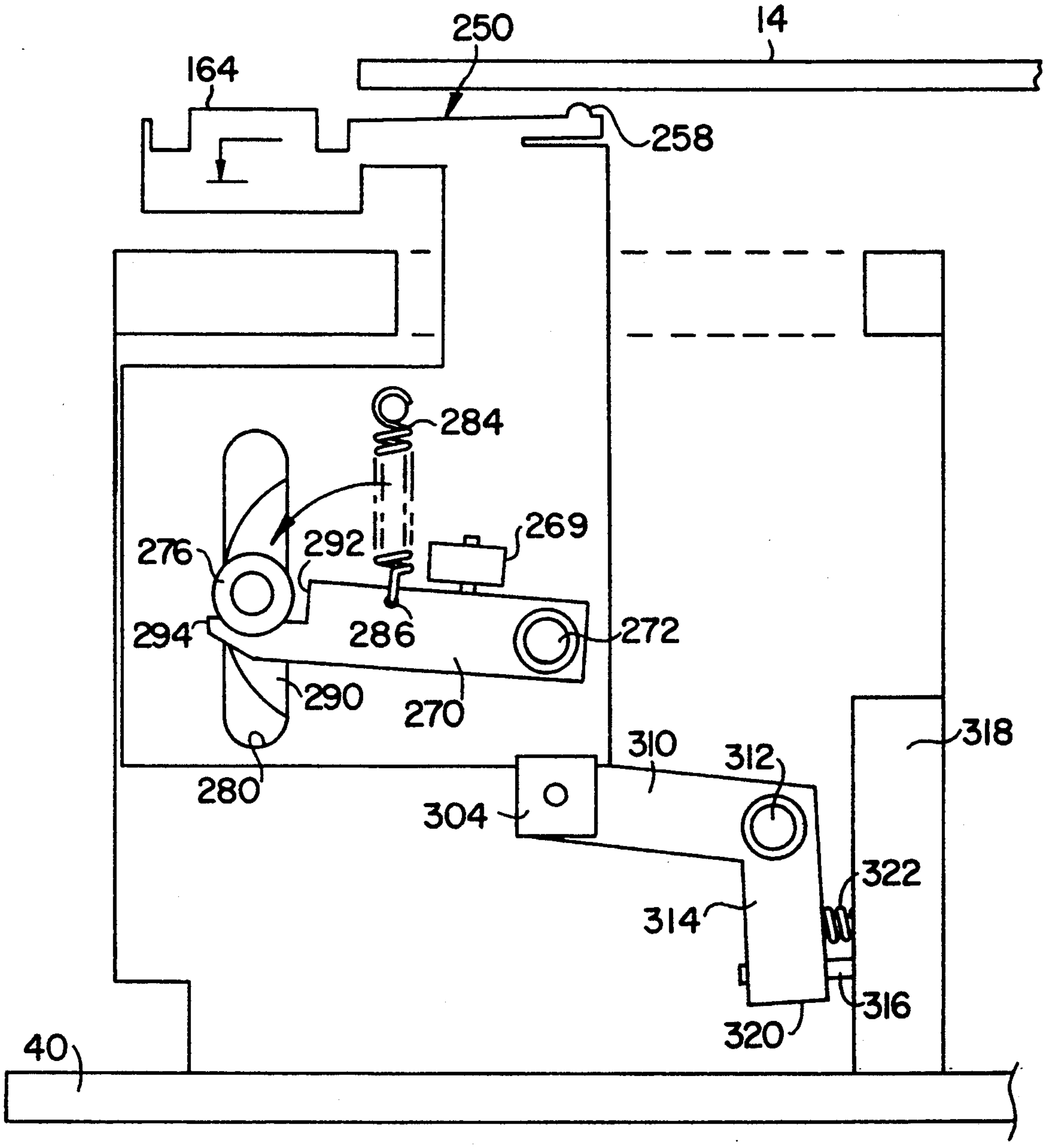

Attention now will be directed to describing the operation of the toning station 26, referencing FIGS. 9A through 9F. The description of the operation of the toning station 26 begins with the development electrode module 160 positioned with bias plate 162 located immediately below the photoconductor surface 18 in condition to effect the toning of a portion thereof carrying the latent charge image which has just arrived in proximity to the bias plate 162 subsequent to exposure to the projected reduced image of the source document G. In FIG. 9A, the bias plate 164 and carrier 166 is illustrated in disposition assumed immediately subsequent to completion of the toning process in which the bias plate 164 was actively involved. This position can be described at its outermost extent of its path, the guide rod 182 being fully extended (not shown in the referenced FIG.). The gap defining means 194 extends beneath the photoconductor 18. The bias plate 164 and its gap defining means 194 is in the lowered condition, the gap roller 258 spaced from the photoconductor 18 and the bias plate 164 being fully out from underneath the carrier disc 14. Arrow 238 in FIG. 9A indicates the movement that has just taken place to reach the illustrated position of the bias plate 164. Co-incident with the movement of the bias plate 164, is the movement of the crank pin roller 276 (approximately half-way along the timing slot 280), forced by rotation of the crank wheel 290, said roller 276 acting on the crank arm 270 to force same downward as the crank wheel rotates (see arrow 338). The motion of the crank wheel 290, the crank pin roller 276 and the crank arm 270 is halted at the position illustrated in FIG. 9A by the signal of the microswitch for one of the cam members 302 of the cam stack 300.

Figure 9B:
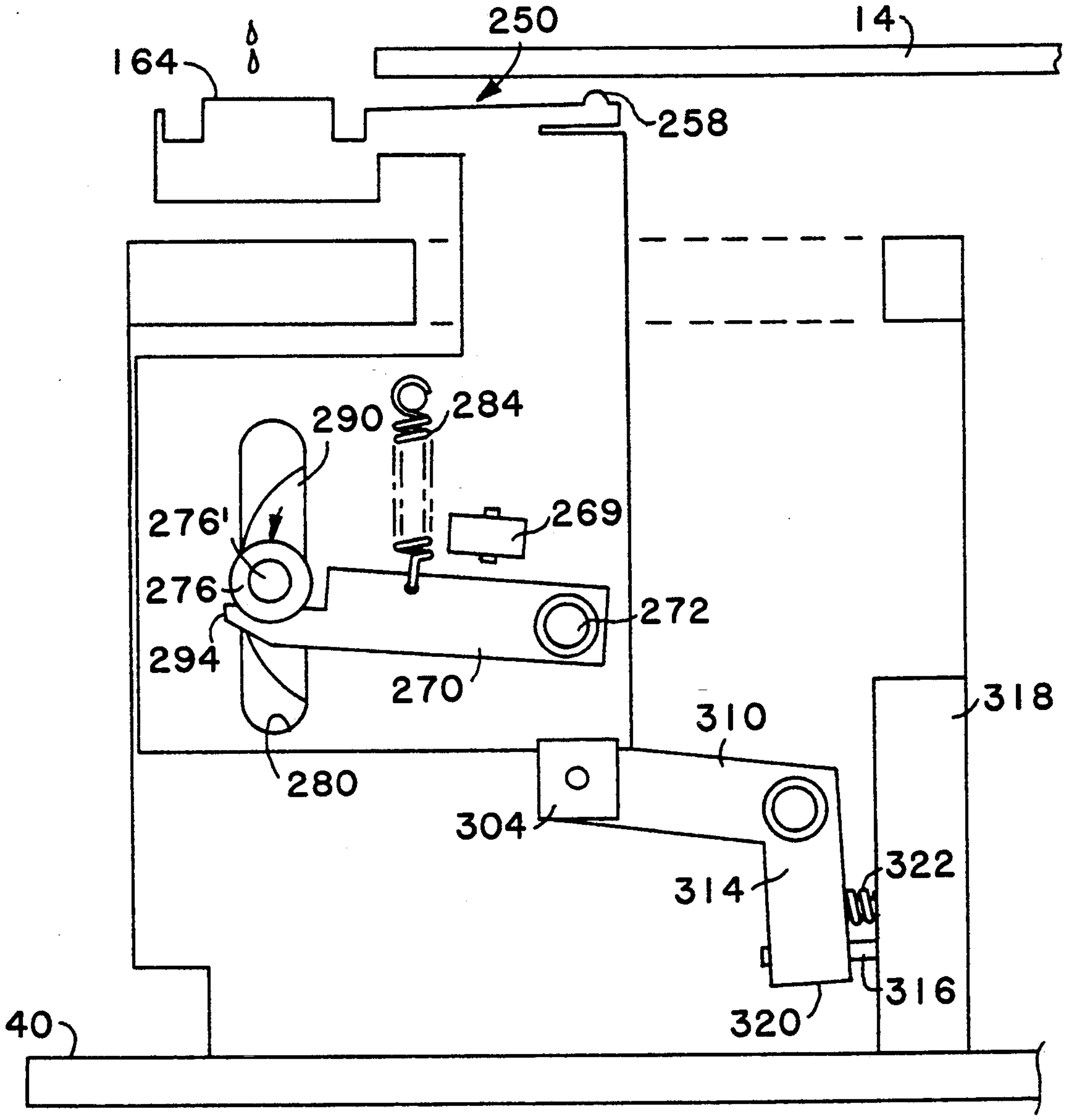

A signal from the control means (computer) for the camera/processor causes rotation of the cam stack 300 until the microswitch of another of the cams 302 indicates that the said motion is complete. At this time, the bias plate 164 receives toner (drop-wise as indicated by reference character 340), said bias plate 164 not having moved appreciably from its position illustrated in FIG. 9A to the position represented in FIG. 9B. This limited movement to the static position represented in FIG. 9B is due to the almost completely tangential movement of the crank pin roller 276. As shown in FIG. 9B, the crank arm has left its initiate or home position against the bias plate upper position adjustment screw 268 and has extended the vertical positioning spring 284. The actuator plate lift arm 310 has remained static . . . unmoved.

Figure 9C:
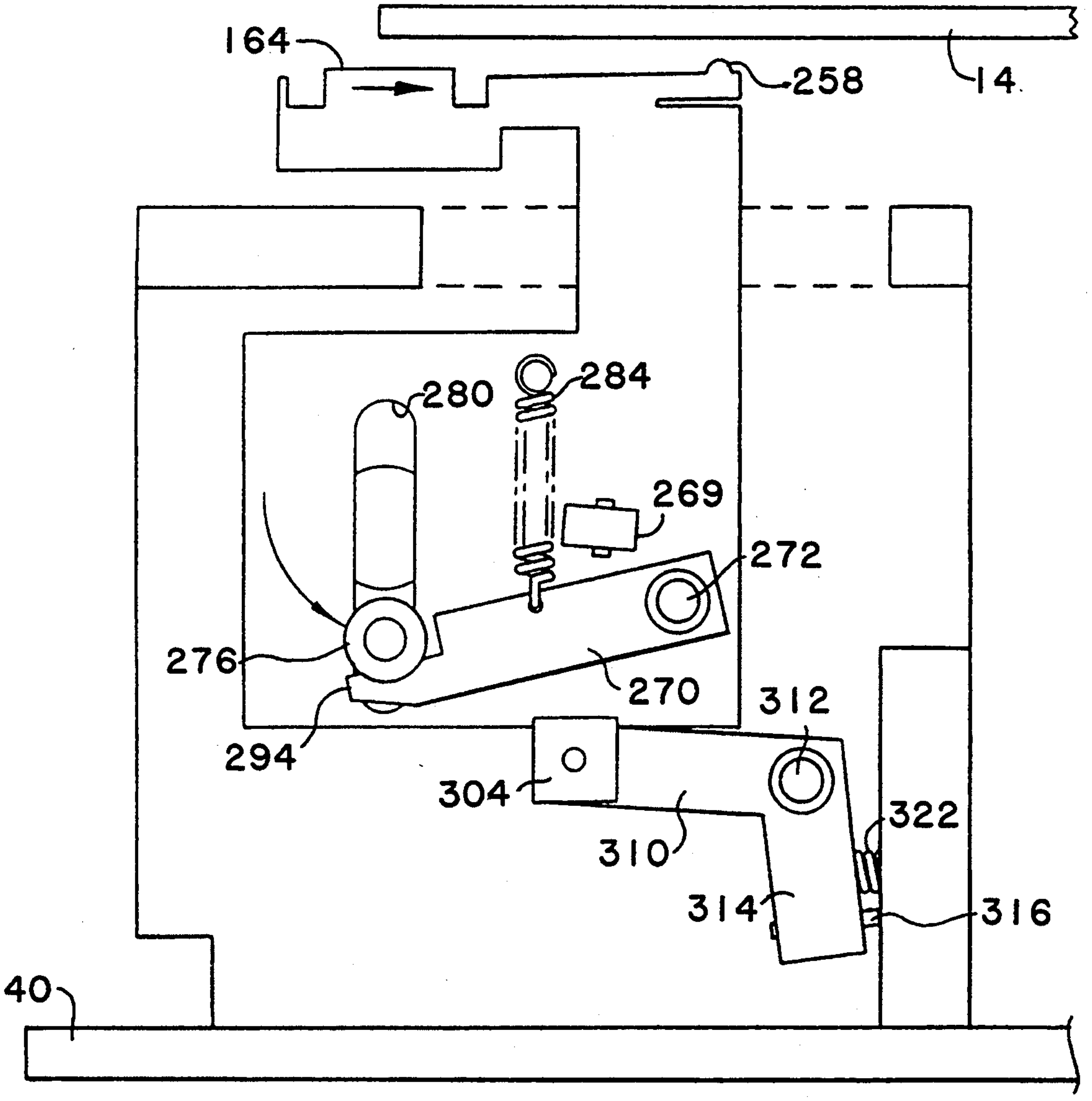

Referring to FIG. 9C, the bias plate 164 is shown being moved inward relative to the axis of the carrier disc 14 (see arrow 342), on its path toward assumption of a disposition immediately below the photoconductor portion carrying a latent charge image. The crank wheel 290 has been further rotated (see arrow 344) causing the crank pin roller 276 to reach the lower end portion 280' of timing slot 280, said roller 276 bearing against the actuator plate 266 which carries said slot 280. The rotation of the crank wheel 290 caused the roller 276 to bear against the free end 294 of crank arm 270, further extending vertical positioning spring 284. Since the vertical positioning spring 284 is stronger than the actuator lift spring 322, at any instance when said spring 284 is extended, the actuator plate lift arm 310 is disposed at its fully downward position, limited by the bias plate lower position adjustment screw 316.

Figure 9D:
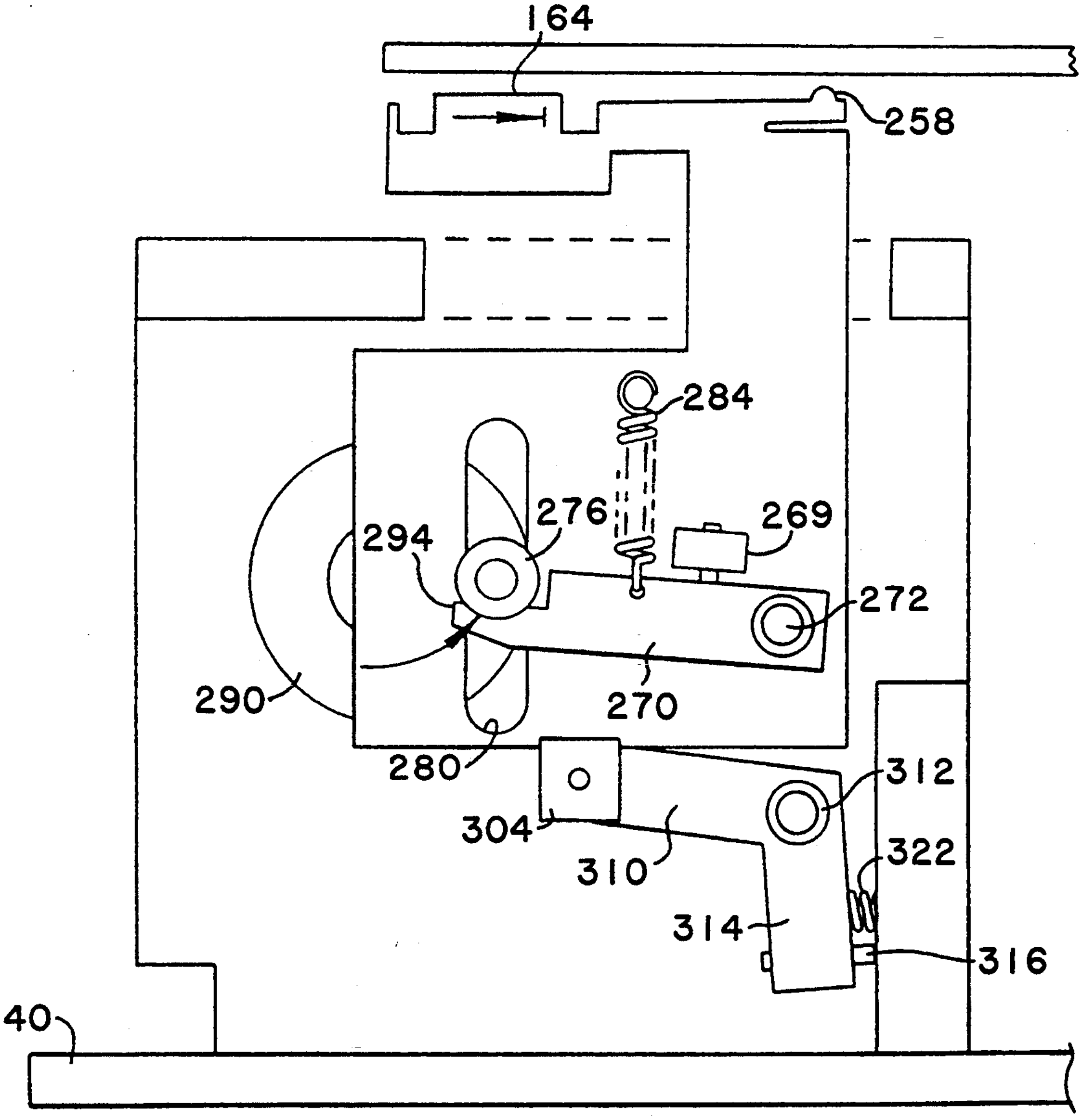

Now directing attention to FIG. 9D, further rotation of the crank wheel 290 causes the pin roller 276 to move the bias plate 164 along a path inward in the direction of the axis of carrier disc 14 while maintaining the lowered or down position of said bias plate 164, the arrow 346 showing the reaching of the toning position by bias plate 164. The subsequent vertical component of the crank pin roller 276 as a result of the rotation of the crank wheel 280 allows the crank arm 270 to rise (see arrow 348) de-extending the vertical positioning spring 284, the crank arm 270 coming to rest against the toning bias plate upper position adjustment screw 268. At this point, motion is stopped by the control means (computer) due to the signal from the microswitch of the cam 302 of the cam stack 300. At this time, the bias plate 164 is now positioned fully in beneath the photoconductor portion carrying the latent charge image. However, the bias plate 164 still is in its lower position (down).

Figure 9E:
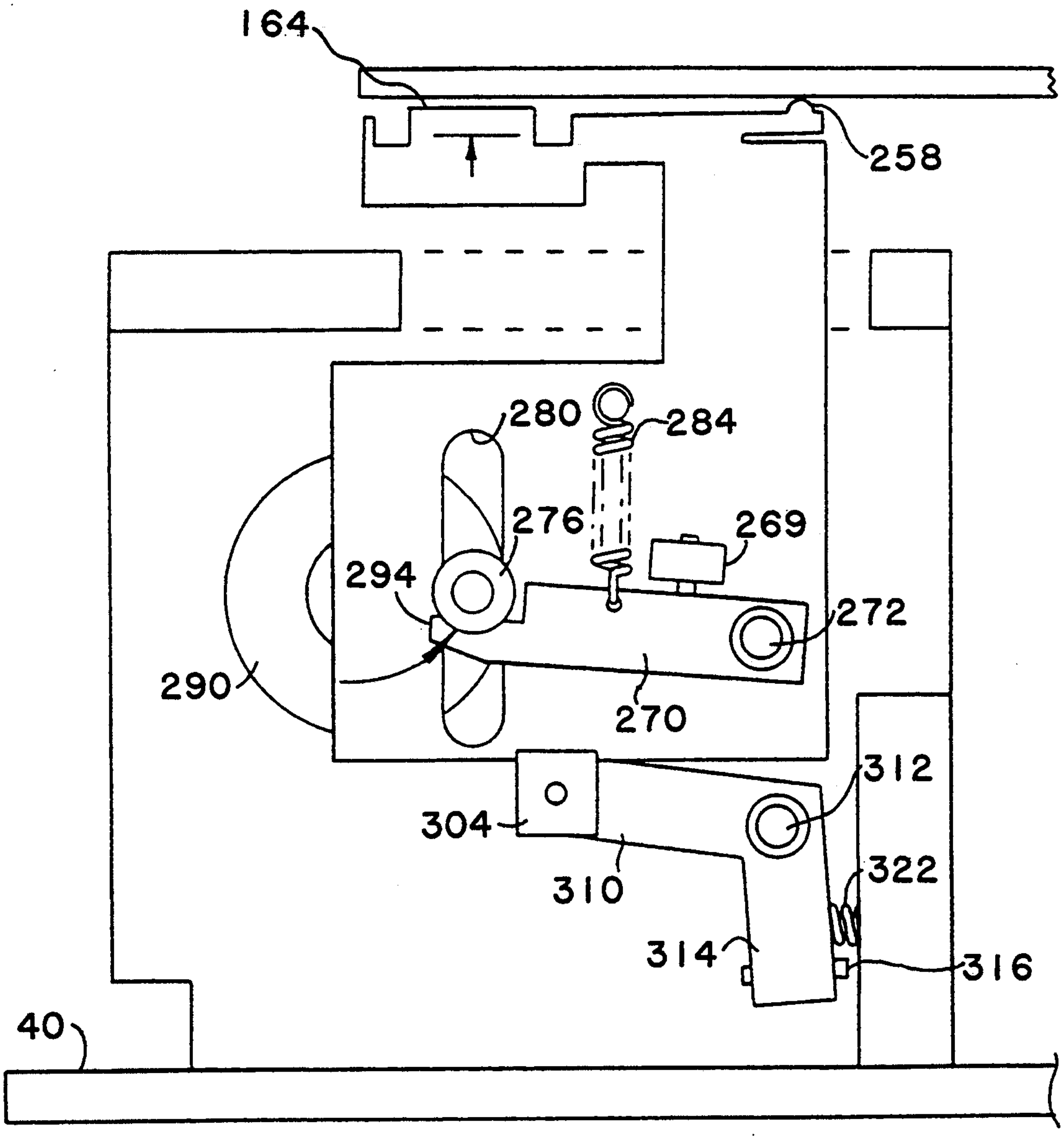
Figure 9F:
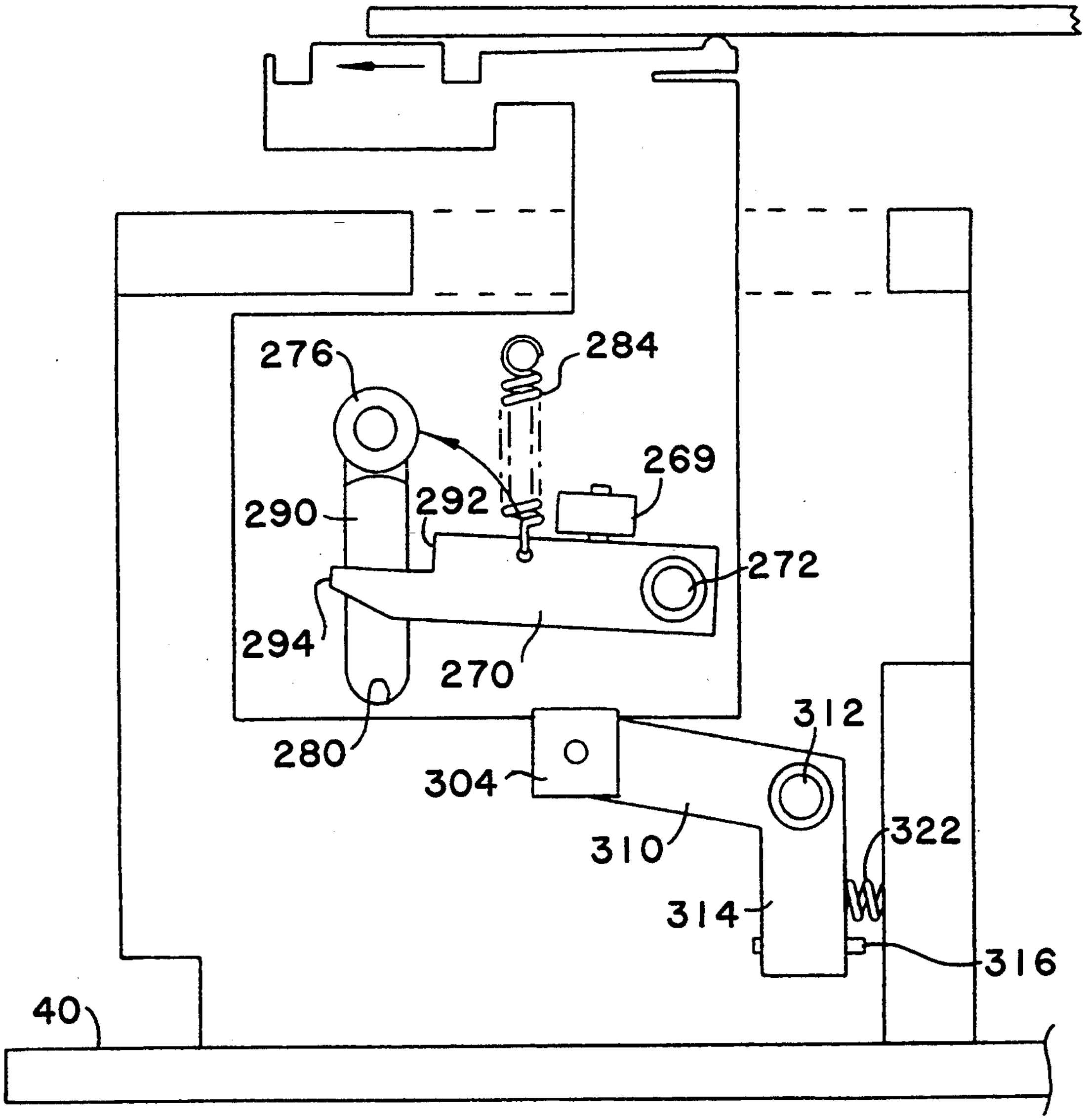
Figure 10:
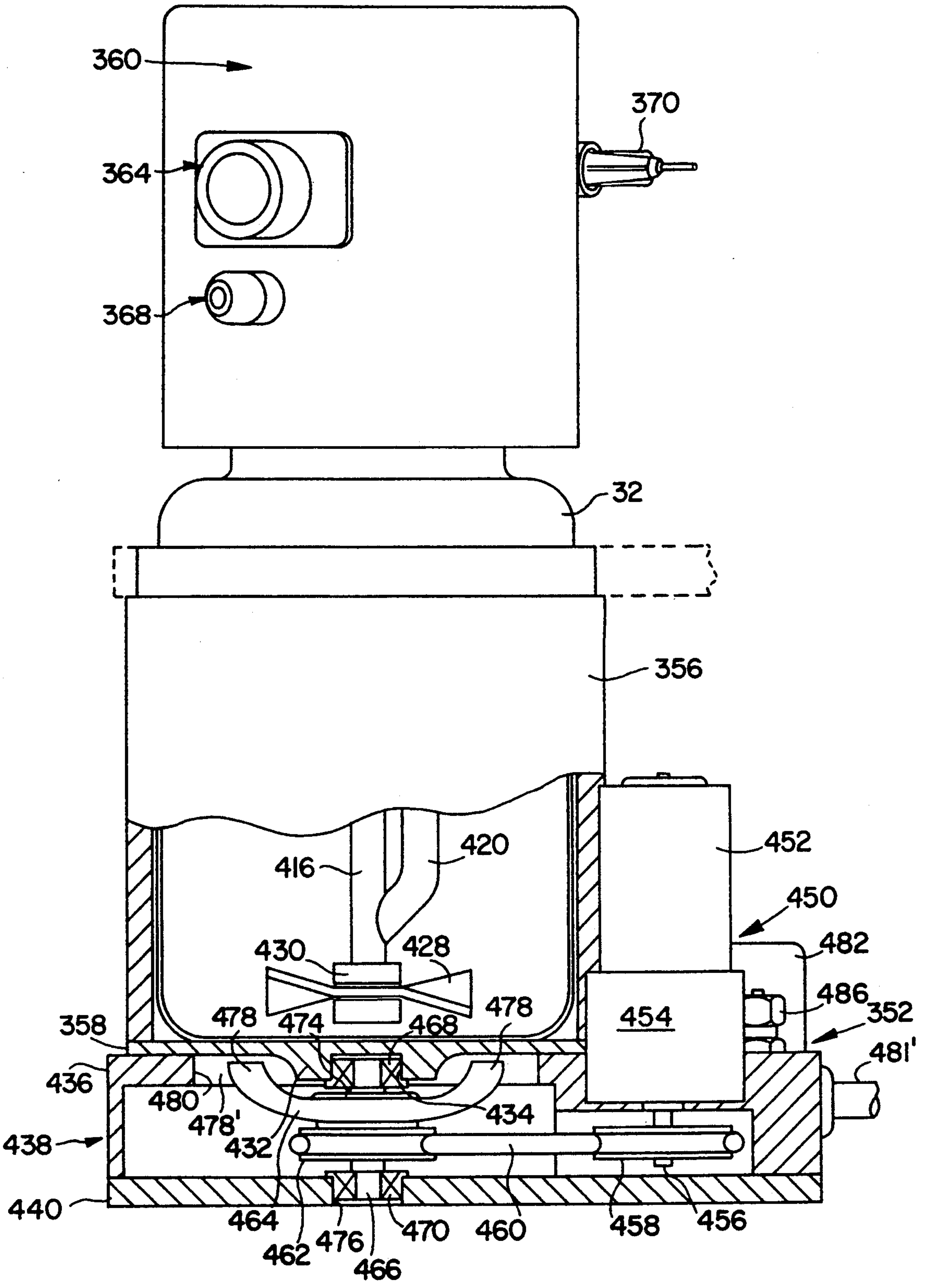
FIG. 10 is an elevational view of the toner reservoir and mixer unit of the microfilm camera/processor, portions broken away and portions being shown in section.

Referring to FIG. 9E, it will be noted that the small rotation of the crank pin roller 276 causes the said roller 276 to lift (see arrow 350) and allow the actuator lift spring 322 to rotate the actuator plate lift arm 310 about its pivot point and raise the module actuator plate 266. The bias plate 164 is raised to its toning position and is limited by the gap position roller 258. The motion is halted in the illustrated position of FIG. 9E by the signal of the microswitch for the cam 302 of the cam stack 300.

When the toning process is completed (after a lapse of a predetermined time duration), a signal from the control means (computer) advances the development electrode module to its last toning process step, i.e. to the initiate position of bias plate 164 as shown in FIG. 9A. The crank wheel 290 now rotates, rotating the crank pin roller 276 bringing it to the upper end of the timing slot 280, driving the bias plate outwardly from beneath the carrier disc 14. However, the gap position roller 258 continues to roll along the disc 14, maintaining the gap between the bias plate and the photoconductor surface, i.e. the carrier disc 14. Note, the bias plate 164 is not lowered. The outward motion continues with the crank pin roller 276 returning to the position held thereby in FIG. 9A, the bias plate 164 returning to its lowered condition. Of course, the bias plate 162 has been moved to its toning position. A like mechanism on the opposite side of the gear box 240 is operative on bias plate 162 with the same sequence but 180 degrees out of phase compared to the movement of the bias plate 164. During the movement of bias plate 164, the squeege blade 222 pivots at 223 and is drawn along the surface of the bias plate 164, clearing said surface of toner.

In summary, the toning process begins with one of the bias plates in full out condition relative to the photoconductor portion carrying the latent charge image, said "full out" condition being in outermost disposition relative the axis of the carrier disc and in down position relative to the plane of the photoconductor. Toner is then applied to the bias plate dropwise. The bias plate is then moved to full in position under the area to be toned. The bias plate then is moved to its up position establishing a predetermined bias gap by engagement of a preset roller (preferably formed of Nylon, a trademark of E. I. DuPont deNemours Co.) with the surface of the photoconductor. After a preset development time, the bias plate begins moving out from beneath the carrier disc while remaining in the up position and is not lowered until completely arriving at the fully out position. During its motion to the fully out position, the surface of the bias plate is wiped free of any toner.

During the entire sequence of events described above, a positive bias voltage is applied to the bias plate, said bias being responsible for the image reversed toning process which occurs. The bias potential is in the range of 20–25 volts d.c. in conjunction with a development time of 1 to 3 seconds. The bias gap employed in this embodiment is of the order of 0.005 to 0.015 inches. The bias plates 164 and 166 of the embodiment described herein are formed of nickel plated, polish steel measuring 0.50 inches by 0.75 inches, and may be described as development electrodes.

The liquid toner is supplied in a suitably resistent reservoir 32, here a container formed of polyethylene, onto which a delivery cap 360 is attached. The cap contains pneumatic means for pressurizing the reservoir interior for delivering the toner to the toner nozzle 218 and an electrical solenoid valve for controlling the duration of delivery. The reservoir 32 is located seated at the drying station 28 at which the vacuum knife 30 also is located. Also located at said drying station 28 is a mixer unit 352 with associated drive means 450 for keeping the liquid toner within the reservoir agitated so as to maintain a proper dispersion thereof. Attention is directed to the unique compactness of the camera/-processor and the highly unusual conservation of space achieved, some of which may be attributed to the arrangement of the drying station 28, the toner reservoir 32 and mixer therefor and the air distribution means and pressurized air feed provided at the drying station 32.

Figure 11:
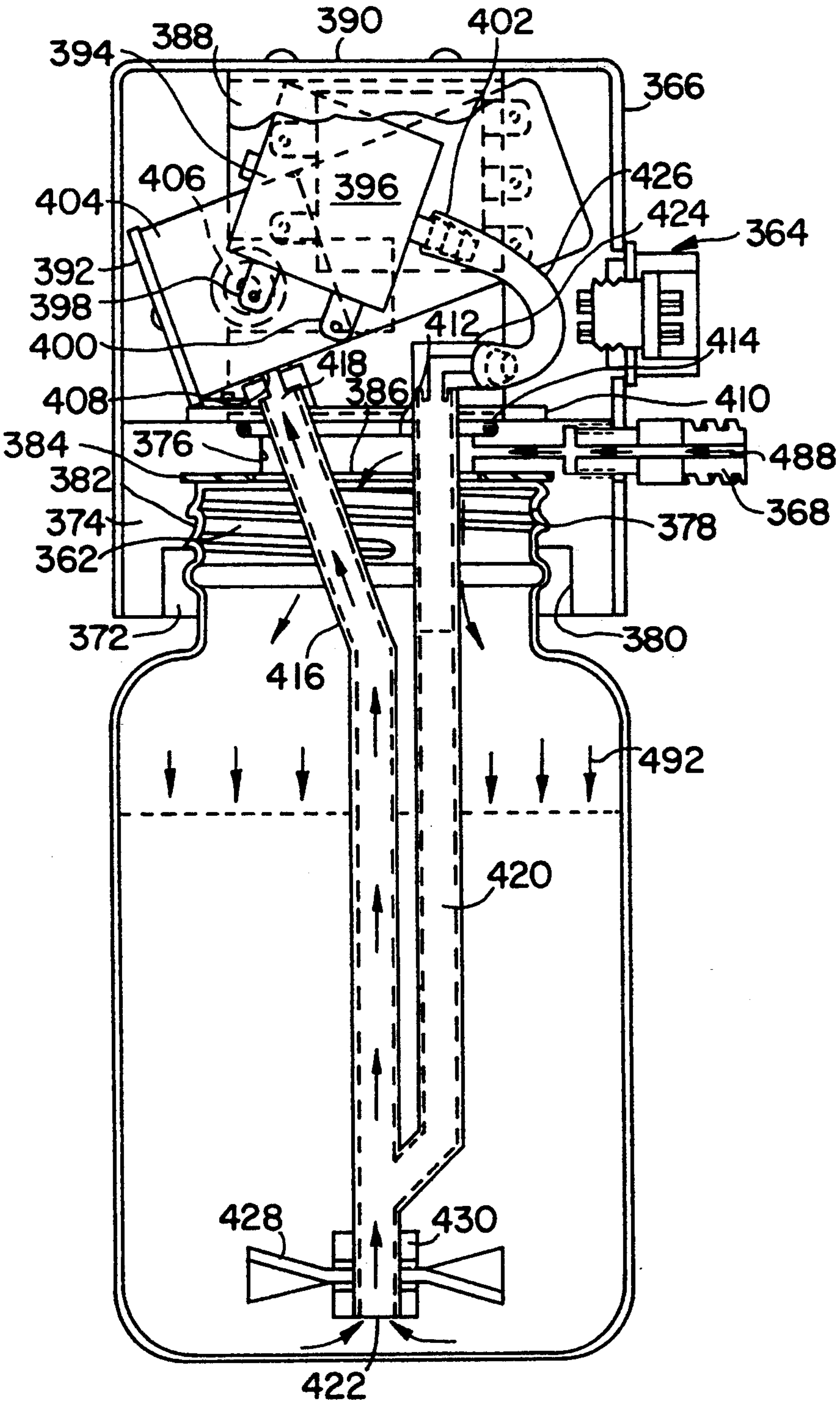
FIG. 11 is an elevational view of the toner reservoir and the cap therefore, portions being partially illustrated and other portions being shown in phantom line representation.
Figure 12:
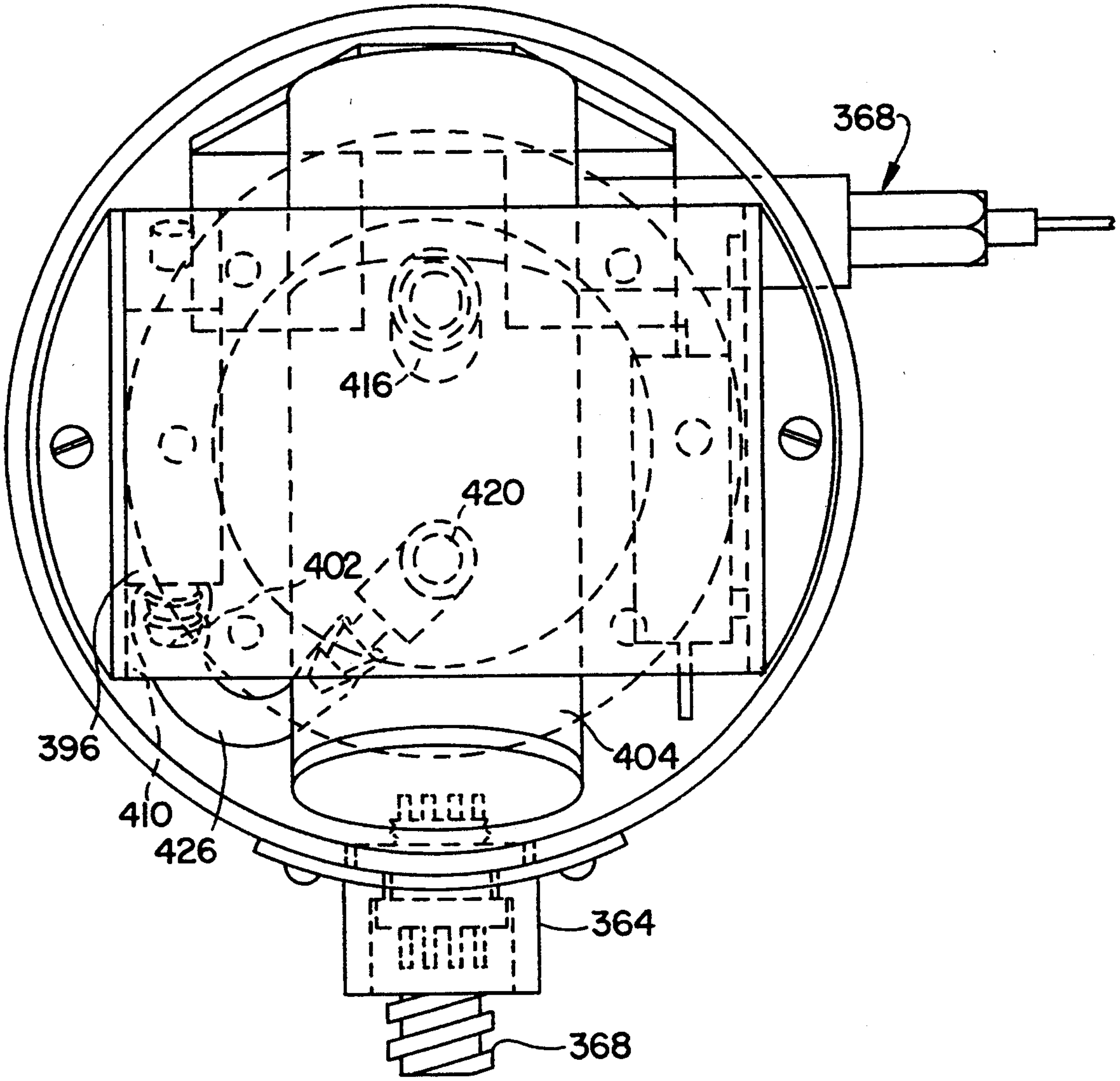
FIG. 12 is a top plan view of the toner reservoir cap of FIG. 11 portions being shown in phantom line representation.
Figure 13:
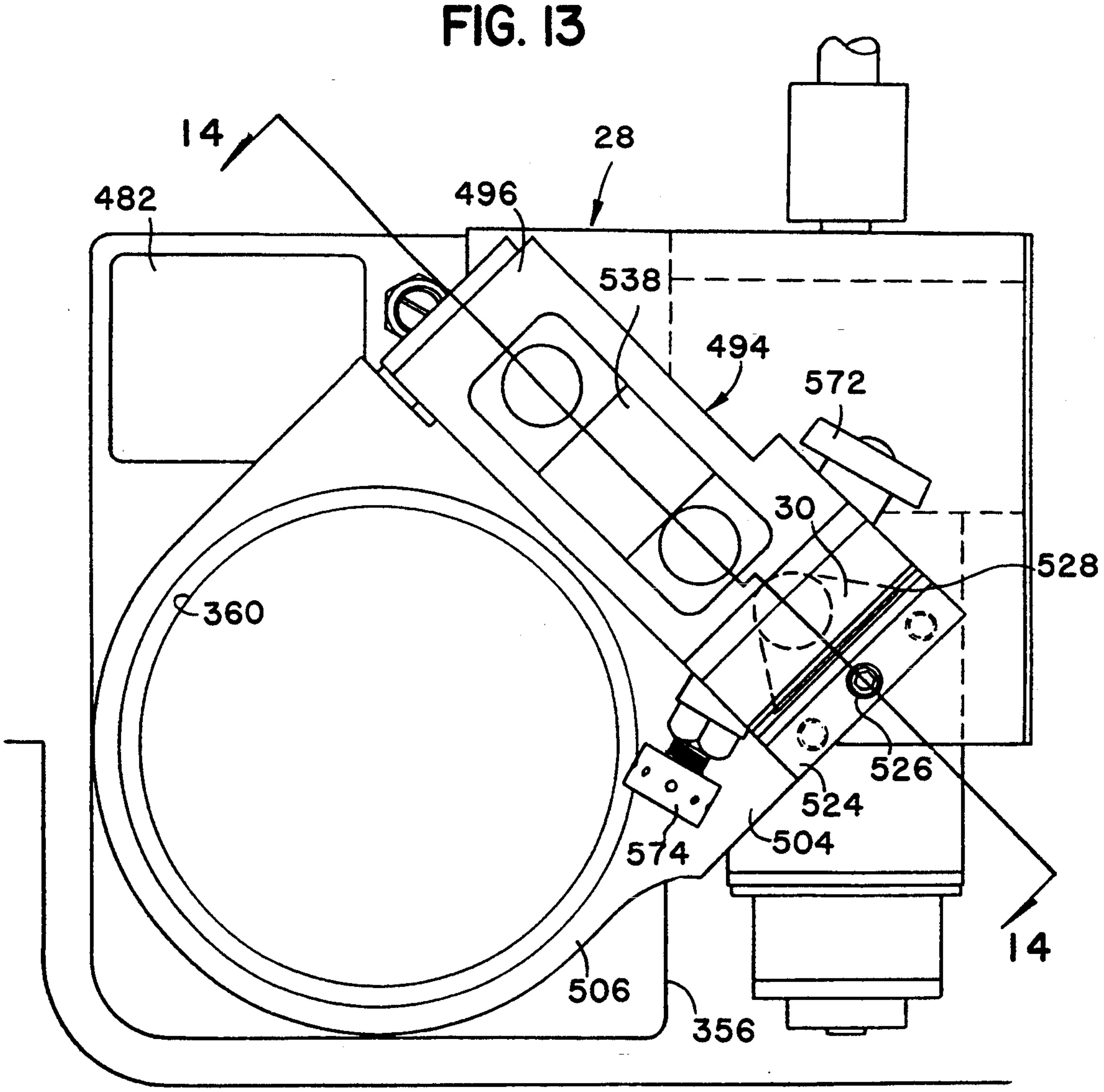
FIG. 13 is a plan view of the drying station of the microfilm camera/processor portions being shown in phantom line representation.
Figure 14:
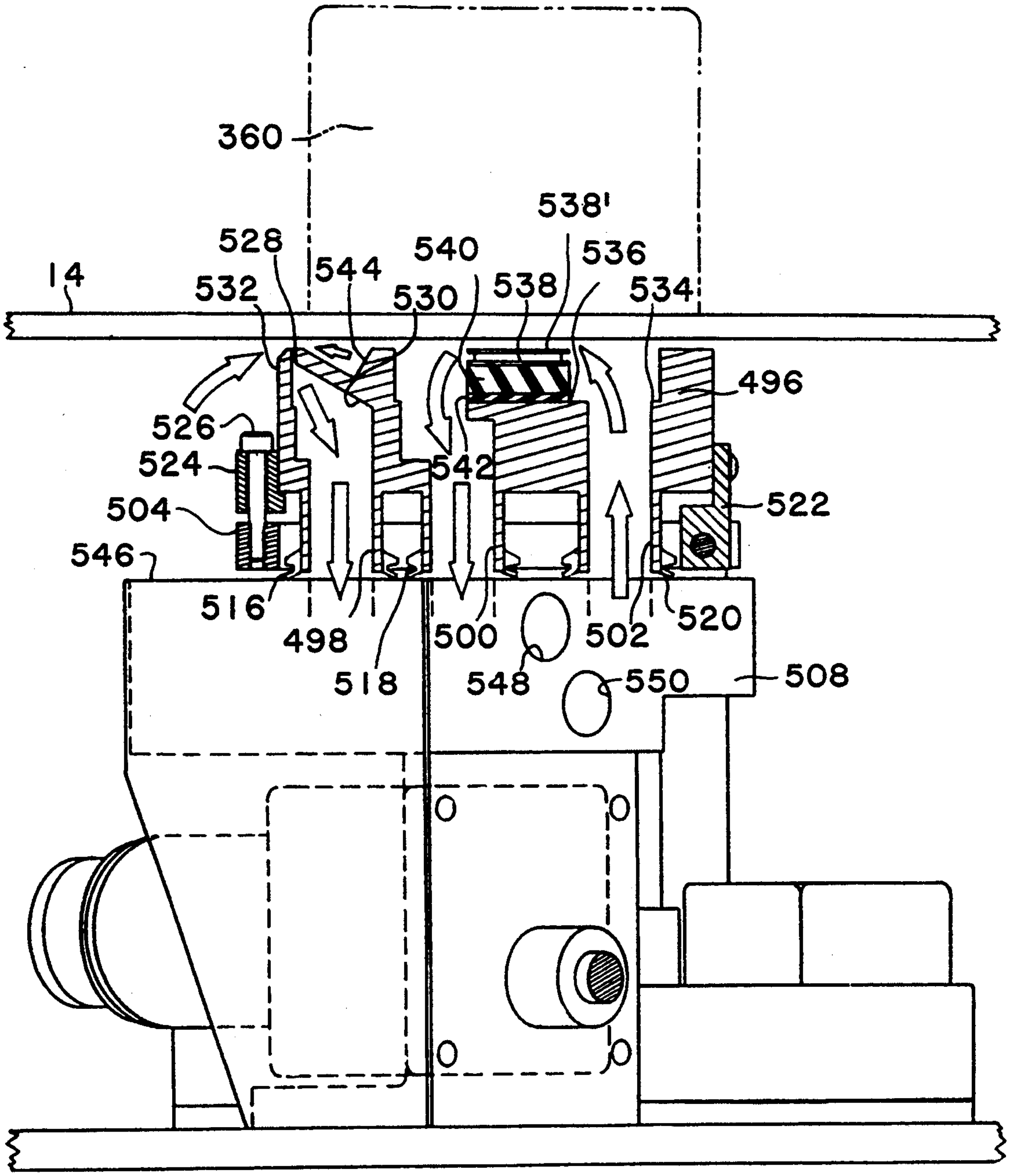
FIG. 14 is a partial diagrammatic sectional view along lines 14—14 of FIG. 13 as viewed in the direction of the arrows portions being shown in phantom line representation.

The reservoir 32 is seated within reservoir housing cylinder 356 provided with base 358. The reservoir 32 extends upwardly out of the housing 356 and a cap 360 is tightly seated threadably on the threaded neck 362 of the reservoir. Electrical connector assembly 364 is provided seated through the wall 366 of the cap. Air pressure supply connection 368 extends outward from the wall 366 of said cap as well as toner injection connection means 370 extending outwardly of the cap angularly spaced from the air pressure supply connection 368 and the electrical connector assembly 364. As shown in FIG. 11, the lower interior portion 372 of the cap 360 carries an stepped formation 374 having an inner passage 376, an intermediate, larger diameter passage 378 and a large diameter passage 380 opening downwardly when the cap 360 is installed on the reservoir 32. The inner wall 382 of intermediate passage 378 is threaded to mate with the threaded neck 362 of the reservoir. A sealing gasket 384 is disposed at the juncture of the inner passage 376 and the intermediate passage 378 and extends over the upper end 386 of the neck 362 so as to define a seal when the cap 360 is threadably engaged on said end. A pressure switch and relay mounting bracket 388 is secured to the cap 360 and depends from the top wall 390 of said cap into the interior thereof. Likewise, a solenoid valve mounting bracket 392 is secured within said cap. Pressure switch 394 and pressure switch solid state relay 396 are mounted on mounting bracket 388. Pressure switch 394 carries electrical terminals 398 and 400 and entry port nipple 402. The toner solenoid valve 404 is mounted on bracket 392 and is provided with toner delivery port 406 and toner entry port 408. Support plate 410 is seated on shelf 412 which surrounds the inner passage 376 of the cap 360. Resilient O-ring 414 provides a seal between the support plate 410 and the shelf 412. Toner delivery pipe 416 is coupled at its upper end 418 to the entry port 408 of the toner solenoid valve 404. The toner delivery pipe 416 has a pressure sensing pipe 420 coupled integrally to the toner delivery pipe 416 adjacent the lower open end 422 thereof and said pipe 420 extends parallel to said pipe 416, both pipes passing through the support plate 410. The upper end 424 of pipe 420 is coupled to the port 402 of pressure switch 394 by flexible pressure transfer tube 426.

The lower end 422 of the toner delivery pipe 416 carries magnetically driven impeller 428 secured thereto by bearing 430 for free rotation. The base 358 of the reservoir housing 356 includes a depending protrusion 432 provided with downwardly opening central cavity 434. The housing base 358 is seated on the top portion 436 of mixer drive housing 438, said mixer drive housing 438 being seated secured on mixer drive housing base 440. The mixer drive means 450 comprises a drive motor 452, motor drive gearhead 454, drive shaft 456, drive pulley wheel 458, drive belt 460, driven pulley wheel 462 and driven magnet assembly 464. The driven pulley wheel 462 is mounted on shaft 466, the ends of which are seated in ring bearings 468 and 470, magnet 472 being seated on shaft 466 and held in place by washers 474. Ring bearing 468 is seated in cavity 434. Ring bearing 470 is seated in passage 476 formed in base 440, said passage 476 being coaxial with cavity 434. The ends 478 of magnet 472 extend into ring cavity 478 defined by large diameter passage 480 formed in the top 436 of mixer drive housing 438. Transformer 482 and power supply cable 484 feed operating voltage to the drive motor 452. Transformer 482 is capable of converting 110 volts to deliver 12 volts for operation of drive motor 452. Adjustment nut means 486 is provided to regulate the speed of the drive pulley wheel 458.

Pressurized air is introduced to the interior of the reservoir from a pressurized air supply (not shown) by way of pressurized air input 368 (see arrows 488 illustrating the path of said pressurized air. The air pressure is exerted upon the upper level of liquid toner within the reservoir as illustrated by arrows 492. The pressurized liquid toner thus is forced into the open end 422 of the toner delivery pipe 416 and enters the toner solenoid valve 404. Pressure within the pressure sensing pipe 420 prevents liquid toner from entering said pipe 420, toner pressure being sensed by pressure switch 394 and solid state relay 396.

Since the liquid toner employed consists of a component pigment dispersed in an isoparaffinic hydrocarbon insulating medium, such as Isopar (a trademark of Exxon Corporation), the reservoir 32 must be formed of an Isopar resistent material such as polyethylene, and, preferably, pre-prepared and introduced into the housing 356 as a unit. The air required to pressurize the interior of the reservoir for feeding the liquid toner to the bias plates 162,164 may be furnished by a small diaphram pump (not shown) mounted in the cabinet B. As discussed above, the volume of air delivered and the pressure of same are controllable so that a constant pressure is maintained within the reservoir 32. In this way, regardless of the level of liquid toner within the reservoir, the precise control of the period of time during which the toner solenoid valve is open and by providing a well defined, controlled and constant orifice, metering of the toner feed accurately and repeatably, enables the exact amount of liquid toner to be fed dropwise to the respective bias plate 162, 164.

Figure 15:
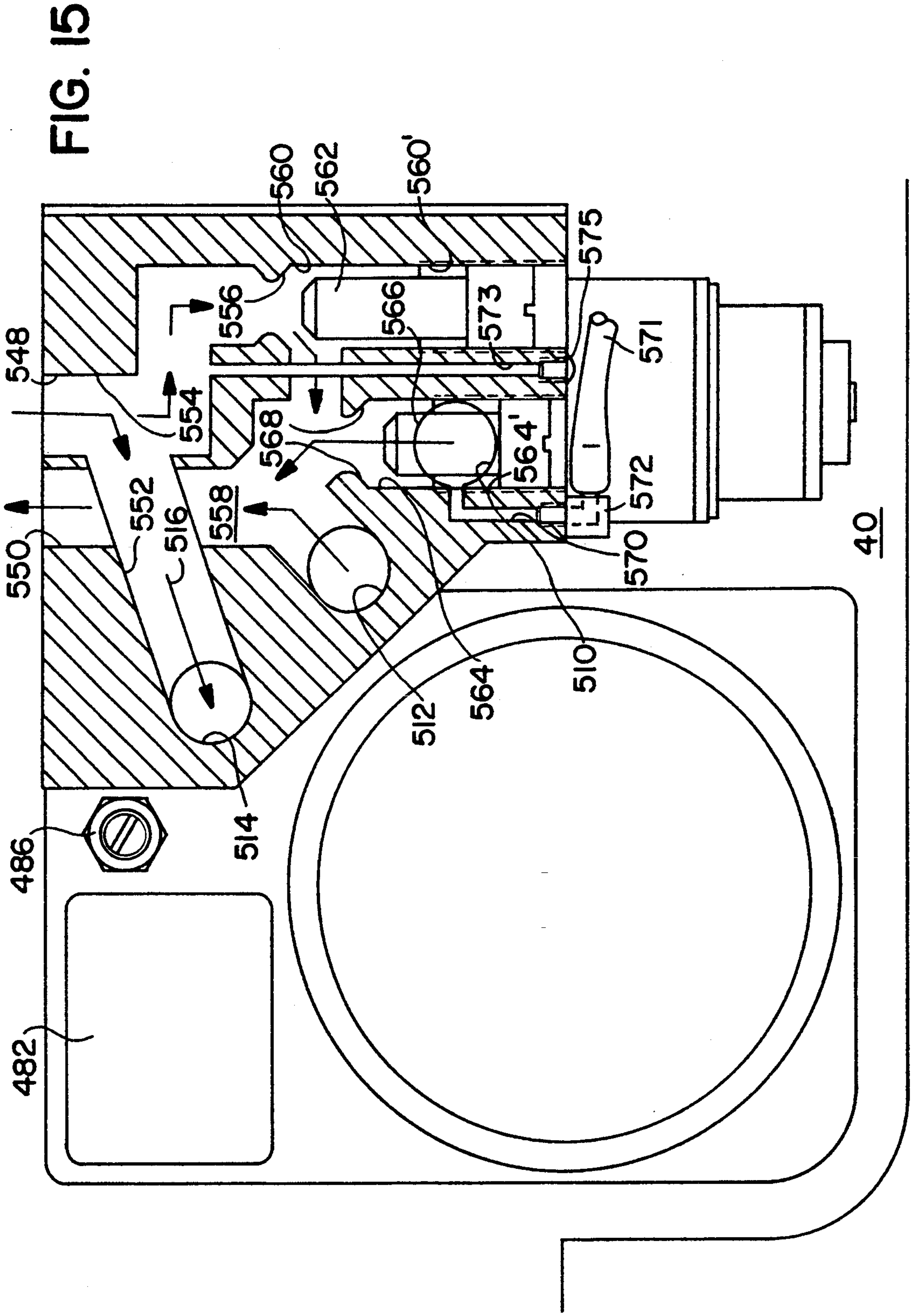
FIG. 15 is a diagrammatic horizontal sectional view of the air distribution valve assembly of the drying station portions shown in plain view.
Figure 16:
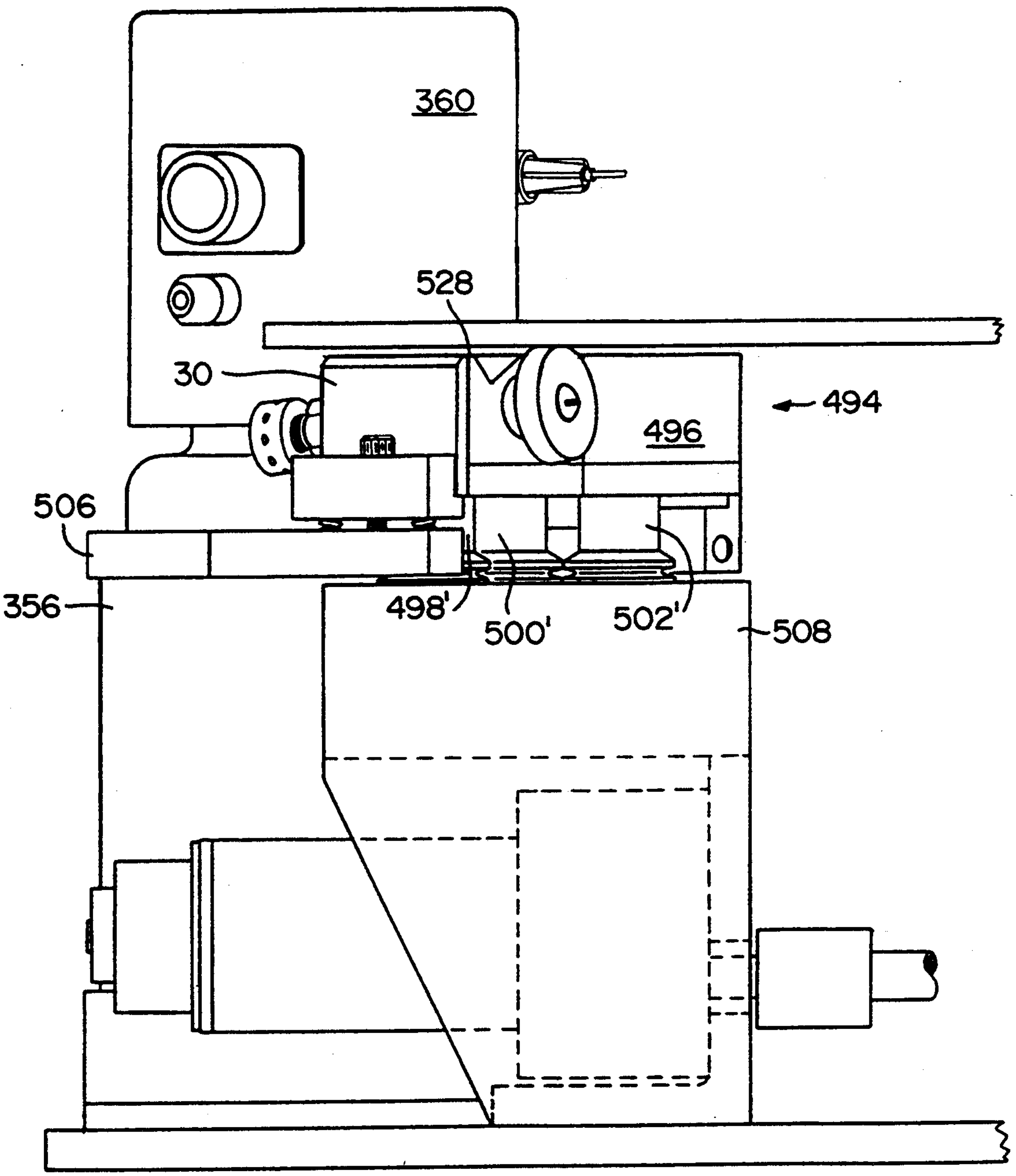
FIG. 16 is an elevational view of the drying station of FIG. 13.

In addition to cleaning of the bias plates 162,164 of the development electrode module, as described earlier, it is essential that the image carrying portion(s) of the photoconductor coating 18 be cleaned to remove any excess toner which may have remained thereon after the toning process had been completed. This is necessary in view of the requirement that the developed (or toned image) be thoroughly dried before transfer to a receptor film. In order to effect such cleaning, a vacuum knife/drying module 494 is located at the drying station 28, the vacuum knife 30 being a component of said module. The vacuum knife/drying module 494 comprises a metal body 496 of generally rectangular configuration having three vertically oriented through passageways, 498, 500 and 502 extending downwardly through tubes 498', 500' and 502' unitary with the body 496. The module 494 is supported on the module carrier bracket 504 which is mounted on the reservoir housing 356 via ring portion 506. The body 496 is seated on the air distribution valve assembly 508 with the tubes 498', 500'and 502 coupled to the ports 510, 512 and 514 of the air distribution valve assembly 508 employing flexible sealing rings 516, 518 and 520. The module 494 is secured to pivot bracket 522 at one end and is seated on travel limitation bracket 524 at the opposite end, travel limitation bracket 524 being secured to the module carrier bracket 504 by travel limiting screw 526. The vacuum orifice 528 is defined across the upper portion of the body by angled portion 530 and wall 532 of module 494 leading to the passage 498 and tube 498' and port 510 of the air distribution valve assembly 508. The body 496 of module 494 is provided with a recess 534 including planar floor portion 536. Solid state ceramic heater module 538 is seated on spacers 540 and 542 resting on floor portion 536 of body 496. There is a wedge-like recess 544 formed across the width of the top portion 546 of body 496 which serves to guide air flow to the vacuum orifice 528. An air entrance 548 and an air outlet 550 is provided in the air distribution valve assembly 508. The air distribution valve assembly 508 includes an air flow passageway 552 leading from the air entrance 548 to the port 514 (see arrows 516 in FIG. 15) and air flow passageway 554 leading from the air entrance 548 past valve seat 556, the air flow following a path to enter into the airflow passageway 558 leading to the air exit 550. A passageway 560 is provided leading to valve seat 556. The entrance to passageway 560 is threaded at 560' for receipt of threaded valve plug 562 capable of being seated at valve seat 556 for stopping flow therepast, the spacing of the plug 562 from the valve seat 556 controlling the rate of flow of air over the ceramic heater surface 538' by controlling the air flow from tube 500' through port 512 to the air exit 550, the flow being effected from the vacuum source. A second passageway 564 extending parallel to passageway 560 is provided and threaded at its entrance (see 564') for receipt of threaded valve plug 566 capable of being seated at valve seat 568, again for controlling flow therepast. The port 510 leads to passageway 560 and the air drawn through the vacuum orifice 528 by the source of vacuum is flowed past valve seat 568 and thence to the air exit 550. Thus the flow of air through the vacuum orifice can be controlled by adjustment of the plug 562. A small bore tapped passageway 570 is provided to permit toner from the drip tray 200 of the toning station 26 to be picked up and passed to the vacuum drawn air exit (outlet) 550 via drip tray drain hose 571 coupled to the hose coupling 572. A vacuum test point passage 573 with plug 575 is provided for ascertaining the degree of interior vacuum.

Air entering the air distribution valve assembly via air entrance 548 is directed to port 514 through passage 552, port 514, tube 502' and passage 502 to flow over the ceramic heater surface 538'. From there, the air flow passes to passageway 500 to tube 500', port 512, passageway 558 to leave the air distribution valve assembly at the air exit 550 leading to the vacuum source (not shown). The gap between the vacuum knife orifice, the ceramic heater surface and the photoconductor surface 18 is maintained during the drying operation by eccentric wheel 572 rolling over the photoconductor surface 18, i.e. adjacent that portion thereof carrying the toner image; the gap theretween being determined by the eccentric wheel adjusting means 574. Gaps of 0.010 to 0.015 inches are suitable, preferably a gap of approximately 0.015 inch is utilized in the embodiment described herein. The preferred temperature of the ceramic heater surface in the embodiment herein described is approximately 120 degrees Fahrenheit. The air flow over the ceramic heater surface is rapid so as to effect efficient and rapid evaporation of the unwanted dispersant, Isopar.

Referring now to FIGS. 17 through 22, attention will be directed to the transfer station 34 where the dry toner image is transferred from the photoconductor coating surface 18 to the receptor film which constitutes the finished microfilm, this function being accomplished by means of a heating and pressure process simultaneously applied. The process is performed generally as taught in U.S. Pat. No. 4,529,650, incorporated by reference herein. The performance of such process within the microfilm camera/processor of the herein invention is effected by applying a plurality of high resolution, reduced images continuously, "frame by frame" upon a continuous length of receptor film wound upon a supply reel or spool which shall be described as a "feed" spool, the film employed in the embodiment described being 16 mm in width. The said receptor film consists of a flexible polyester transparent substrate carrying a thin, heat softenable compatible resin coating bonded to one surface thereof. The mechanical components employed to effect the processing require a high degree of mechanical precision, including those components to be described for the performance of receptor film advancement, tensioning, braking, etc as well as performance of the transfer process per se. Coordination of the operation of the functional components of the transfer station is critical for efficient operation, including the timing of the functional components as will be described.

Figure 17:
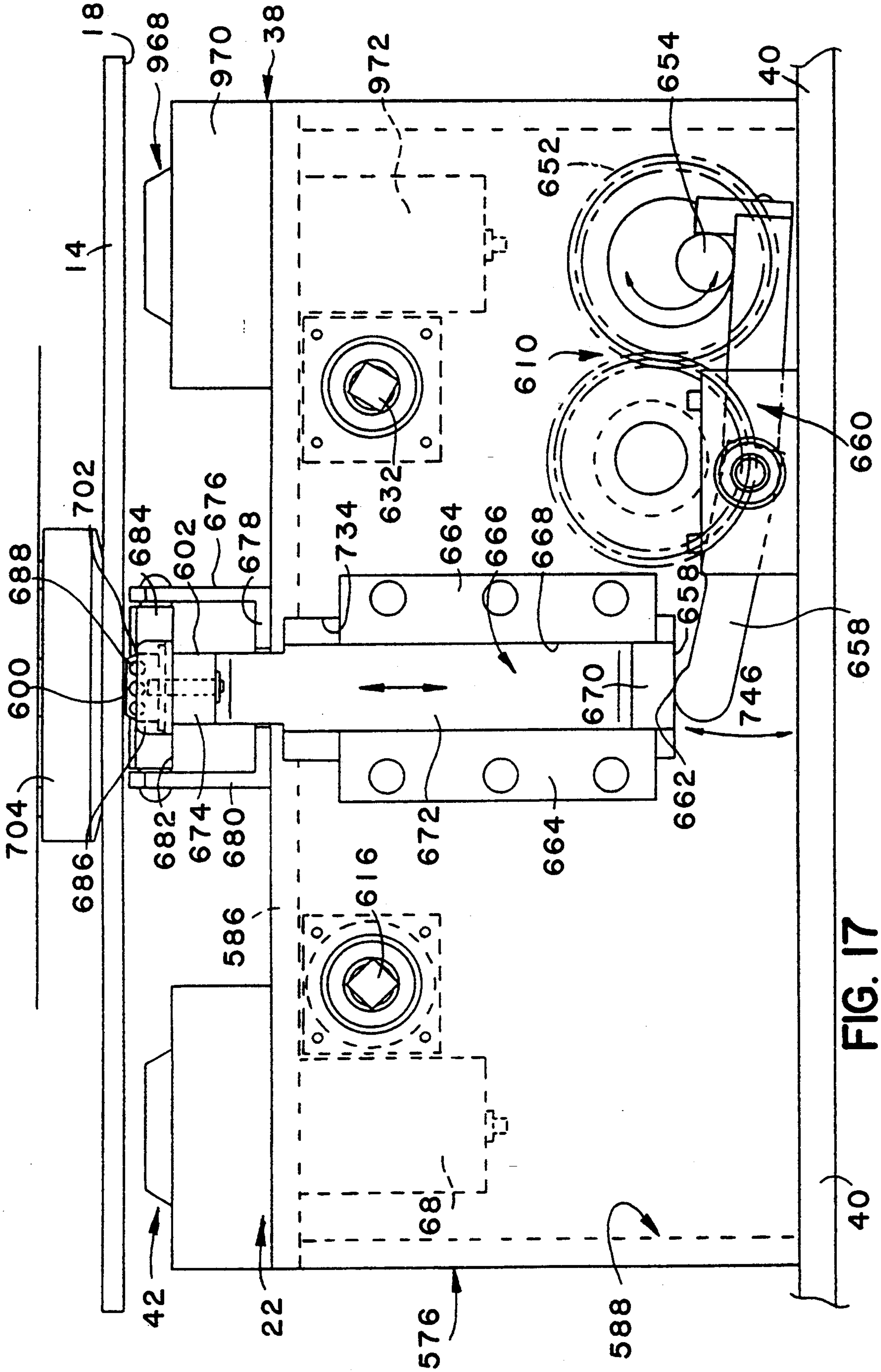
FIG. 17 is a front elevational view of the transmission portion of the transfer station of the microfilm camera/processor portions shown in phantom line representation.
Figure 18:
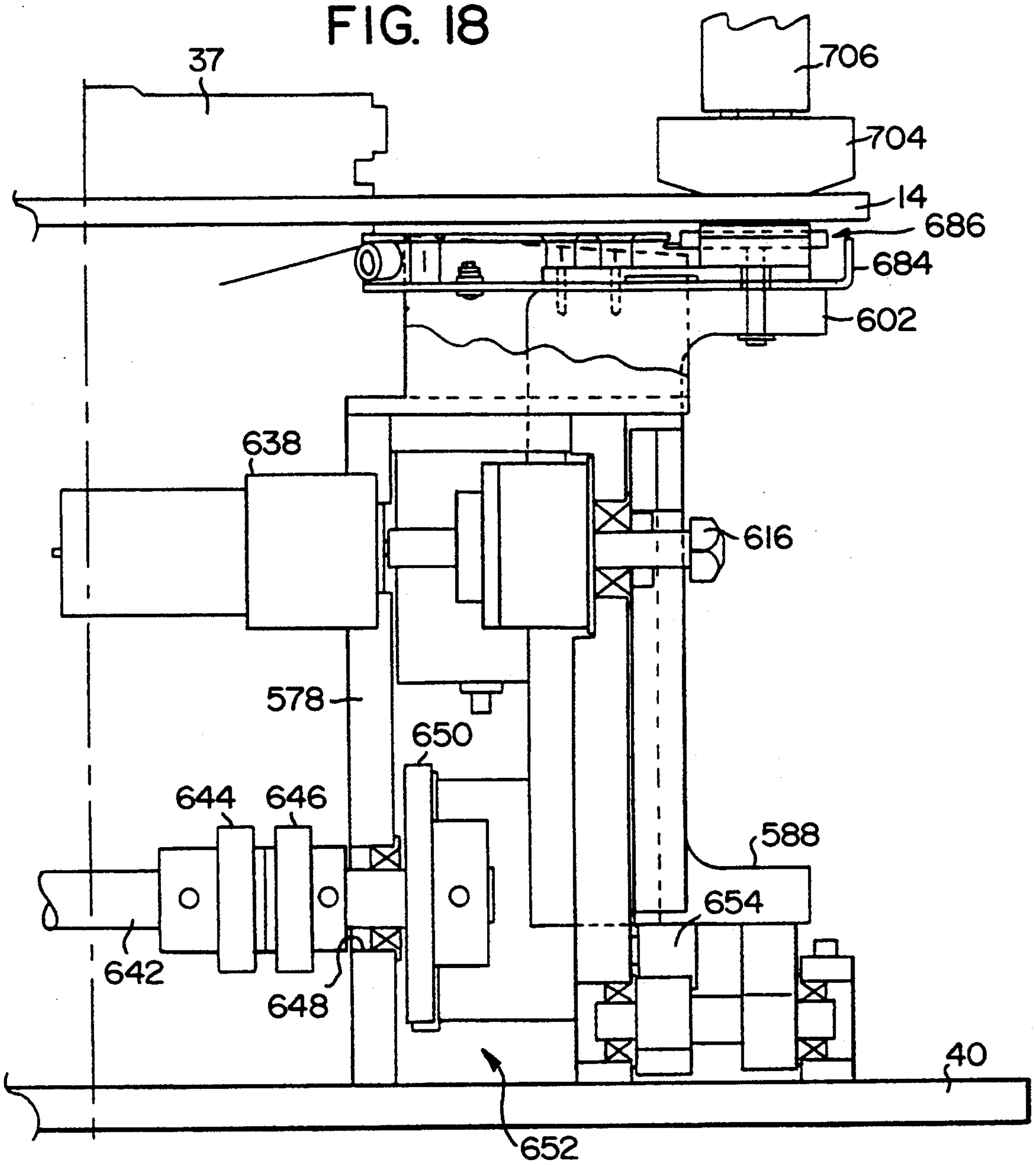
FIG. 18 is a side elevational view of the transmission portion of the transfer station illustrated in FIG. 17.
Figure 19:
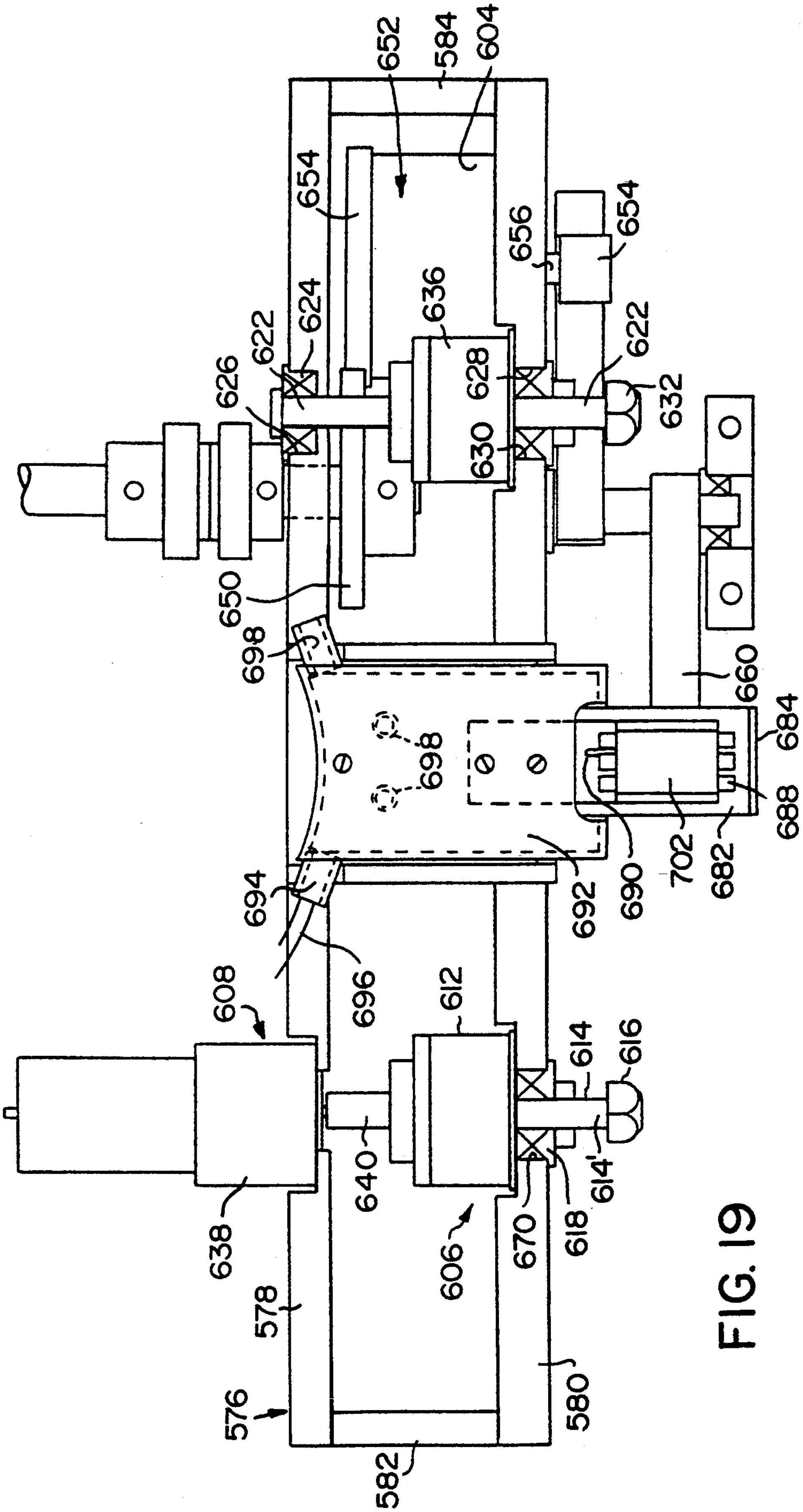
FIG. 19 is a top view of the transmission portion of the transfer station illustrated in FIG. 17.

Referring to FIGS. 17–19, the transfer station 34 includes a transmission housing 576 of rectangular configuration defined by front and rear vertical, parallel walls 578 and 580, opposite vertical, parallel side walls 582 and 584 and top wall 586. An enclosure or cavity 588 is provided of size and configuration to receive the receptor film magazine 590 removably therein, said magazine 590 being preloaded with a supply of receptor film adapted to receive the dried toner images successively, sequentially applied thereto, frame by frame, under heat and pressure according to the teachings of the referenced U.S. Pat. No. 4,529,650. The cavity 588 contains means for mounting spools 592 and 594 for carrying the receptor film 596, spool 594 being the feed or supply spool carrying the non-imaged receptor film while spool 592 is the take-up spool carrying the imaged receptor film. The magazine 590 includes guide means 598 for leading the unimaged receptor film from the feed spool 592 past the transfer effecting means 600 to the take-up spool 594. Pressure applying means 602 also are disposed within the cavity 588 and are operative upon the transfer effecting means 600.

Looking at FIGS. 18 and 19, the interior 604 of the transmission housing 576 contains means 606 for coupling the take-up spool 592 to drive means 608 for rotating the take-up spool 592 and the driven power cam means 610 for operating the transfer effecting means 600. The coupling means 606 comprises a brake assembly 612, a driven shaft 614 and a drive dog 616, the shaft 614 passing through ring bearing 618 seated in a passage 620 formed in the rear wall 580 of said housing 576. The drive dog 616 is secured to the end 614' of shaft 614 and thus is disposed to extend within the cavity 588. Shaft 622 is arranged bridging the interior 604 of the housing 576 in a common plane and coaxially with shaft 614, shaft 622 having one end mounted to pass through ring bearing 624 seated in passage 626 formed in the front wall 578 and its opposite end passing through ring bearing 628 seated in passage 630 formed in the rear wall 580, said passages 626 and 630 being coaxial. The said opposite end having hold-back dog 632 secured thereto, also disposed to extend within the cavity 588 to the same extent as drive dog 616. The shaft 614 mounts a take-up spool brake assembly 612 and the shaft 622 mounts the feed brake assembly 636. The transmission housing 576 is secured to the base plate 40 parallel to the edge thereof and spaced inwardly therefrom. The drive means 608 for the take-up spool 592 is mounted coaxially with the driven shaft 614 and comprises motor 638, the shaft 640 of which is coupled to shaft 614. The main power cam drive shaft 642 also is located inwardly relative to the housing 576 and is positioned below the center of the carrier disc 14, said drive shaft 642 passing axially through drive position limit switch cams 644 and 646, and, passing through passage 648 formed in housing wall 578, is coupled to the power cam drive means (not shown). The power cam drive means include main drive gear 650 coupled to the driven gear 782 of power cam drive assembly 652, main drive gear 650 and the power cam drive assembly 652 being disposed within the interior 604 of transmission housing 576 with the cam roller 654 passing through passage 656 formed in the front wall 578 of said housing 576, and extending into the cavity 588 so that it engages portion 658 of a power transfer lever assembly 660, the cam end 662 of which is positioned to effect the upward movement of the pressure applying means 602 during its upward movement and being lowered to permit the lowering of the pressure applying means 602.(see the arrow in FIG. 17).

The pressure applying means 600 includes a vertically arranged set of guide rails 664 between which a pressure or power ram 666 is reciprocably slidably movable upwardly under the force exerted by the cam end 662 of the pressure transfer lever assembly 658 and downwardly when the cam end 662 is lowered. The guide rails 664 extend into vertical passage 668 in the rear wall 580 of transmission housing 576. The power ram 666 is formed of "C" shaped cross-section with a lower portion 670, an elongate intermediate portion 672 and an upper end 674, the lower portion 670 being disposed immediately above the cam end 662 of power transfer lever assembly 660. A pair of shield members 676 of L-shaped cross-section are secured to the top wall 586 of the transmission housing 576, the base portions 678 of which are positioned along the opening of passage 668 and the legs 680 defining a shield. The upper end 674 of ram 666 carries a heater guard plate 682 over its length, including an upstanding end portion 684. A heated transfer block 686 is fastened to the upper end 674 of power ram 666 at the overhang 602 thereof. Heating rods 688 pass through transfer block 686. Likewise, control thermocouple 690 also is introduced into the transfer block 686. Heater connection box 692 is seated onto the upper end 674 of ram 666 and includes an entrance 694 for electrical leads 696 to feed heating voltage to the heater connection box 692. An entrance 698 also is provided for receiving the heater thermocouple 690. The top portion of the transfer block 686 includes lower pressure clamp pad 702. An upper clamp pad 704 is mounted on a rigid beam 706 overlying the carrier disc 14 and particularly, the photoconductor portion 18 carrying the dry toner image. The upper and lower clamp pads are arranged so that the carrier disc passes between the upper surface of the heater clamp pad 702 and the undersurface of the upper clamp pad 704.

Figure 20:
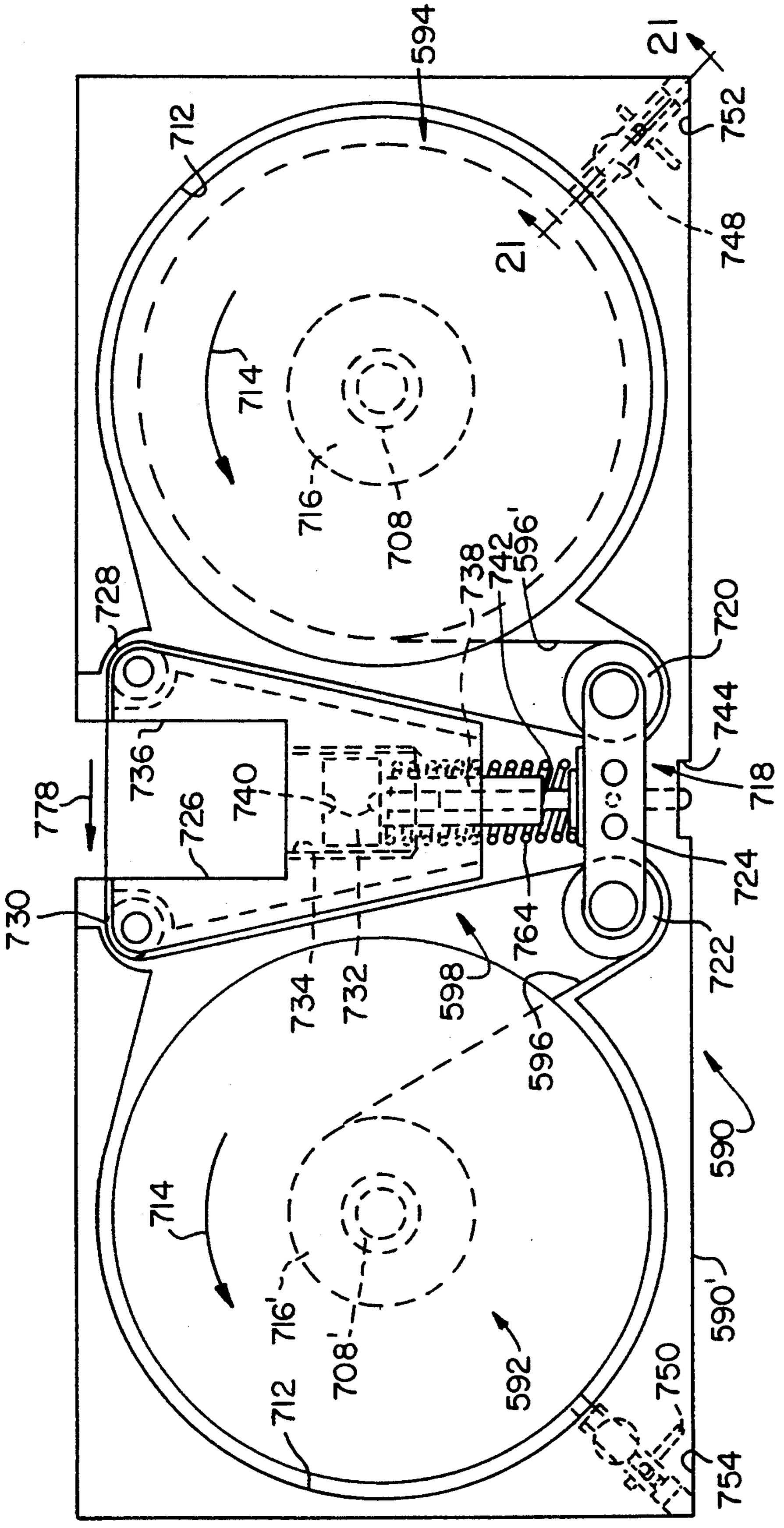
FIG. 20 is an front elevational view of the receptor film magazine for the microfilm camera/processor, portions being shown in phantom line representation.

In the embodiment herein described, the receptor film 596 comprises a transparent, flexible, polyester substrate carrying a heat softenable compatible thin resin coating bonded to one surface thereof. The receptor film 596 is housed within the magazine (cartridge) 590 of rectangular configuration of size constructed and arranged to be received snugly within the rear opening cavity 588. The rear cavity 588 can be provided with guide means to facilitate the introduction, retention and removal of magazine 590. Also not shown can be placed a spring loaded releasable clamp for securing the magazine 590 in said cavity 588. The magazine 590 contains the feed or supply spool 594 having a continuous length of receptor film 596 wound upon the hub 708 thereof and contained within the pair of flanges 710. The similar take-up spool 592 also is provided within the magazine 590. A pair of recess formations 712 is formed within the magazine 590 to seat the respective spools 594 and 592, said recess formations being of size and configuration to receive the spools 594 and 592 so that they are freely rotatable therein. The film 596 is wound with the heat softenable coating side 596' facing outwardly and, when installed within the magazine, are adapted to be simultaneously rotated in a counter-clockwise direction, as indicated by arrows 714 (FIG. 20). The spools are mounted upon ring mountings 716 extending into the magazine 590. The magazine 590 also is provided with the carriage guide means 598 which include a spring-loaded roller carriage tensioning assembly 718, said assembly 718 comprising a pair of tensioning rollers 720, 722 mounted for free rotation on opposite ends, respectively, of film control carriage 724. A shielding sheet formation 726 is carried by the magazine 590, the guide means 598 further including a pair of upper guide rollers 728 and 730 mounted for free rotation at the upper corners of the shielding formation 726. A film frame advance adjustment member 732 is mounted for reciprocable upward and downward movement within enclosure 734 (shown in broken line representation) opening to recess portion 736 formed in the magazine 590 and being of size and configuration to receive the overhang portion 674' of the power ram 666 and the heater transfer block assembly and lower Clamp pad 686 and 702 respectively when the magazine 590 is installed within the cavity 588. The film frame advance adjustment member 732 carries a depending guide tube 738 in which a elongate guide pin 740 is disposed fixed to the member 732, and extending past the film control carriage and outward from open end 742 of the guide tube 738 through recessed opening 744 of the magazine 590 to a level coplanar with the bottom wall 590' thereof. The pin 740 functions as an "out of film" indicator and frame counter switch actuator, a switch 746 being provided on the base plate 40 at a location suitable to be actuated by said pin 740.

Figure 21:
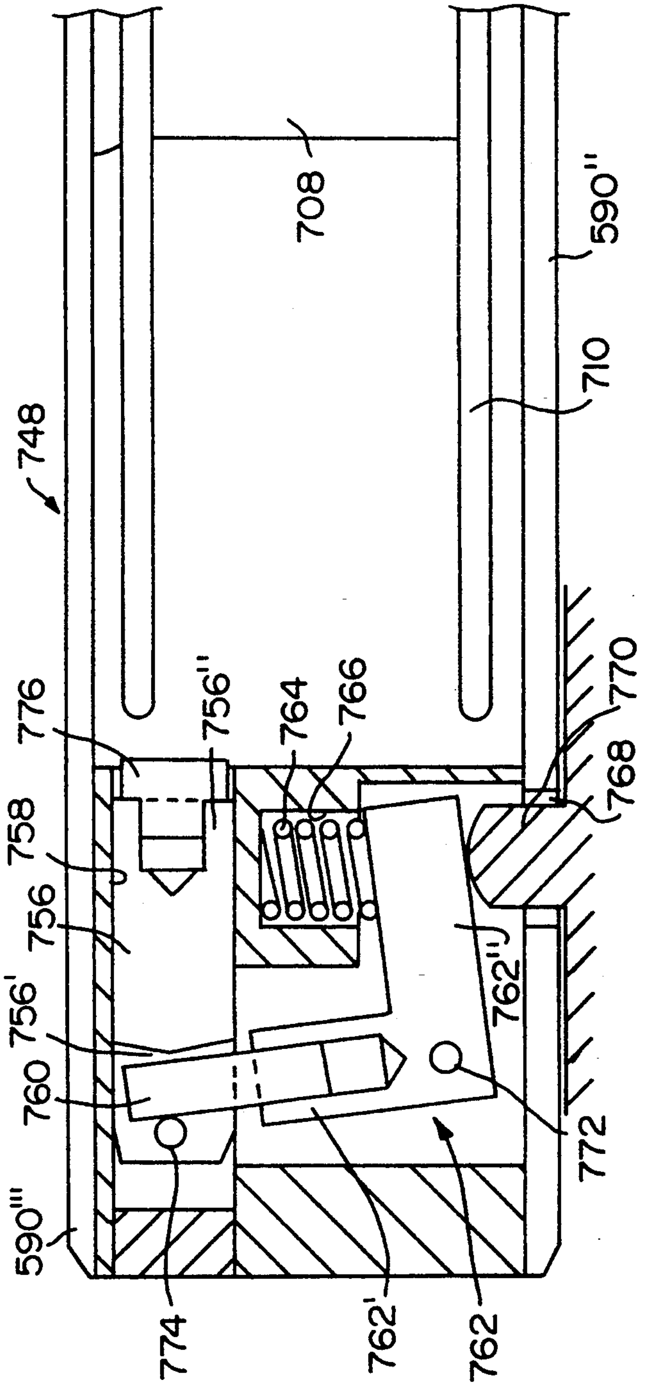
FIG. 21 is a partial enlarged sectional view taken along lines 21—21 of FIG. 20 viewed in the direction indicated by the arrows.

The magazine 590 also includes mechanical brake assemblies 748 and 750 at respective opposite inner corners 752 and 754 of the magazine 590. Referring to FIG. 21, each of said mechanical brake assemblies 748 and 750 are relatively simple in construction, comprising a piston member 756 seated within a bore 758. An actuating pin 760 is arranged to bear against the surface 756' of piston member 756. Actuating pin 760 is coupled to one leg 762' of actuating crank 762. Coil spring 764 is seated within cavity 766 with the other leg 762" being biased thereby with the actuating pin in said bearing relationship to the piston member 756 and said leg 762" positioned crossing aperture 768 in the back cover 590" of the magazine 590. A release plug 770 is seatable through aperture 768 to force the crank 762 to pivot at 772, forcing the actuator pin 760 against return pin 774 to withdraw the piston member 756 and the brake pad 776 carried by the nose 756" thereof from bearing relation with the spool flanges 710, thus unlocking the mechanical spool brakes.

The magazine 590 includes a front cover 590''' which can be removed to allow the spools 592 and 594 to be introduced into-the magazine 590. The magazine 590 is loaded with the spool 594 seated with its hub 708 seated on ring mounting 716 and hold-back dog 632. The spool 592 is seated with its hub 708' seated on ring mounting 716' and drive dog 616. The receptor film 596 is threaded under tension roller 720, thence over upper guide roller 728 across the recess 736 (see arrow 778) and continuing over upper guide roller 730 to and under tension roller 722 to the hub 708', the leading end of the film 596 being secured to the hub. The mechanical spool brakes 748 and 750 are set in "on" condition, that is, the effective position.

Once the loaded magazine 590 is installed within cavity 588, the mechanical spool brakes 748, 750 are released and the transfer station 34 is ready for operation to effect the transfer of the dry toner image from the photoconductor surface 18 to a portion of the receptor film 596 which portion can be referred to as a frame, same being located in position across the recess 736 for impression upon the dry toner image carried by the photoconductor surface 18. In anticipation of the image transfer function at the transfer station 34, when the operation of the operation of the camera/processor begins, the feed or supply spool motor brake assembly 636 and the take-up or rewind spool motor brake assembly 612 are activated to lock both spools 594 and 592 in position.

The mechanical spool brakes 748 and 750 provide a spool locking function to prevent accidental film movement in the magazine 590 when same is not mounted within the camera/processor 10. Without the brake locking action, each time the magazine is removed and subsequently re-inserted, the film could shift position and produce varying frame spacing between each set of exposures. The mechanical spool brakes 748 and 750 are released. The take-up motor brake assembly 612 is engaged (12 volts being applied). The film control carriage 724 is in lowered, i.e. down, condition and the feed or supply motor brake assembly 726 also is locked (12 volts being applied).

The next step in the operation is the unlocking of the take-up,brake assembly 612 and energization of the take-up drive motor 638. Now the take-up spool 592 is rotated until the film control carriage 724 rises to its mechanical limit, i.e. at the lower end of the film frame advance adjustment member 732. The take-up drive motor 638 then stalls for a controlled, length of time (milliseconds), the take-up brake assembly 612 re-engages and the take-up motor 638 is de-energized. The new image area (frame) is advanced half-way into transfer receiving condition.

The feed or supply spool brake assembly 636, heretofore engaged, now is dis-engaged (12 volts being withdrawn). Low voltage (5 volts) then is applied to said supply spool brake assembly. This application of low voltage provides a drag braking action to prevent possible film overrun. The control carriage is driven downward a fixed distance by return spring 764 resulting in the unwinding of the receptor film 596 from the feed or supply spool, the film being advanced to a fully advanced position relative to the heated transfer block 686, the distance travelled by the control carriage dictating the length of the receptor film 596 advanced on a per image transfer basis. This leads to a constant spacing of the successive images on the completed length of receptor film.

The dry toned image on the photoconductor portion 18 carried by the carrier disc 14 and ready for transfer has rotated to a position over the lower heated transfer block/clamp. The lower heated transfer clamp 702 which has been preheated to a temperature of approximately 200 degrees Fahrenheit, begins moving rapidly upward, driven by the power cam drive assembly 652 raising the power ram 666. Movement of said heated transfer block/clamp 686/702 is stopped when it reaches a position within approximately 0.030 inches from its final position. Since both the feed spool and take-up spool brake assemblies are locked, freezing the motion of said spools, the upward motion of the power ram, and accompanying upward motion of the heated transfer block/clamp 686/702 causes the film control carriage 724 to be lifted against the opposing force of the carriage stabilizer return spring 764, leading to increased film tension. The film control carriage 724 is lifted a small distance to a position where pressure on the order of 800–1000 p.s.i. is exerted on the receptor film/image/photoconductor sandwich to effect image transfer. The duration of the transfer process is on the order of 1.5 to 3.0 seconds during which the resin coating 596' of the film is impressed upon the toner image carried by the photoconductor portion 18 and remains so impressed for duration indicated. Now, with pressure having been released, the film 596, under tension due to the position of the film control carriage 724, separates in a peeling motion from the photoconductor portion 18, the separation beginning under the influence of the guide rollers 730 and 728 as the film control carriage is driven downwardly by the action of return spring 764. The magazine now is ready for the next to be transferred dry toner image introduced to the transfer station 34 by the rotation of the carrier disc 14. The pressure that had been exerted by the power ram 666 causes the dry toner image to be embedded within the heat softened resin coating of the receptor film, said transferred image being intact with no distortion or loss in resolution and/or density.

As was described earlier, the power ram 666 also referred to as the pressure arm is raised and lowered by the operation of the power cam means 610, and particularly by the power cam drive assembly 652. The power cam drive assembly 652 first raises the pressure arm to cause the heated transfer block clamp (which has been heated to approximately 200 degrees Fahrenheit)to bring the softened resin coating of the receptor film 596 to engage the toner image carried by the photoconductor surface 18. The power cam drive assembly 652 then causes the pressure arm to exert the additional pressure Upon the heated transfer block clamp 686 (including lower clamp pad 702) sufficient to transfer the toner image and embed the said image within the softened resin coating below the surface thereof.

Figure 22B:
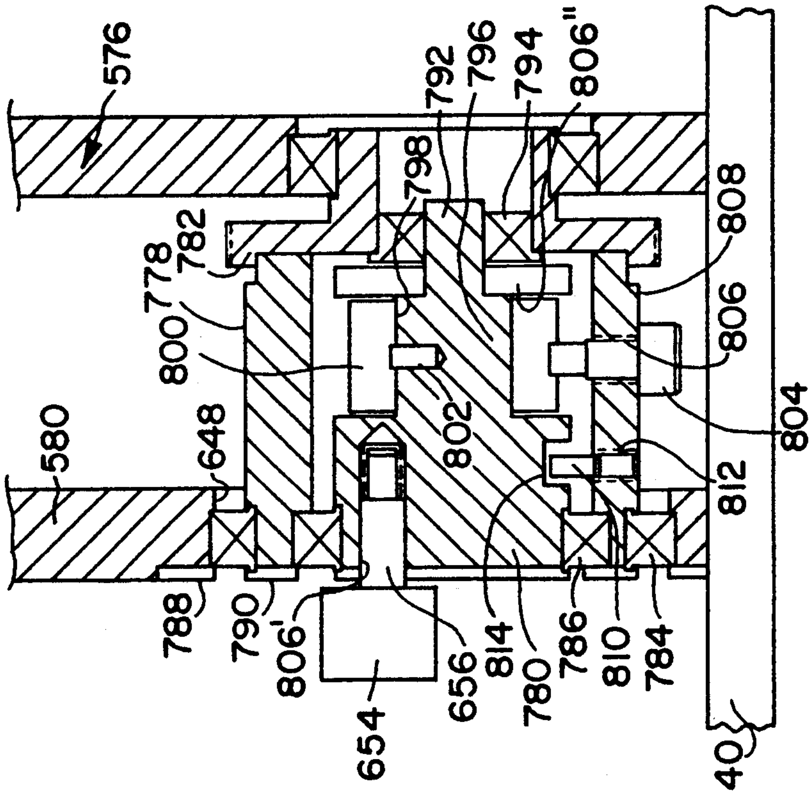
FIG. 22B is a fragmentary vertical sectional view taken through the power drive cam assembly of FIG. 22A taken along lined 22B—22B of FIG. 22 viewed in the direction of the arrows and showing in addition, a portion of the transmission housing in section and portions not in sectional representation.
Figure 22A:
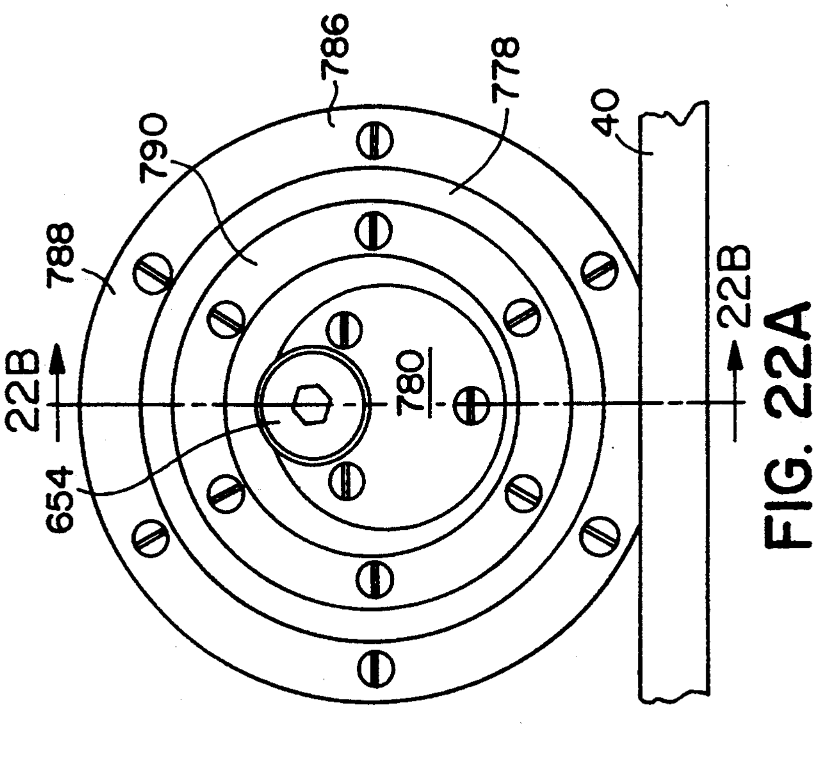
FIG. 22A is a slightly enlarged end elevational view of the power drive cam assembly at the transfer station of the microfilm camera/processor, only a portion of the base plate of camera/processor being shown.
Figures 23A, 23B, 24A, 24B, 25A, 25B:
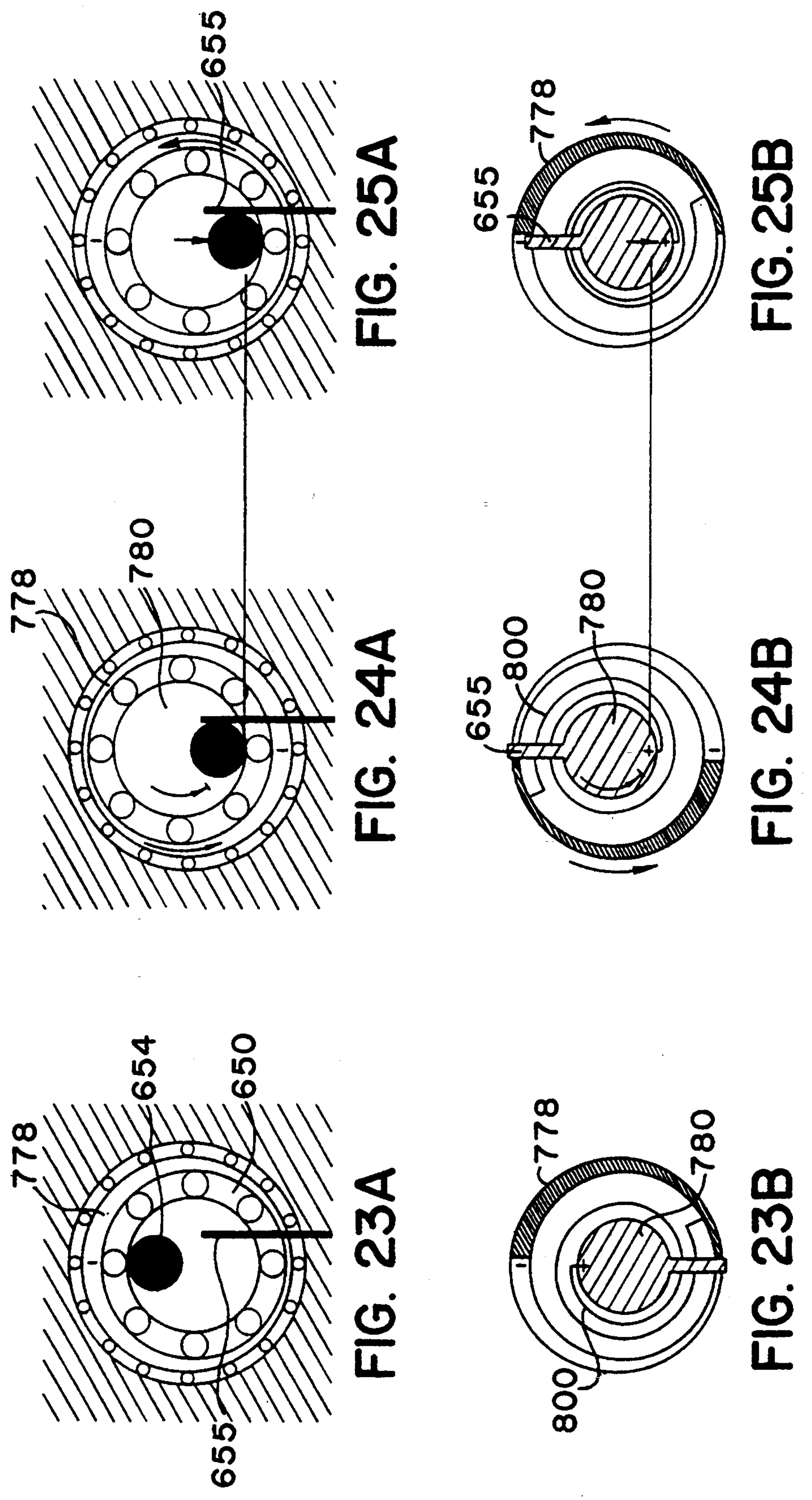
FIGS. 23A is a simplified diagrammatic end view of the power drive cam assembly of FIGS. 22A and 22B when the transfer block and clamp is in its lowered condition.
FIG. 23B is a diagrammatic view corresponding to the power drive cam assembly of FIG. 23A, and particularly, of the corresponding internal section thereof in said lowered condition.
FIG. 24B is a view similar to that of FIG. 23B but in the condition illustrated by the representation of FIG. 4A.
FIG. 25A is a view similar to that of FIG. 23A showing the representation of FIG. 23A but in the condition with the transfer block and clamp raised to its upper condition and assumed during the performance of the actual transfer operation, i.e. with the application of high pressure.
FIG. 25B is a view similar to that of FIG. 24B but in the condition illustrated by the representation of FIG. 25A.

The construction of the power cam drive assembly is illustrated in FIGS. 22A and 22B, its operation can best be described with reference to FIGS. 23A & B, 24A & B and 25A & B. The power cam drive assembly 652 comprises an outer cam shell 778 and a cam core 780 of lesser diameter mounted for rotary movement within said outer cam shell, the rotational axis of the cam core is non-coaxial with the rotational axis of the outer cam shell, as shown in FIGS. 23A and B, FIGS. 24B and B and FIGS. 25A and B. The cam core (as well as the cam roller 654) rotate with the rotation of the outer cam shell. The outer cam shell 778 is coupled to main driven cam gear 782. The outer cam shell 778 is mounted within outer bearing 784 and same are seated within passage 648 formed in the wall 580 of transmission housing. The cam core 780 is seated within said outer cam shell 778 by inner cam shell bearing 786, the assembly 652 being maintained by outer and inner bearing retainers 788 and 790. Cam roller 654 is mounted on pin 656 secured in passage 806' to the cam core 780 and extends outward of said cam core 780 and following the rotation of said cam core 780. The cam core 780 has a cylindrical axial extension 792 which is coupled to the driven cam gear 782 by ring bearing 794 and space 806''. The cam core 780 has an intermediate portion 796 to which is anchored one end 798 of clock spring 800 by anchor pin 802. A locking screw 804 is threadably seated through a passage 806 formed through the circumferential wall 808 of the outer cam shell 778 at a location so as to lock the clock spring 800 in place. The spring 800 is provided with a hole (not shown) in one end thereof and the locking screw 804 passes through said hole, effecting the locking of the clock spring 800 to the outer cam shell 778. A clock spring pre-wind positioning screw 810 is engaged through passage 812 formed in the circumferential wall 808 of the outer cam shell 778 at a location to enter groove 814 formed in the cam core 780.

As described earlier, the operation of the cam roller 654 is transmitted to the power transfer lever assembly 660 via portion 656 causing the pivoting of portion 658 thereof raising and lowering the cam end 662 to raise and lower the power ram 666 thereby to control the raising and lowering of the heater transfer block/clamp pad 686/702.

Referring to FIGS. 23A and 23B, the power cam drive assembly is illustrated in the condition assumed with the heater transfer block/clamp pad in its lowered position. The cam roller 654 is shown in its raised position. When the drive cam gear 650 is rotated in the clockwise direction, the driven cam gear 782 is rotated in a counter-clockwise direction. This causes the outer cam shell 778 to rotate in a counter-clockwise direction and thus causes the cam core 780 to rotate, through the clock spring 800 interconnection. The cam roller 654 is caused to rotate with the cam core 780 also in the counter-clockwise direction. From the position illustrated in FIGS. 23A and 23B, the continued rotation of the cam roller 654 causes same to impact on the cam roller stop 655. The cam end 662 of the power transfer lever 660 has forced the power ram 666 to its uppermost position just 0.30 inches from the photoconductor surface carrying the dry toner image to be transferred. Looking at FIGS. 24A and 24B, the clock spring 800 has a greater rotational torque than that which is required to rotate the cam core. This rotation and its resultant impacting the cam roller 654 against the cam roller stop 655 prevents further rotation of the cam roller and cam core. Note that the position of the cam core in FIGS. 24A and 24B has not changed relative to the cam shell 778.

Referring now to FIGS. 25A and 25B, the outer cam shell 778 continued to rotate in the same, counter-clockwise direction so that the cam roller moved in a downward direction due to the cam core's axial offset relative to the cam shell. The clock spring 800 has been wound up by the cam shell's continued rotation. The strong downward force at the cam roller is the result of the mechanical advantage produced by the eccentric positioning of cam core within the outer cam shell relative thereto. Thus, the additional very high pressure is exerted on the sandwiched film, image and photoconductor surface, which pressure effects the transfer of the toner image and embedment thereof below the surface of the softened resin coating carried by the receptor film.

The nature of the toner image transfer process effected at the transfer station 34 is such that the toner image transfer efficiency approximates 100 per cent, minimizing the requirement for cleaning of the photoconductor surface. It has been found that even prolonged contact of the toner fails to show any adverse degredation of the electrophotographic properties of the photoconductor employed. However, in view of the unusual requirements of high resolution of the materially reduced microfilm images, a pristine surface for image creation under all circumstances is believed necessary for the effecting of the relatively large number of images to be applied to the length of receptor film. Thus, a cleaning station 36 is provided and is located in the embodiment described, between the disposition of the drying station 28 and the electrical discharge station 38 (the latter being carried on the transmission housing of the transfer station (as will be described hereinafter).

Briefly, the cleaning operation employed in the described embodiment is accomplished by wiping the photoconductor surface portion with a smooth, non-woven cloth-like material, such as Type 529W MASTERWIPE wiping fabric (MASTERWIPE being a trademark of 3M Company). The wiping fabric is wound on a feed spool and threaded over a spring loaded solid roller which is positioned to exert an upward force during cleaning, and being attached to a take-up spool. When the portion of the photoconductor such as described with respect to the transfer operation, from which the toner image has been transferred, is brought to a position over the cleaning means at the cleaning station 36, the cleaning fabric in the form of a tape is brought into contact with the photoconductor surface and moved out radially relative the center of the carrier disc 14 in a wiping action. The wiping material, on the return stroke, is advanced a fixed amount resulting in the presentation of a fresh material for each successive cleaning operation.

Referring to FIGS. 26 through 30E, the cleaning station 36 includes a stationary main frame plate 816 secured to the camera/processor base plate 40 oriented vertically along a line taken radially from the center of the carrier disc 14. A slide rail arrangement 818 is secured to the base plate 40 along the inner side of main frame plate 816, said slide rail arrangement 818 comprising an elongate planar base 820 having a pair of vertical end walls 822. A horizontally oriented slide rail 824 is seated on the inner edge of said base 820 between the end walls 822. A cleaning carriage 826 is mounted oil rail 824 for limited reciprocable movement between an operating position and an outwardly disposed access position so that the cleaning tape carried by the cleaning carriage 826 can be replaced, as will be described hereinafter. A pull-out lever 827 is provided for moving the carriage, manually, outward. The functional components of the cleaning station 36 are carried by the cleaning carriage 826 while the drive means 828 for moving the carriage are carried by the main frame plate 816 and are mounted to the outer side 816' of said plate.

Figure 26:
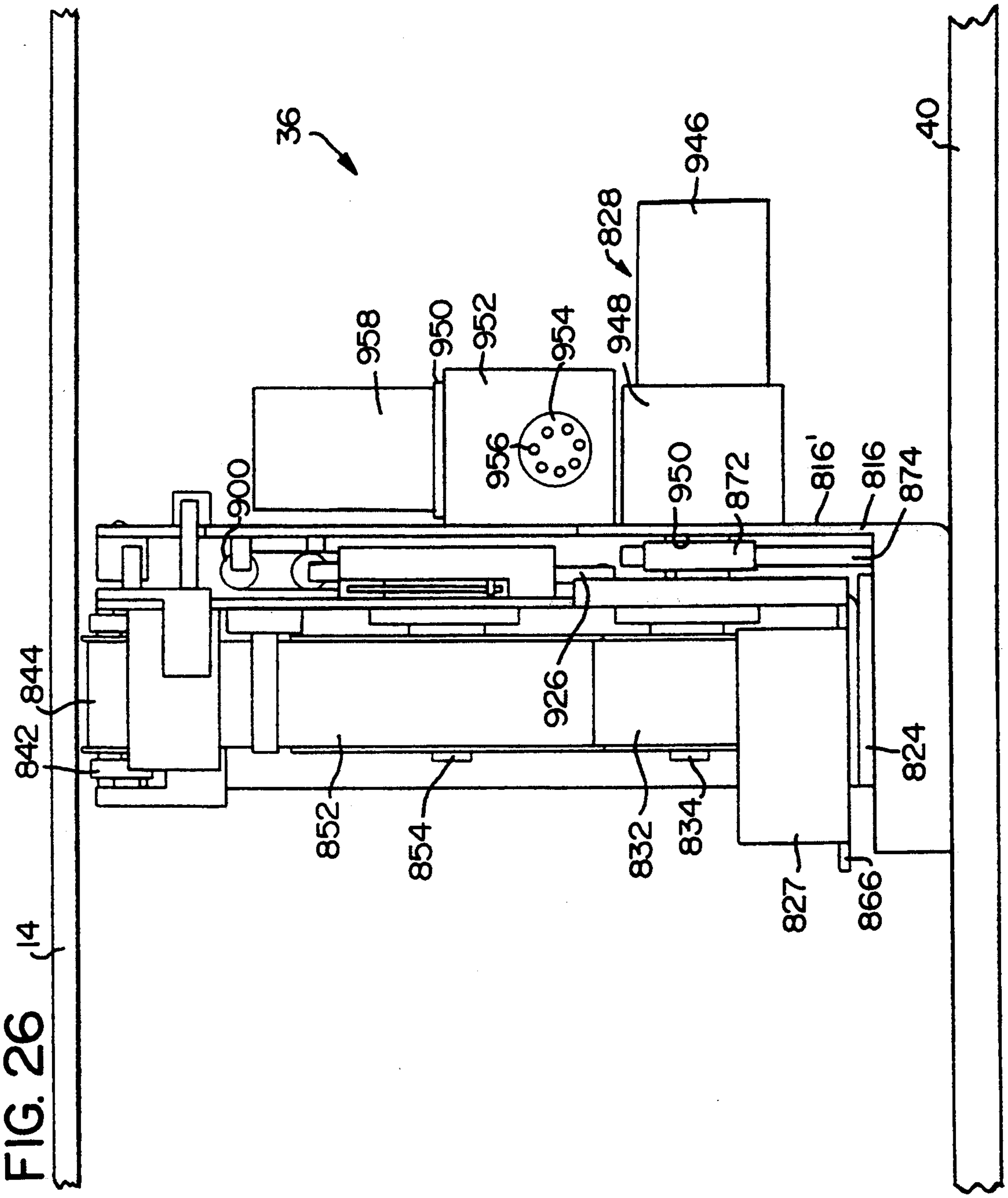
FIG. 26 is an end elevational view of the photoconductor cleaning station of the microfilm camera/processor.
Figure 27:
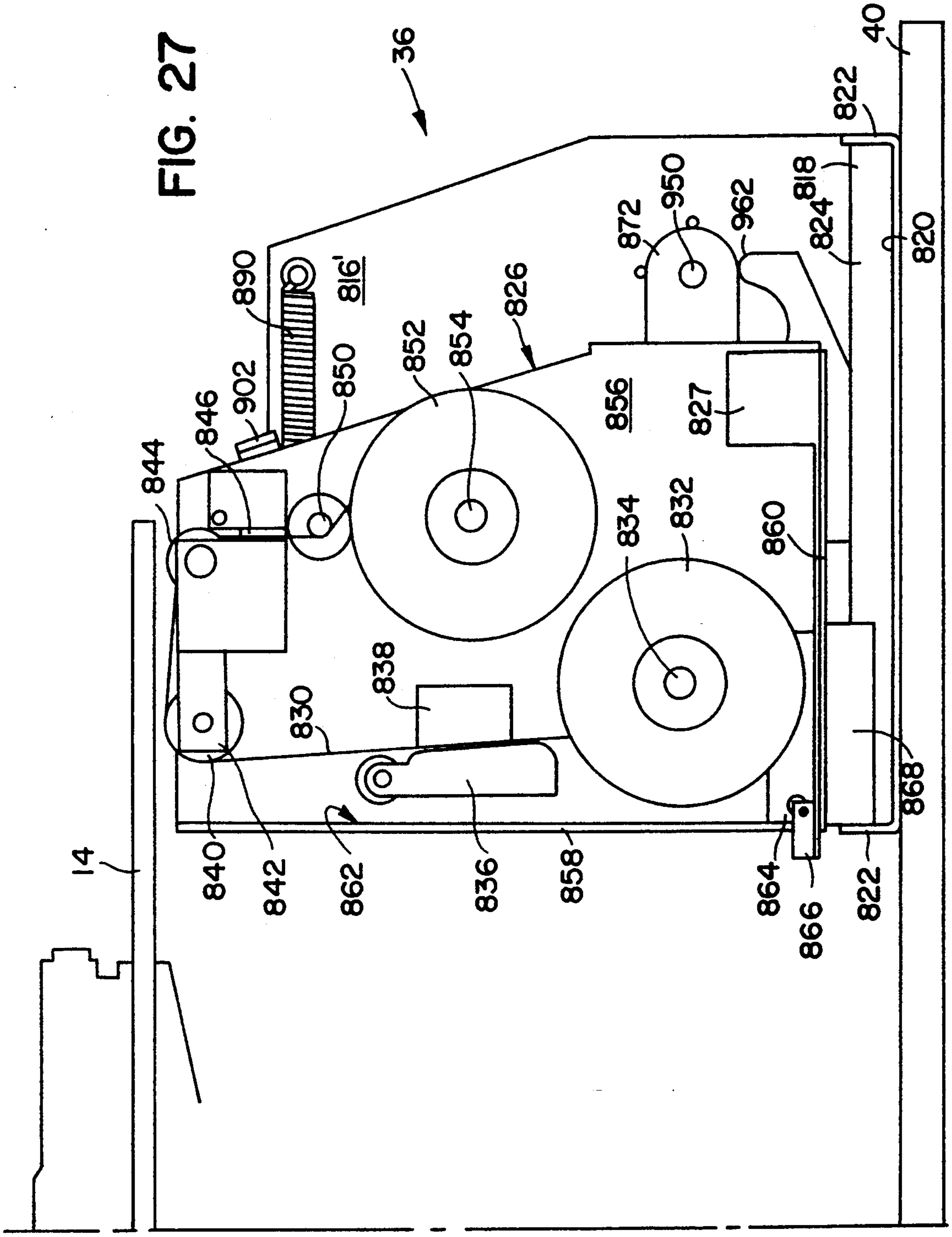
FIG. 27 is a side elevational view of the photoconductor cleaning station of FIG. 26.
Figure 28:
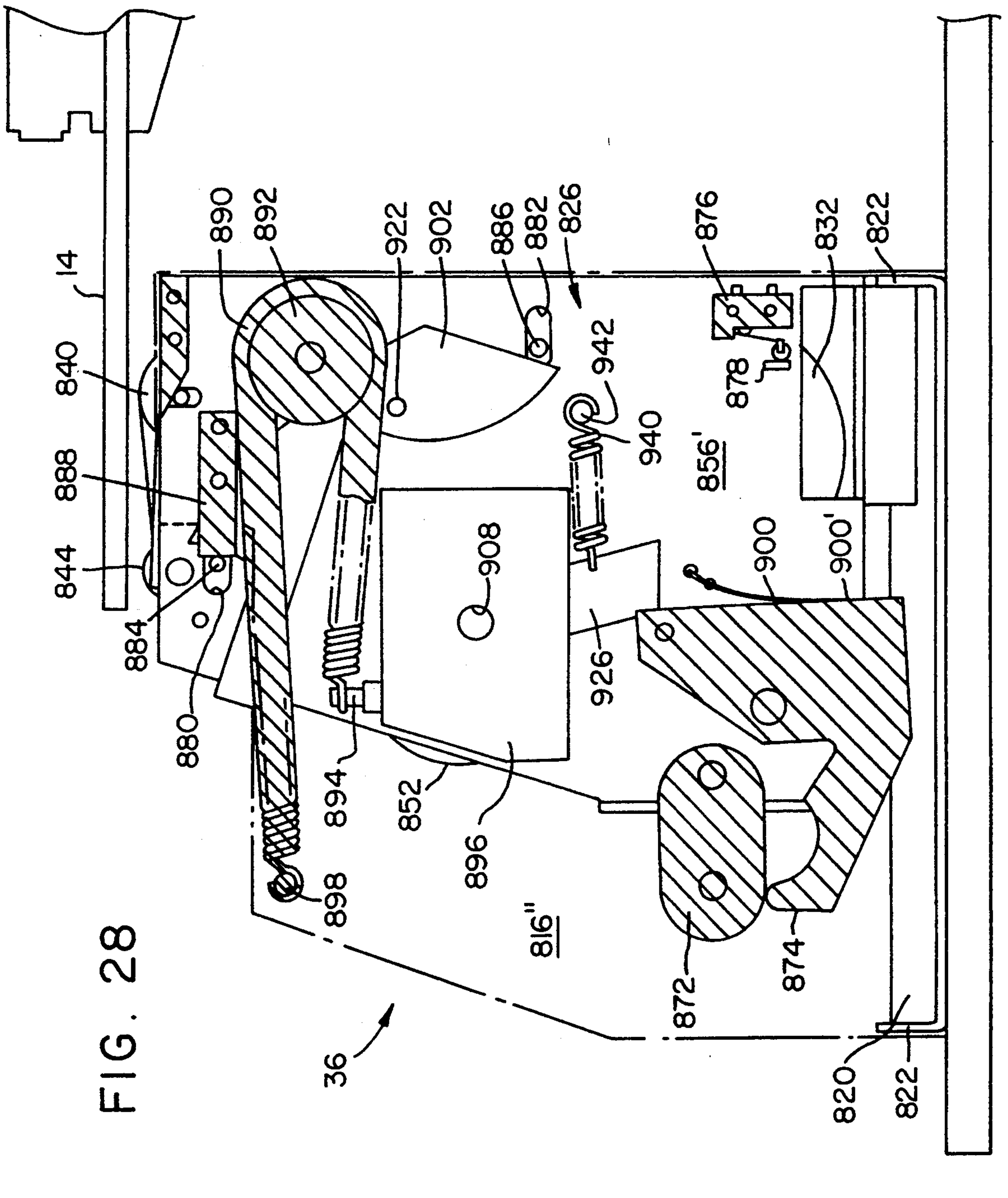
FIG. 28 is a side elevational view of the photoconductor cleaning station from the opposite side of FIG. 27 illustrating selected operational components in shadowed sectional representation one portion being shown in broken line representation.

Attention first will be directed to the functional components of cleaning station 36 and particularly to FIGS. 26 through 28. The cleaning tape 830 is carried by supply or feed spool 832 mounted for rotation on shaft 834. The tape 830 is passed between a spring-loaded drag brake 836 and brake back-up pad 838, over cleaning pressure roller 840 carried by pressure roller carrier 842. The tape 830 then is wound over guide spool 844 and past an automatic tape advance clamp 846, thence under guide pin 850 to the take-up spool 852 which is mounted for rotation on shaft 854. It should be noted that the carriage 826 includes a vertical plate 856, a rear flange 858 along the length of plate 856 and a bottom flange or base 860 to define an enclosure 862 in which the operating components are disposed. The inner corner 864 of the enclosure 862 carries a carriage stop catch 866 to define the maximum inward position that can be assumed by said carriage. Depending from the bottom flange or base 860 is the mounting slide 868 on which the carriage is supported and is moved on the slide rail 824. The opposite side 856' of plate 856 carries the tape advance ratchet mechanism 870, the drive crank arm 872, the tape advance winding arm 874 and the home position switch 876 and actuator 878 therefor. Slots 880 and 882 are provided in plate 856 to receive automatic tape release pin 884 and spring loaded drag release pin 886, respectively therein. Automatic tape release pin block 888 is mounted adjacent slot 880. An extensible carriage return spring 890 is wrapped about carriage release spring length increase roller 892 and secured to pin 894 carried by the housing 896 for the tape advance ratchet mechanism 870 and to spring anchor pin 898 carried by the inner side 816" of the main frame plate 816. A return spring 900 is secured to the carriage plate 856 and has its free end 900' bearing against the winding arm 874. The manually operated clamp release lever 902 is mounted for pivotal movement on pin 922 carried by plate 856, spring-loaded drag release pin 886 bearing against portion 906 of lever 902.

Figure 29:
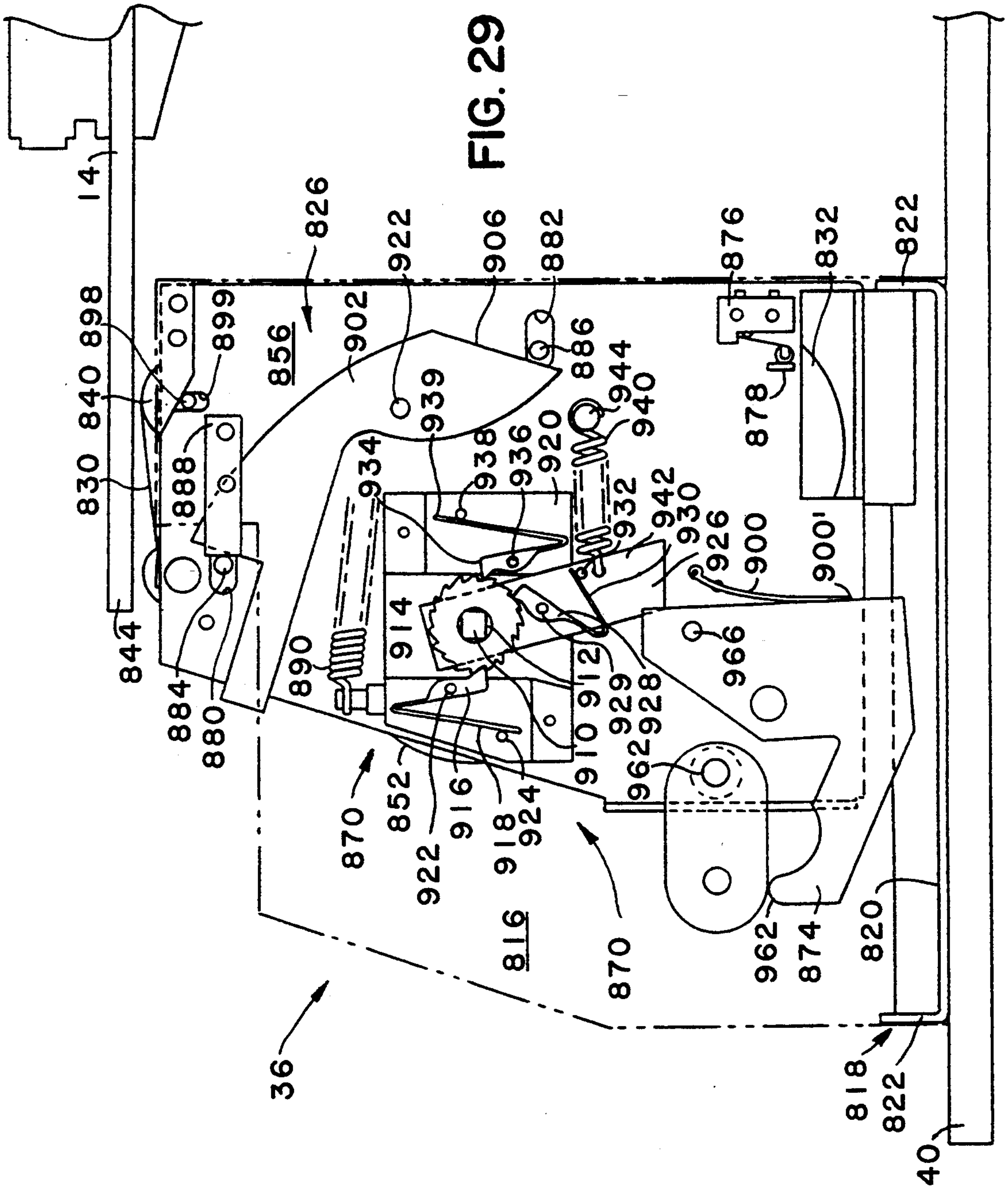
FIG. 29 is a side elevational view of the photoconductor cleaning station illustrating the cleaning tape advance mechanism operation, portions being deleted for clarity other portions being shown in phantom line representation.

The tape advance ratchet mechanism 870 is illustrated in FIG. 29 and reference is made thereto. The shaft 854 of the take-up or rewind spool 852 passes through a suitable passage 908 formed in the vertical plate 856 of the carriage 826 and includes a square drive end 910 seated in the central axial passage 912 of ratchet wheel 914. A ratchet wheel combined holding pawl 916 and spring 918 is mounted oil mounting pad 920 within the housing 896. The holding pawl 916 is mounted for pivotal movement on pin 922 while the spring 918 bears against spring stop pin 924. Tape advance winding arm 926 is mounted between the carriage plate 856 and the ratchet wheel 914 for movement with said ratchet wheel. Winding arm ratchet wheel holding pawl and spring 928 is mounted on pin 929 secured to the tape advance winding arm 926 with the spring portion 930 bearing on spring stop pin 932 secured to the said tape advance winding arm 926. An additional ratchet wheel holding pawl and spring 934 is secured on advance mechanism mounting pad 920, pawl and spring 934 being a half-step pawl, the pawl portion thereof being mounted for pivotal movement on pin 936, the spring portion 939 thereof bearing against spring stop pin 938. Coil spring 940 is coupled to end 942 of the tape advance ratchet winding arm 926 and to the spring anchor pin 944.

The drive means 828 for moving the carriage 826 are carried by the outer side 816' of the main frame plate and comprise a drive motor 946 having the drive motor gear head 948 coupled thereto, the drive shaft 950 of said drive motor 946 passing through a suitable passage (not shown) and being coupled to the drive crank arm 872. Relay mounting bracket 950 is secured to the outer side 816' of the main frame plate 816 and carries housing 952 for the electrical connection means 954 including electrical connection plug 956. A drive motor braking relay 958 is seated on the housing 952. The drive means 828 further includes drive crank arm 872 mounted on drive crank roller 962 mounted on drive shaft 950.

Figure 30A:
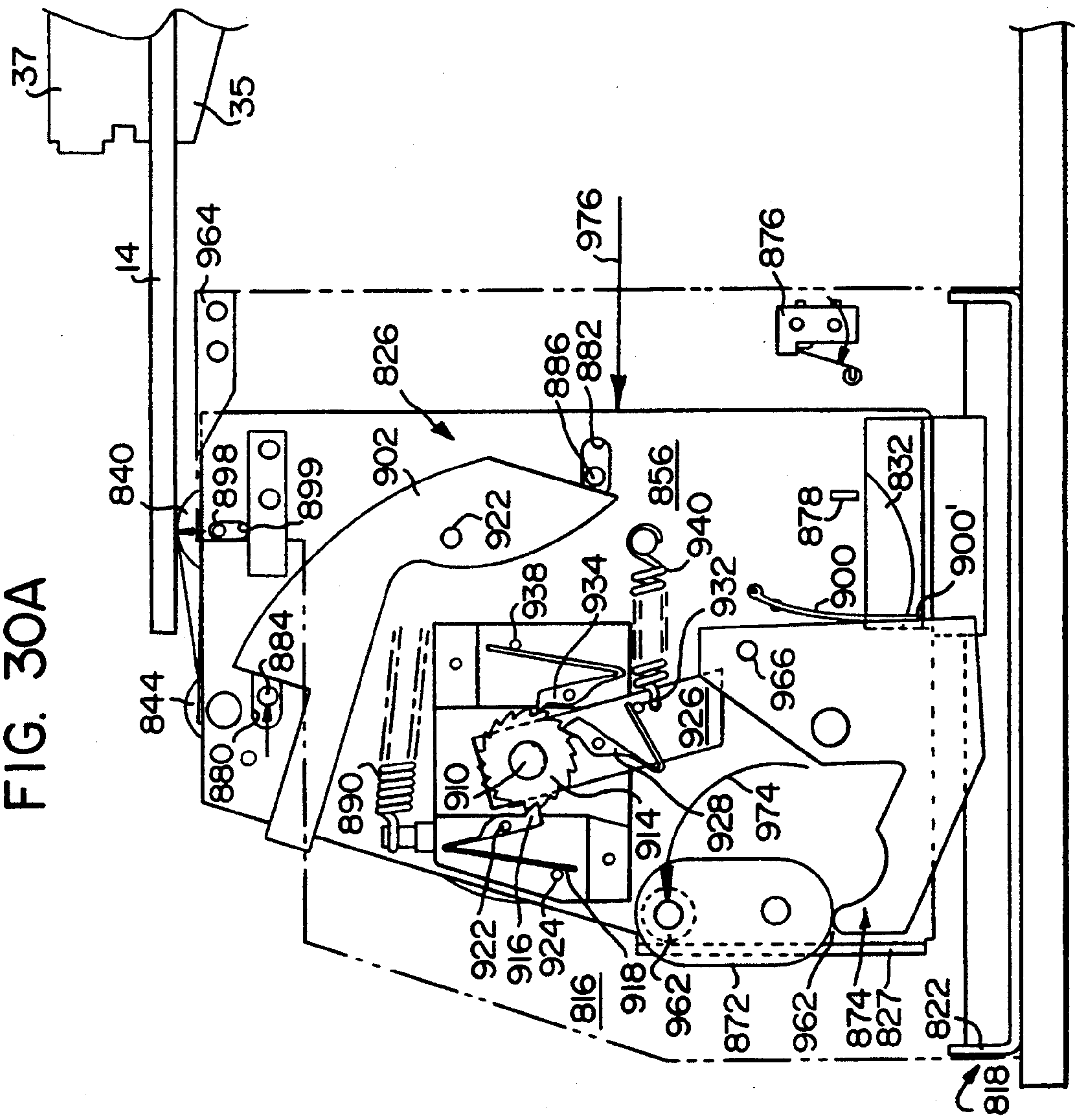
FIGS. 30A through 30E are step by step diagrammatic views illustrating the cleaning station operation selected portions being shown in phantom line representation; and, FIG. 31 is a diagrammatic representation illustrating the cycle of operation of the photoconductor carrier disc, i.e. the positional sequence of a single frame portion thereof.
Figure 30B:
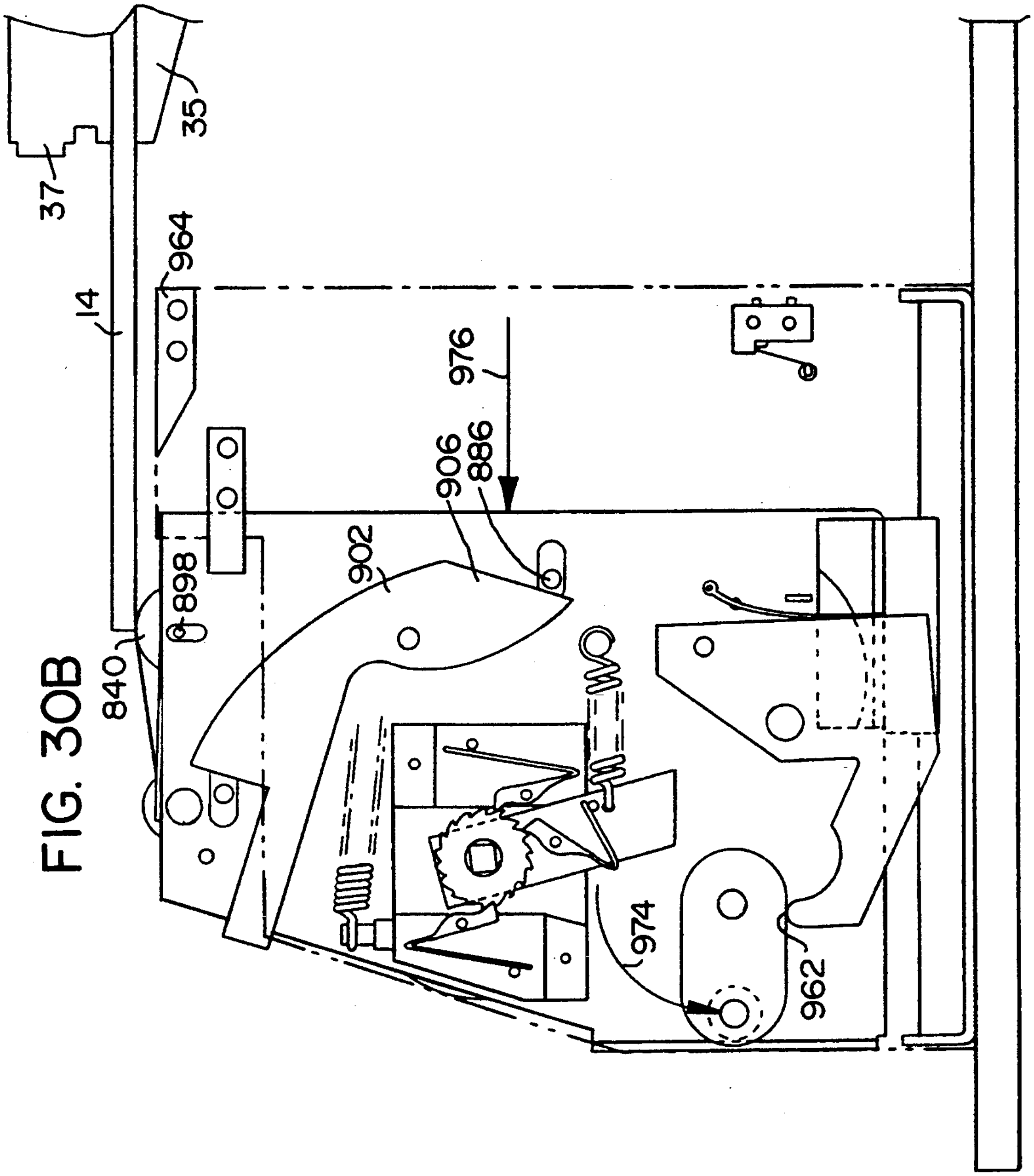
Figure 30C:
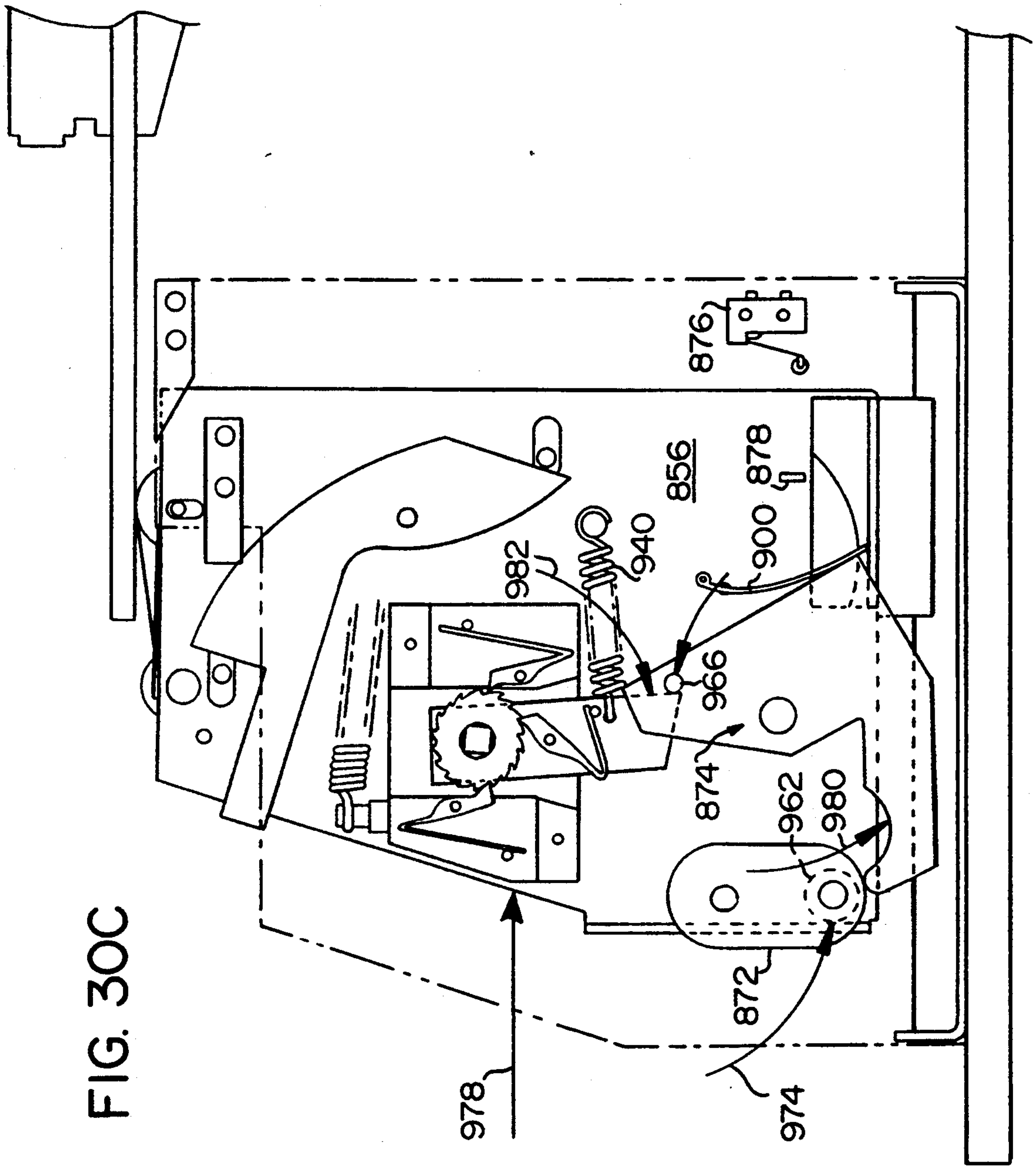
Figure 30D:
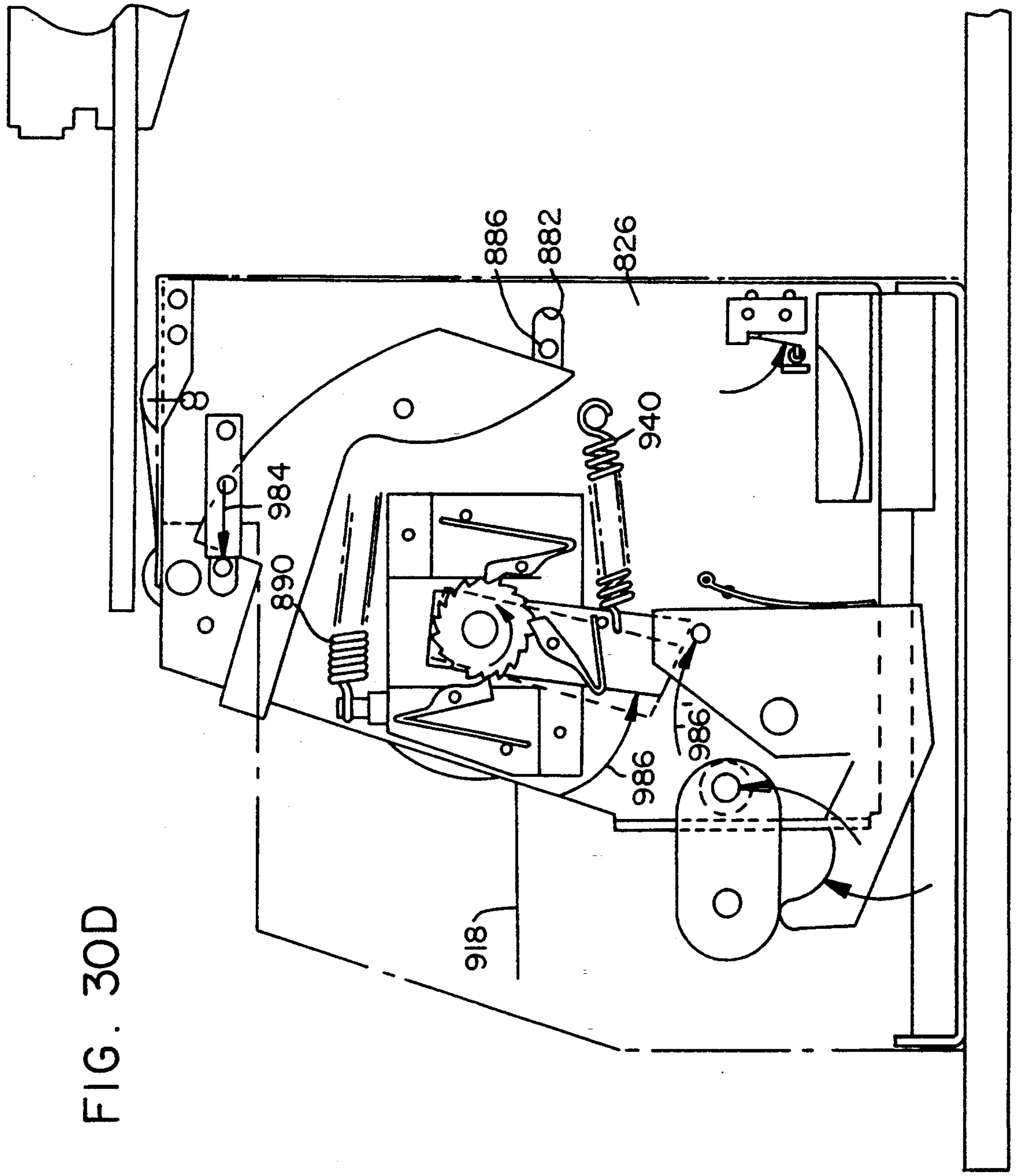
Figure 30E:
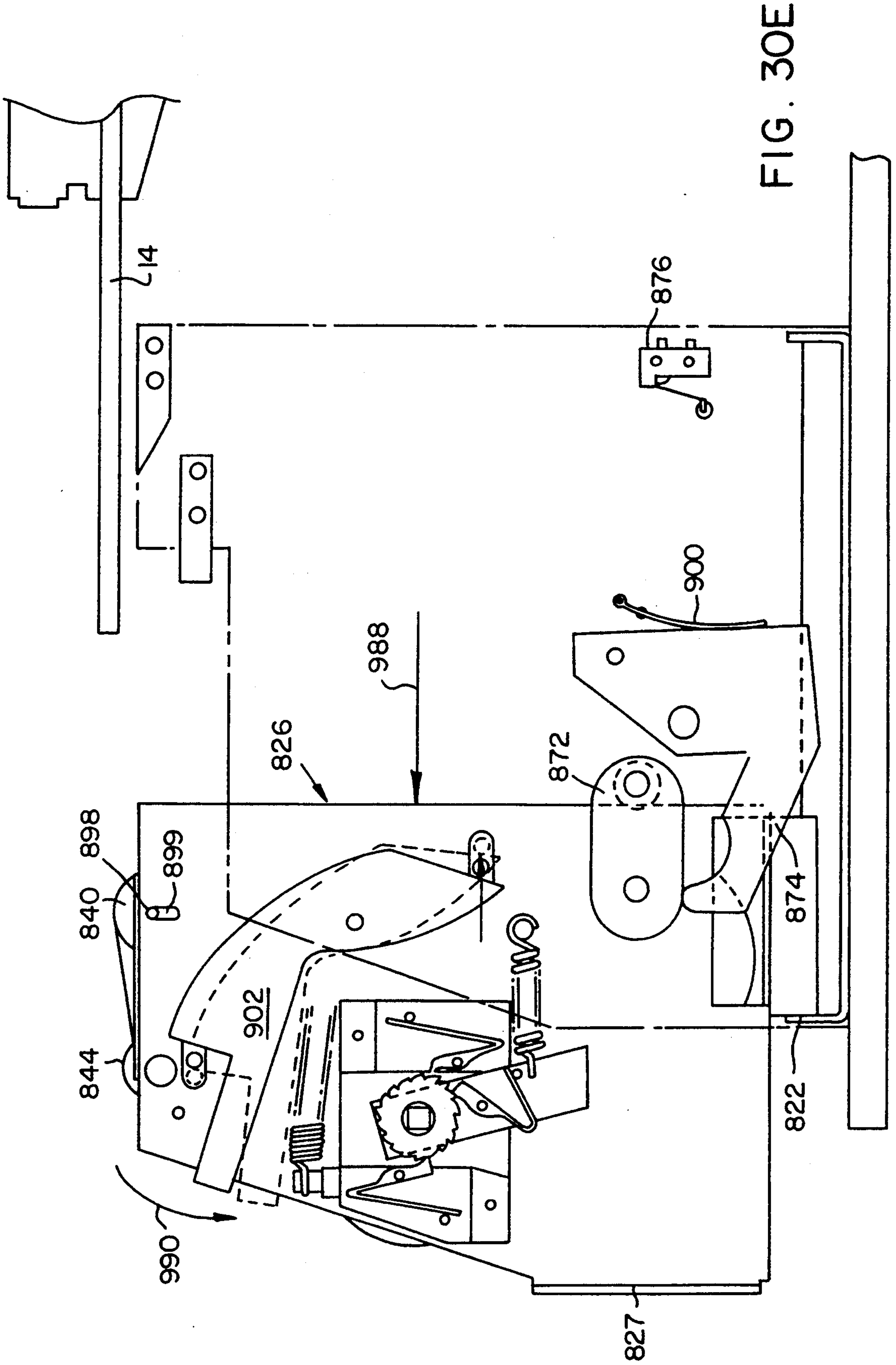

The cleaning operation at the cleaning station 36 may be understood by reference to FIGS. 29 through 30E. In FIG. 30A, the cleaning station 36 is represented with the cleaning carriage 826 illustrated in the home position, that is, at the time the photoconductor portion from which the toner image has been transferred to the receptor film 596, has reached the cleaning station 36. Now, a short duration 12 volt starting pulse is applied to the motor 946 and its gearhead 948 begins to rotate drive shaft 950 and the drive crank arm 872 is rotated in a counter-clockwise direction causing the drive crank roller 962 to bear against carriage pull-out lever 827 pushing the carriage 826 outwards (see arrow 974 of FIG. 30A). Voltage is continued to be supplied to the drive motor 946 after the short duration pulse is finished. The cleaning tape auto advance release pin 884 is moved away from the release pin trip block 888, thereby closing the tape advance brake. The tape advance follower pin 898 rides up the slot 899 and is released from pressure roller pull-down and tape advance ramp 964. The cleaning tape 830 contacts the photoconductor surface to begin the actual cleaning of the said surface. Upward movement of the cleaning pressure roller 840 pulls a small length of cleaning tape 830 (approximately 1/16th inches) from the feed spool 852 between the spring loaded drag brake 836 and brake pad 838. The tape advance clamp 840 is of a greater strength and does not allow reverse slippage. The drive motor continues to operate and drives the cleaning carriage 826 to its out position (see arrow 976), forcing the cleaning tape 830 against the length of the photoconductor surface for cleaning same.

When the cleaning carriage reaches its completed out position, as illustrated in FIG. 30B, the continuation of operation of the drive motor 946 reverses the direction of the cleaning carriage 826 so that it is pulled in an inward direction (see arrow 978) as shown in FIG. 30C. The tape winding arm 874 begins to rotate due to cam action (see arrow 980) and raises the tape advance winding arm trip pin 966 so that it intercepts the tape advance ratchet winding arm 926 on the inward stroke (see arrow 982. The ratchet pawl and spring 916 rides over ratchet wheel 914 as the power winding spring 940 continues to extend. The drive motor 946 drives the cleaning carriage 826 back to the start (home) position shown in FIG. 30D.

The carriage "home position" actuator 878 trips switch 876 and the relay 958 breaks the voltage supply circuit and the motor windings to provide instant stop of the carriage 826. The tape advance winding arm 874 has rotated due to cam action and now returns to the home position. The tape advance ratchet arm 926 has rotated due to cam action and also returns to the home position. The cleaning pressure roller 840 is pulled downward by cam action. The previously pulled 1/16th length of tape, which has been "dirtied" is now slack. The cleaning tape automatic advance release pin 884 hits release pin trip block 888 and the advance clamp 906 releases. The power winding spring 940 pulls ratchet arm, 926 and since the winding arm ratchet pawl 928 is engaged in ratchet wheel 914, the ratchet wheel 914 drives the take-up spool 852 and removes the slack from the cleaning tape length. Only the slack tape is taken up as the spring loaded drag brake 836 holding action is greater than the rewind spools's torque. The rewind action normally does not exhaust the tape advance mechanism's rewind capability and consequently, the subsequent cleaning station cycles only "top up" the mechanism's reserve winding torque.

As shown in FIG. 30E, the cleaning carriage 826 can be manually pulled further outward by grasping the left side of carriage plate, the cam portion 962 riding over the surface of the drive crank arm 860 (see arrow 988). Now the operator presses downwardly on the cleaning tape clamp release lever 902 (see arrow 990), allowing both the feed spool 832 and the take-up spool 852 to be removed. Alternately pulling outward on the right side of the carriage pull out lever 827 and then slowly releasing the same allows the carriage return spring 890 to retract the carriage 826 to its home position.

The final functional operation in the image generation cycle performed in the microfilm camera/processor 10 is the discharge of any residual electrostatic charge which may have remained on the photoconductor portion 18 from which the toner image had been transferred and which had been cleaned. This discharge is effected at a discharging station 38 by means of a positive polarity corona applied thereat.

Referring back to FIG. 17, both the charging station 22 and the discharging station 38 are carried by the top wall 586 of transmission housing 576. The discharging station includes a spin charging device 968 identical to the spin charging device 42 except that the polarity of the voltage supplied by the high voltage supply output at the discharging station 38 is positive. A positive corona current of approximately 100 microamperes is effective. Note that the positive polarity spin charging device 968 is illustrated extending outward of the insulated housing 970 thereof with the spin charger motor 972 for positive polarity spin charging device 968 disposed within the upper portion of the transmission housing 576.

The discharging of the photoconductor just prior to initiation of an imaging sequence is required in that the charging corona provided at the charging station is turned on whenever the carrier disc drive motor is operational. This leads to a later occuring situation whereby when there is an attempt to controllably charge an area of the photoconductor that has been charged earlier to an indeterminate level as a result of prior rotations of the carrier disc 14, an overcharge may result. Even more likely, an undefined charge condition is likely to lead to inconsistent and erratic results.

Figure 31:
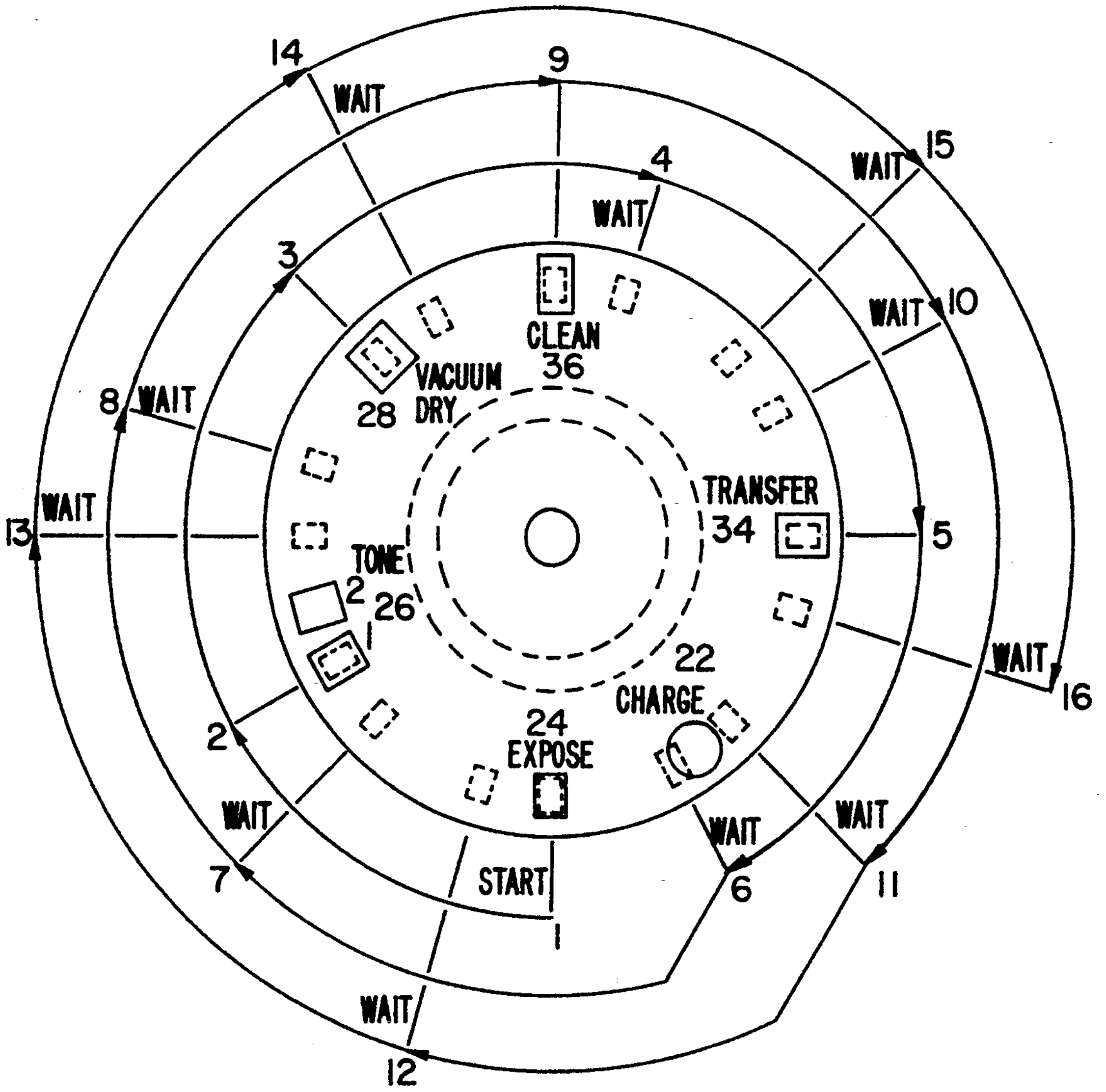

An example of a cycle of operation of the microfilm camera/processor according to the invention shall be described with reference to diagrammatic representation FIG. 31. In said FIG., the respective functional stations are shown located in an array along a circular path below the carrier disc 14, the annulus 16 of photoconductor being secured to the underside of said carrier disc 14 about a circle concentric with the carrier disc and closely adjacent the outer circumferential edge of said disc. In FIG. 31, there are sixteen different positions indicated for the frame locations, five of these being represented by reference to the reference characters for the respective functional stations located where the processing steps performed by the respective stations are effected. The remaining eleven designate locations where no functional activities are performed and hence are designated as "wait stations" represented by letters "a" through "k" inclusive. The representation in FIG. 31 refers only to a single frame or image location whose processing is followed therein with said single frame being advanced through the process before it is reused. For example, when a frame (or imaging location) is being processed, say at the toning station, a trailing frame (or imaging location) will be exposed at the exposure station, simultaneously with the toning operation on said first mentioned frame. The carrier disc is indexed step by step by the stepper motor electronically controlled by timing means operated by a programmed computer.

The start of the cycle beings as a frame advances from the last position 34 of the diagram toward the first position 24. The said frame passes over the spin charger means at the charging station whereat a uniform electrical charge, here a negative polarity electrostatic charge, is induced on the photoconductive coating of the photoconductor. The appropriately charged frame arrives at the first position, namely over the exposure station, whereat it is exposed to a reduced size light image of document G located on copyboard F of the microfilm camera/processor, and which had been illuminated by the illumination arrangement D thereof. The resulting image is a latent charge image of the light image projected through the lens system of the camera/processor 10.

The frame carrying the latent charge image is advanced to the second position where it is positioned over the first bias plate of the development electrode module at the toning station 26, the bias plate having received sufficient liquid toner thereon for rendering the latent charge image to its visible state. The second bias plate at the toning station is positioned at ready to be placed in toning disposition for the next to arrive latent charge image carried by the frame next to arrive at the toning station. The step between the exposure station and the toning station is characterized as short step, the steps between certain of the functional stations being either "short" or "long" representing only two angular distances of rotation of the carrier disc between functional stations.

The said frame then is advanced by a "long" step to arrive at and over the vacuum knife/dryer module at the drying station, the frame being vacuumed as it passes over the vacuum knife orifice and comes to rest at the heated ceramic drying surface portion of the vacuum knife/drying module. As the frame travels over the heated ceramic surface, heated air is passed over said facing surfaces for freeing the area of any toner dispersion medium. The frame, now carrying the dried toner image, advances by a "short" step to the next reached "wait" location and then advances by a "long" step to the transfer station. At the transfer station, the dried toner image is transferred to the receptor film.

The frame, now free of the dried toner image, and possibly carrying a minute quantity of residual toner particles, moves through the sixth through eighth wait positions and arrives at the cleaning station where it is cleaned of any of remaining toner particles. The frame then passes through the remaining wait positions until it reaches the discharging station and passes thereover, free of any residual electrostatic charge which may have remained thereon. The full cycle, sixteen positions, requires three full revolutions of the carrier disc.

It should,be understood that many changes may be made in the construction and disposition of the respective functional stations, etc. of the microfilm camera/-processor described as the preferred embodiment of invention, particularly for variations for producing different width microfilm, color images, different frame size, using different photoconductor or electrophotographic materials variations in the through-put, timing, functional limits, different lengths of film, and different ultimate uses requiring particular types of microfilm for such uses. Such changes may occur to the skilled artisan without departing from the teachings of the invention herein or the scope of the invention as claimed herein,

What we claim is:

1. A power cam drive assembly for use in a system requiring the successive generation and transmission of two different degrees of force for serial application to a body, said power cam drive assembly comprising:

- an outer cam shell,
- drive means coupled to said outer cam shell for rotation thereof;
- a cam core arranged within said outer cam shell for eccentric rotation relative thereto during rotation of said outer cam shell;
- follower means within said cam core and rotatable therewith;
- windable spring means disposed within said cam shell between and secured to said cam shell and said cam core,
- said spring means having a greater rotational torque than required to rotate said cam core,
- said drive means being effective to rotate said outer cam shell, through said spring means, causing rotation of said cam core and attendant rotation of said follower means therewith;
- stop means arranged in the rotational path of said said follower means for intercepting said follower means;
- said follower means impacting on said stop means preventing further rotation of said cam core and follower means causing the first force to be transmitted to said body by way of said follower means;
- said drive means being operable thereafter causing further rotation of said outer cam shell winding said spring means, driving said follower means in a downward direction due to the axial offset of said cam core attendant on the eccentric positioning of said cam core relative said outer cam shell producing a second downward force greater than said first force for transmission to said body by way of said follower means.

2. The power cam drive assembly according to claim 1 in which said spring means comprise a clock spring secured to the cam core and anchored to said cam shell.

3. The power cam drive assembly according to claim 1 and lever means coupled to said follower means and arranged for transmitting said forces to said body.

4. The power cam drive assembly according to claim 1 in which said follower means comprise a cam roller coupled to said cam core whereby to follow the rotation of said cam core.

* * * * *